Sept. 30, 1947.  H. L. LAMBERT  2,428,084
CALCULATING MACHINE
Filed Oct. 28, 1941  18 Sheets-Sheet 2
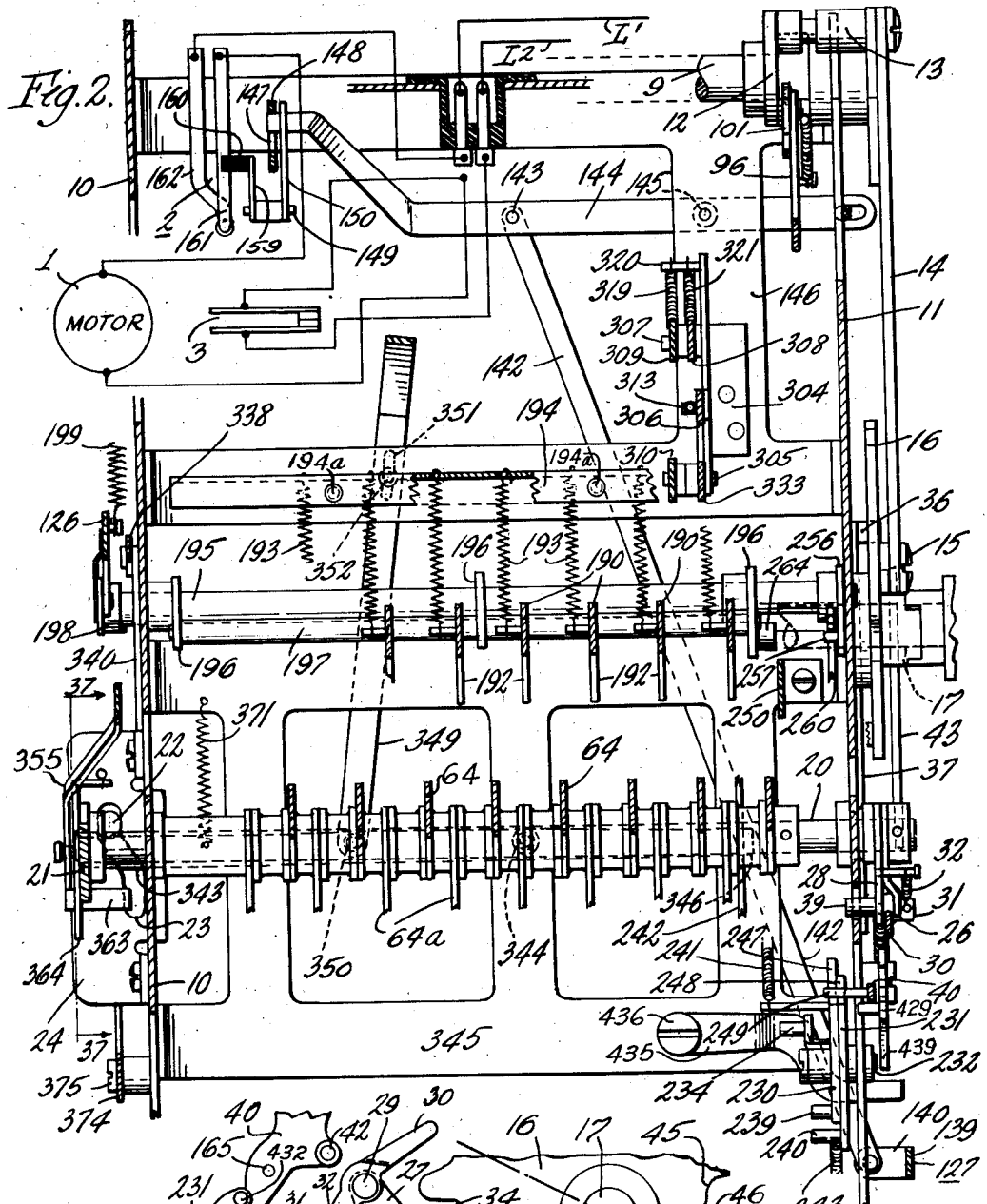
INVENTOR.
Harry L. Lambert
by
Parker, Rockwood & Farmer.
ATTORNEYS.

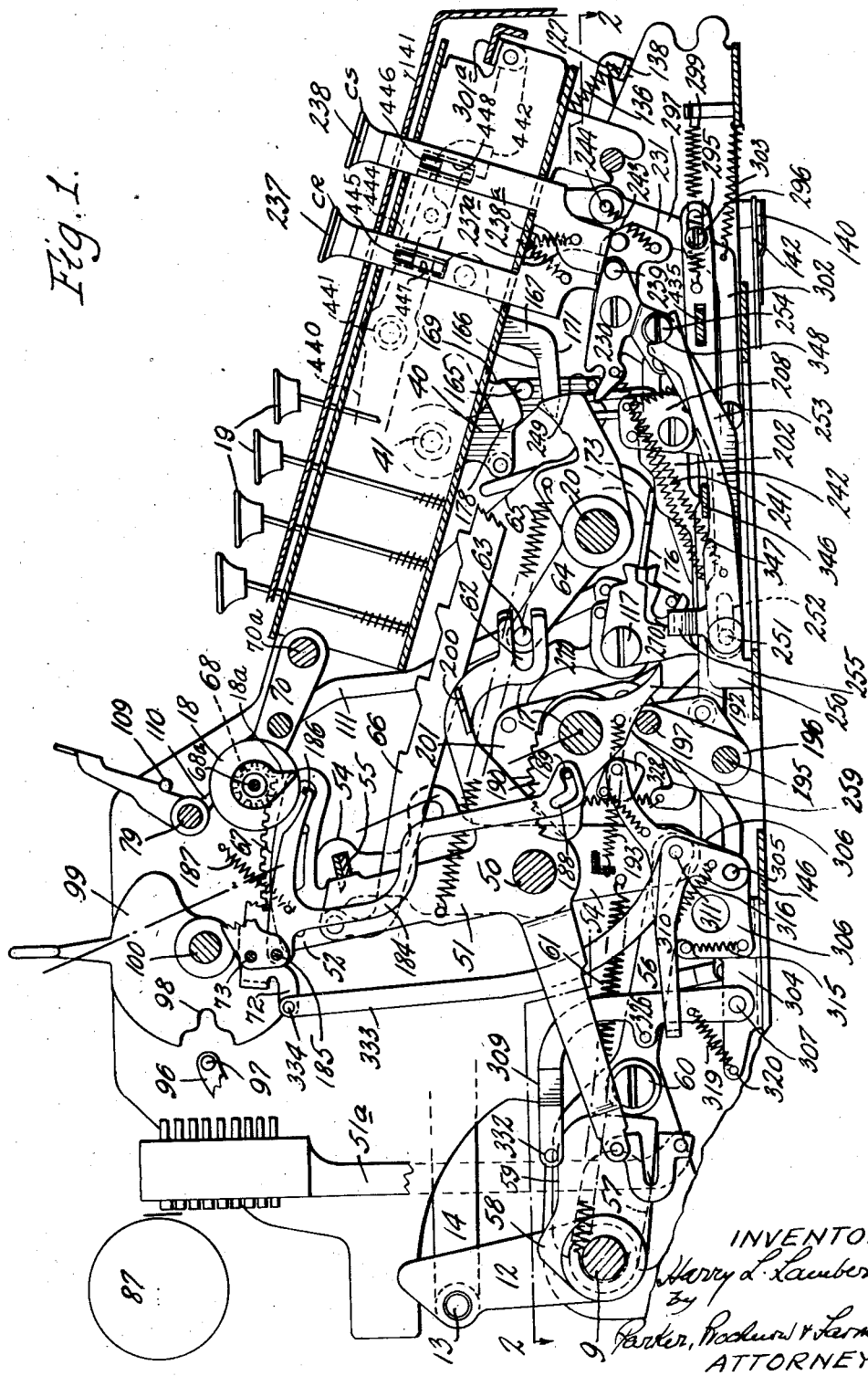

Sept. 30, 1947.  H. L. LAMBERT  2,428,084
CALCULATING MACHINE
Filed Oct. 28, 1941  18 Sheets-Sheet 3

INVENTOR.
Harry L. Lambert
by Parker, Woodrow & Farmer
ATTORNEYS.

Sept. 30, 1947.  H. L. LAMBERT  2,428,084
CALCULATING MACHINE
Filed Oct. 28, 1941  18 Sheets-Sheet 4

INVENTOR.
Harry L. Lambert
by Parker, Rockwell & Farmer,
ATTORNEYS.

Sept. 30, 1947.           H. L. LAMBERT              2,428,084
                        CALCULATING MACHINE
                  Filed Oct. 28, 1941      18 Sheets-Sheet 5
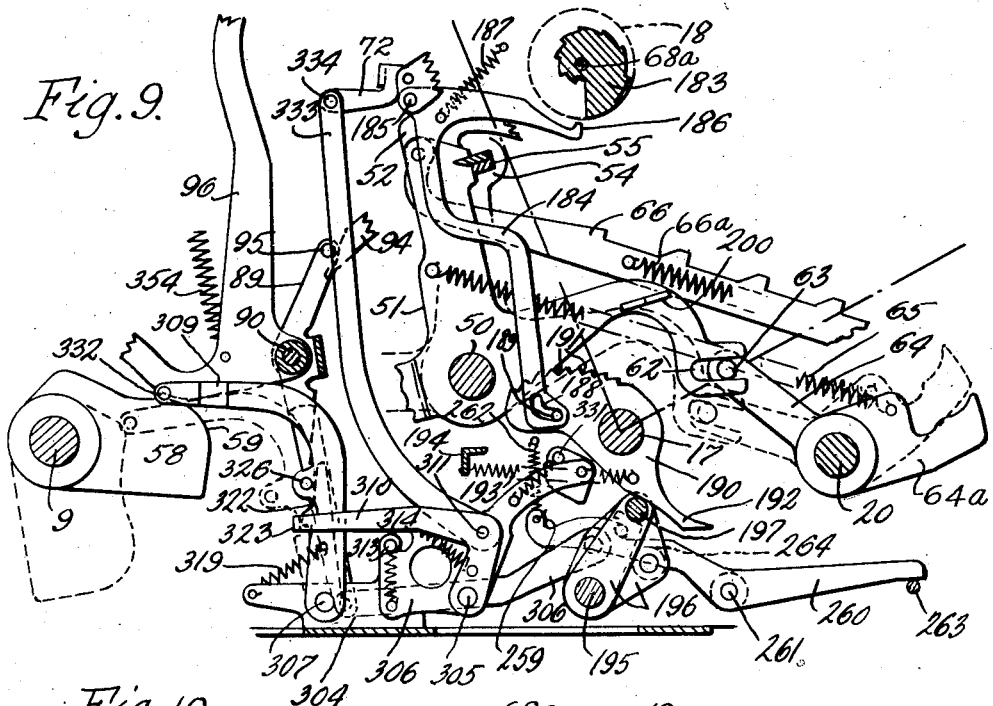
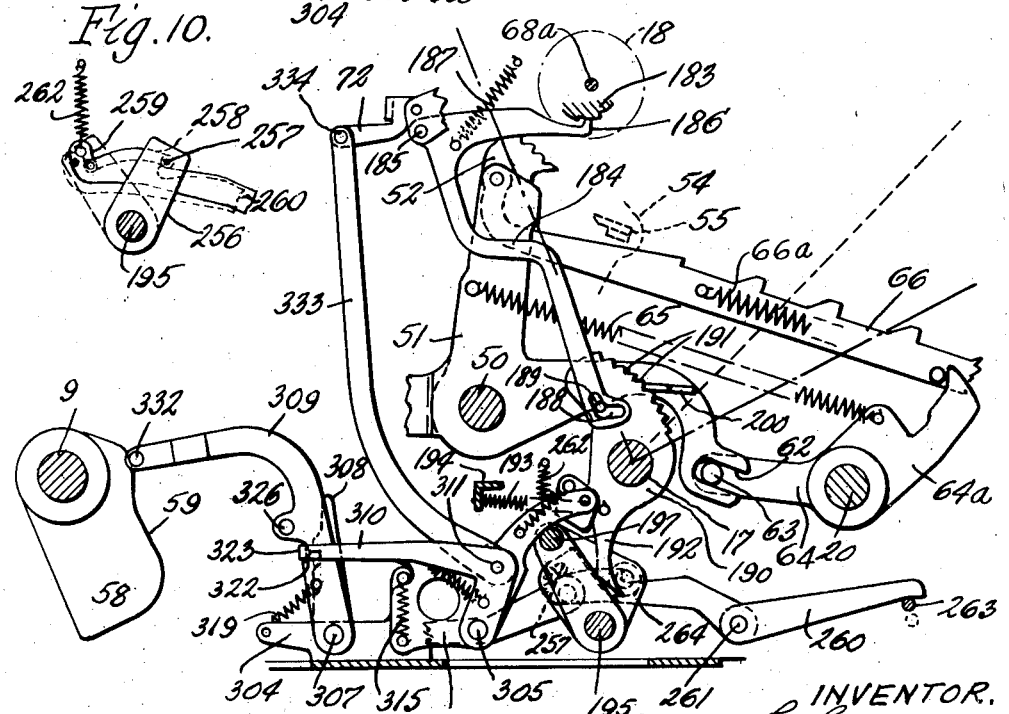
INVENTOR.
Harry L. Lambert
by Parker, Rockwell & Farmer
ATTORNEYS.

Sept. 30, 1947.   H. L. LAMBERT   2,428,084
CALCULATING MACHINE
Filed Oct. 28, 1941   18 Sheets-Sheet 6

INVENTOR.
Harry L. Lambert
by Parker, Rockwood & Farmer.
ATTORNEYS.

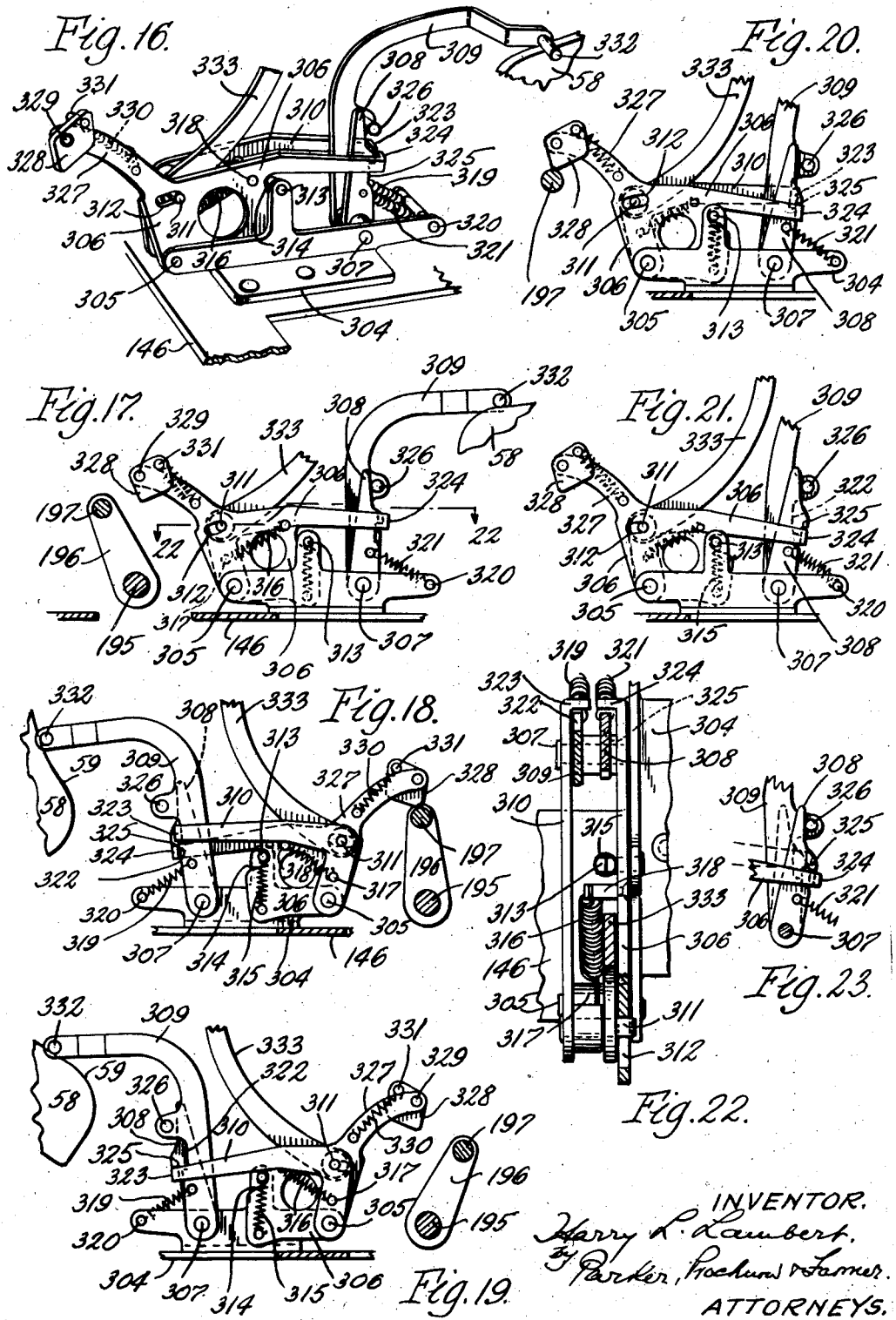

Sept. 30, 1947.  H. L. LAMBERT  2,428,084
CALCULATING MACHINE
Filed Oct. 28, 1941  18 Sheets-Sheet 8
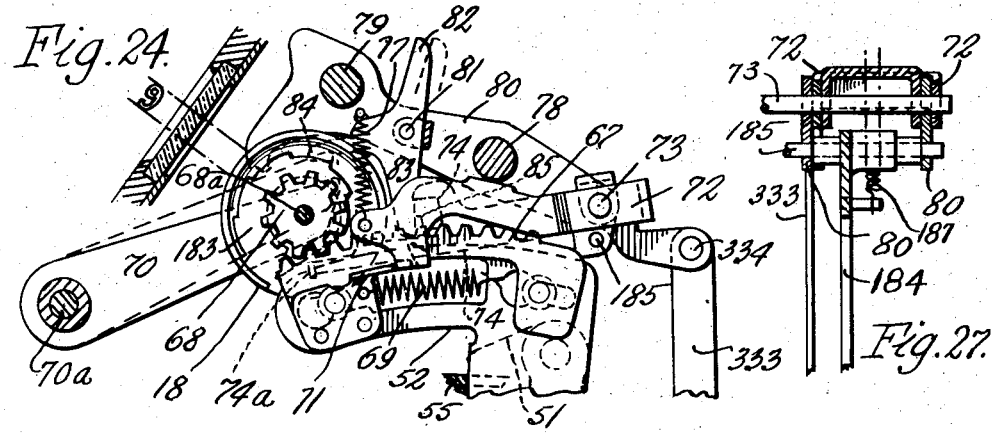
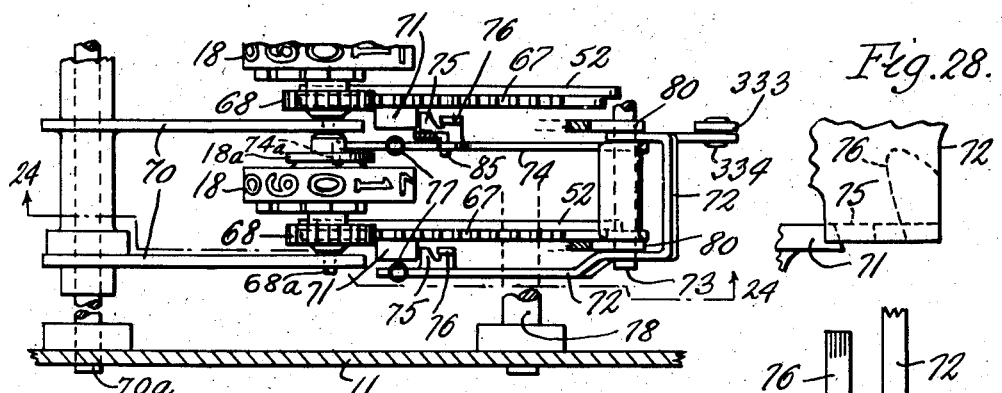
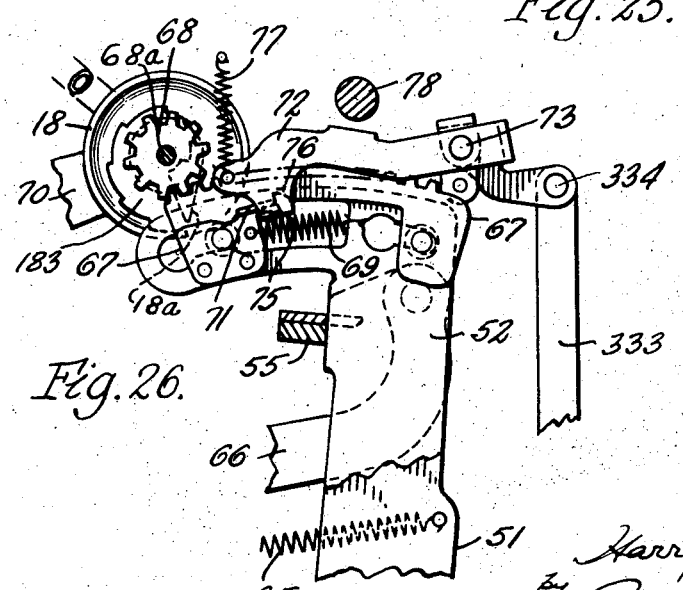
INVENTOR.
Harry L. Lambert
by Parker, Rockwood & Farmer.
ATTORNEYS.

Sept. 30, 1947.  H. L. LAMBERT  2,428,084
CALCULATING MACHINE
Filed Oct. 28, 1941  18 Sheets-Sheet 9

INVENTOR.
Harry L. Lambert.
by Parker, Rockard & Farmer.
ATTORNEYS.

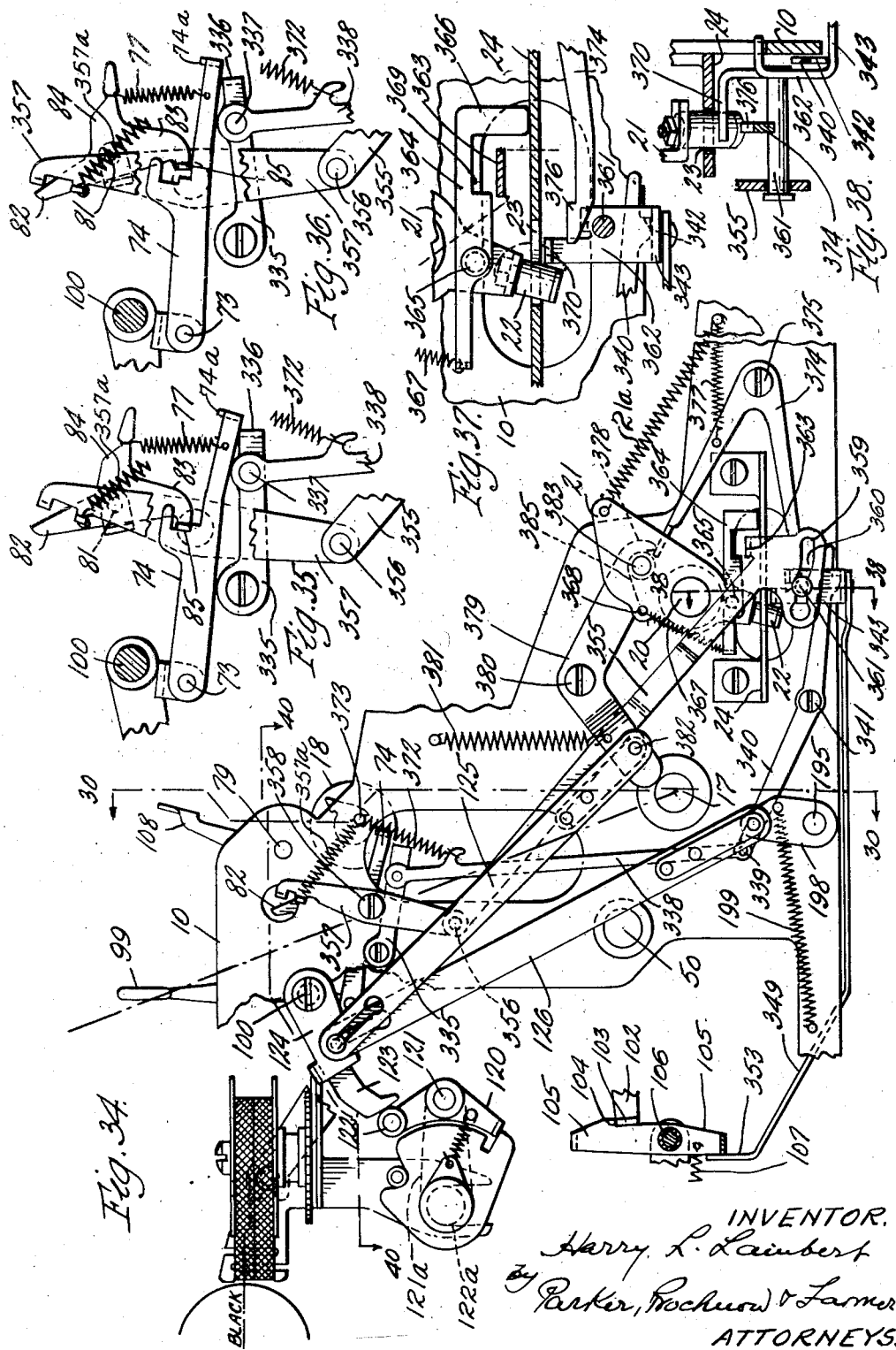

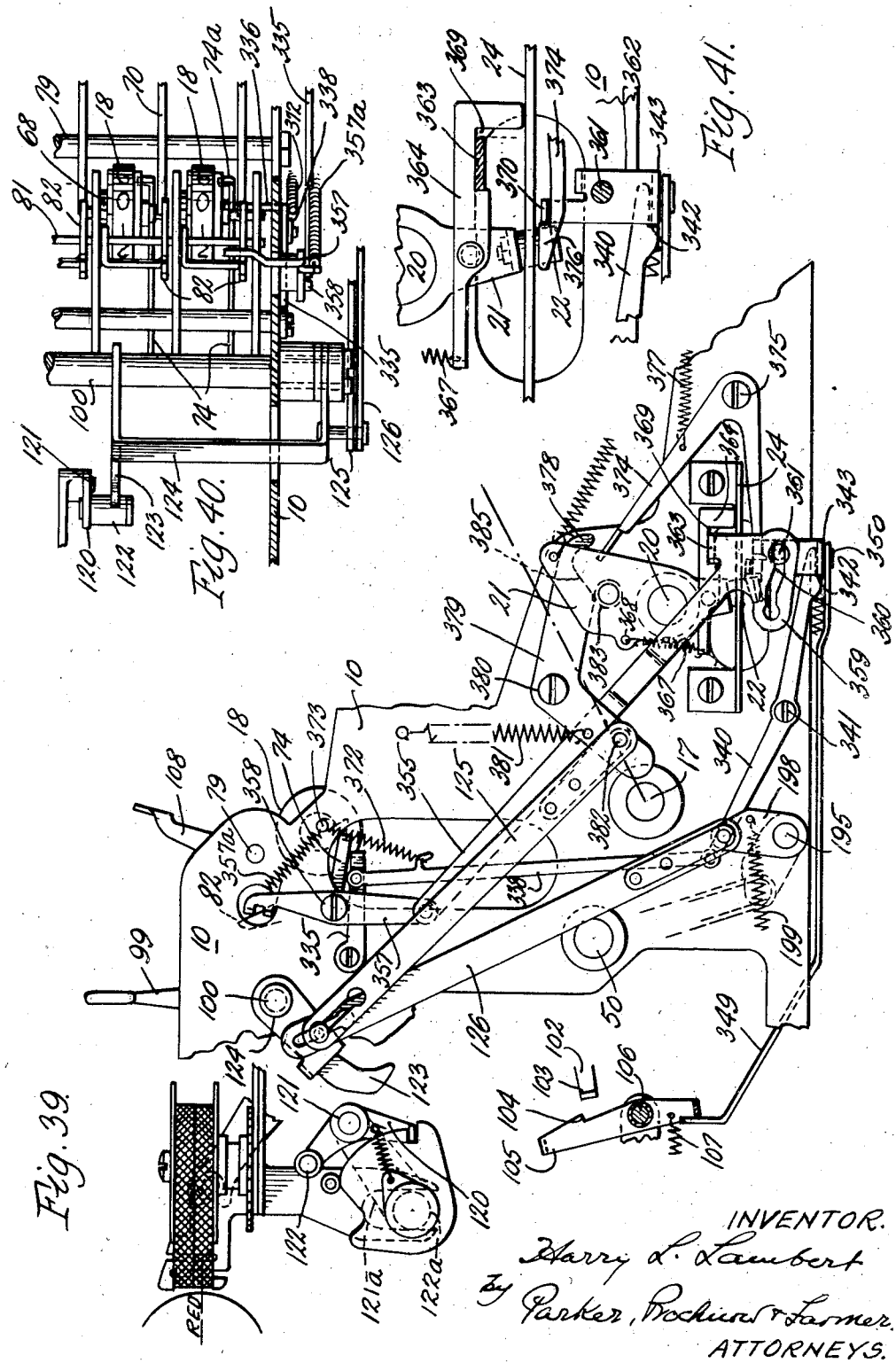

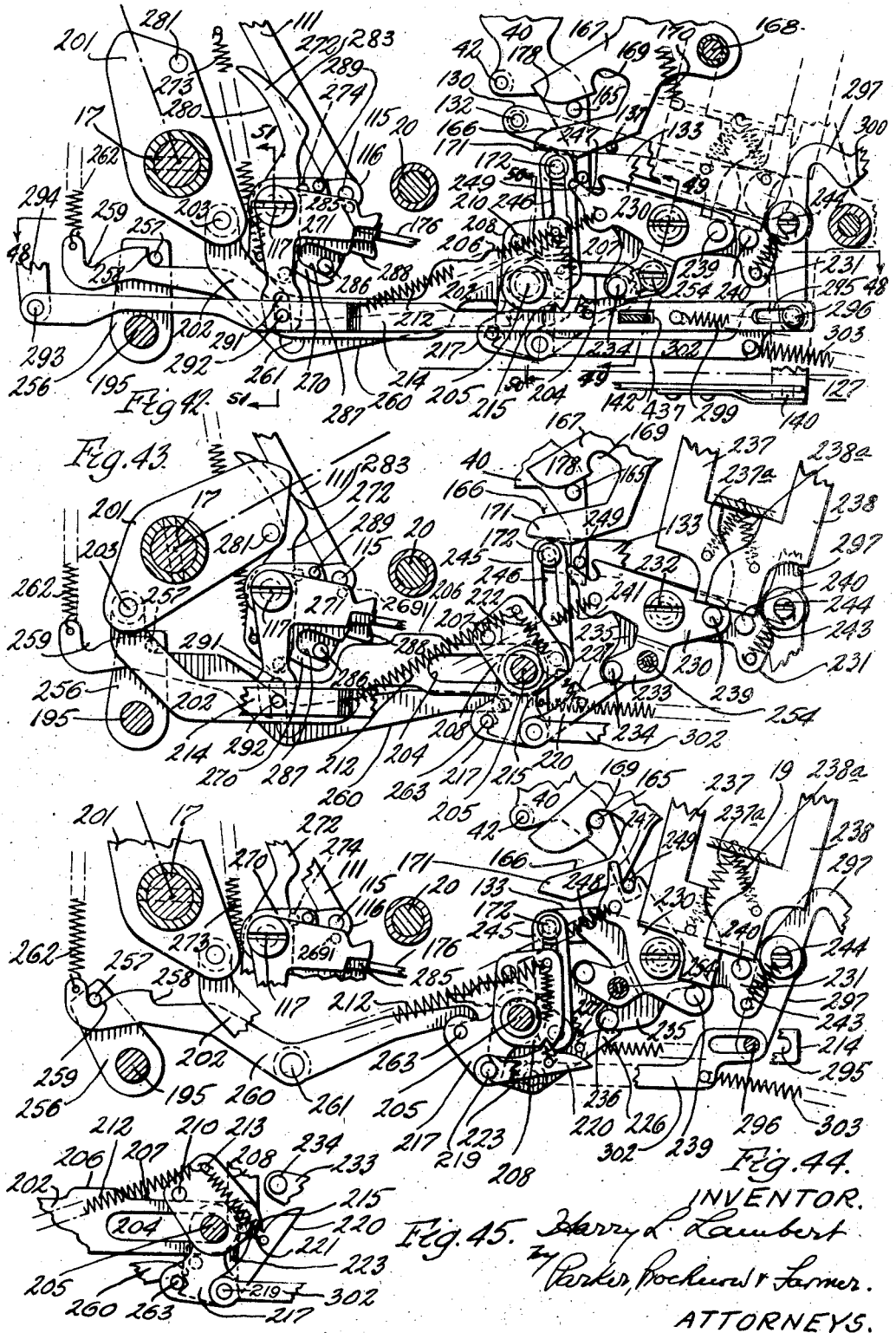

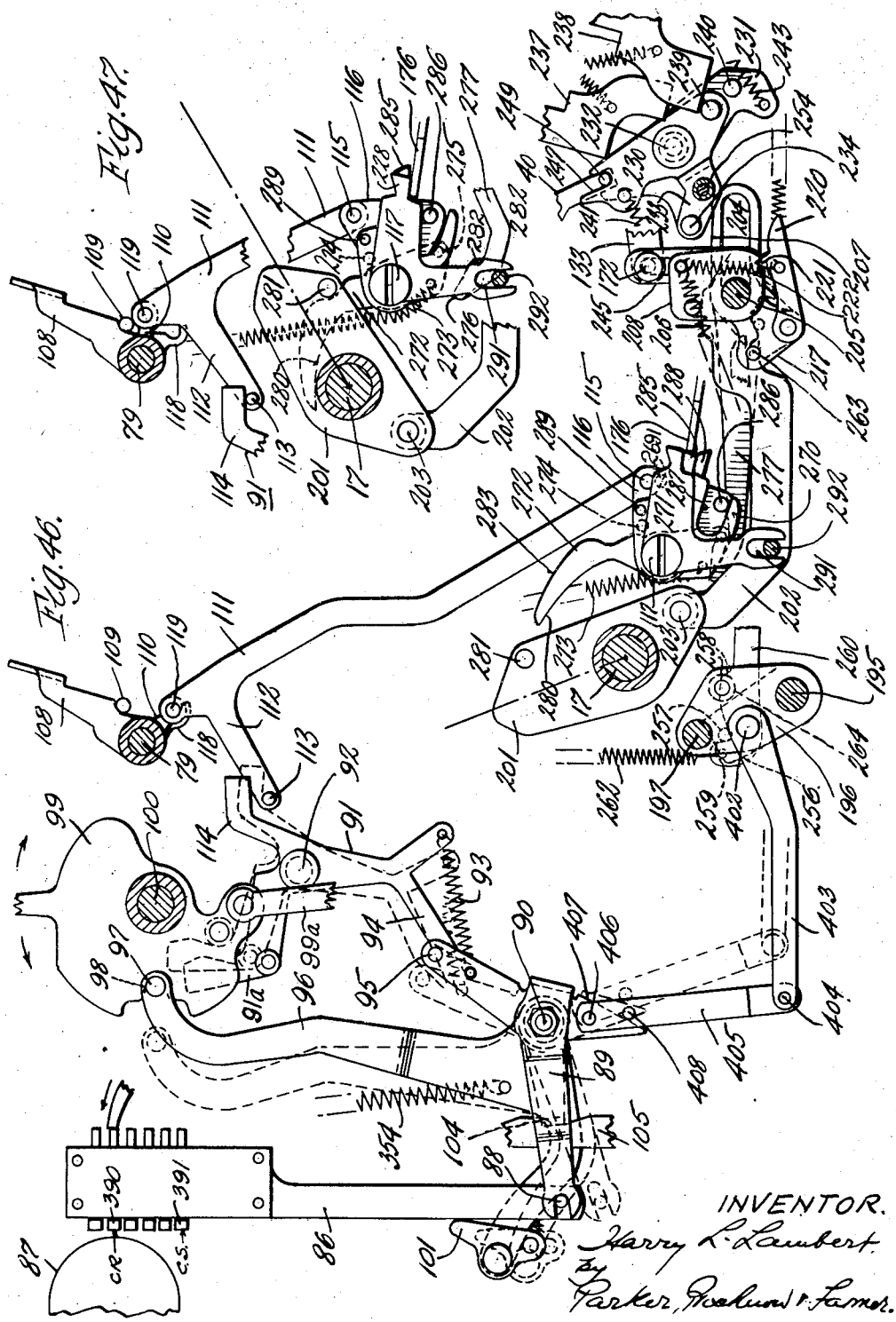

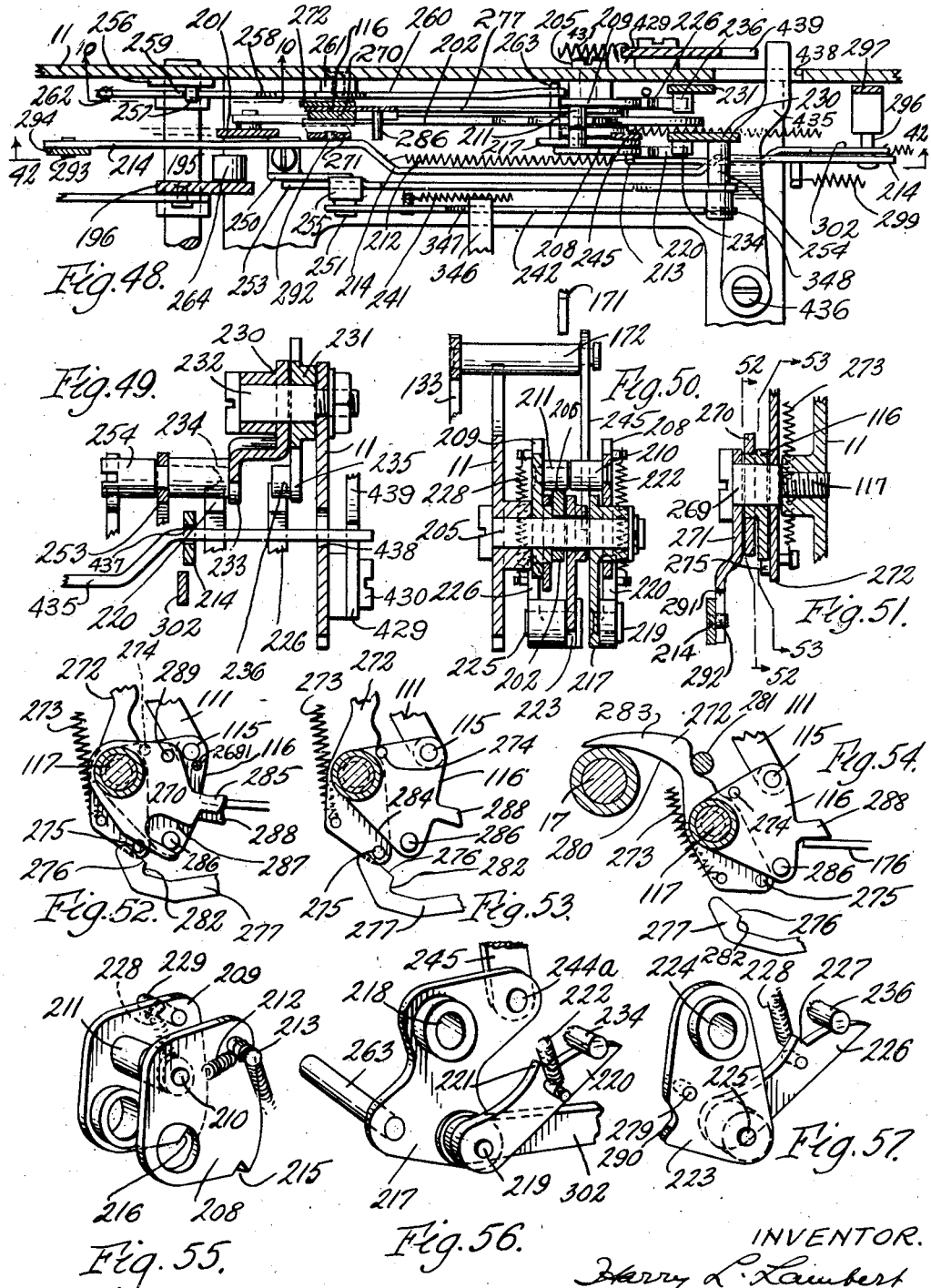

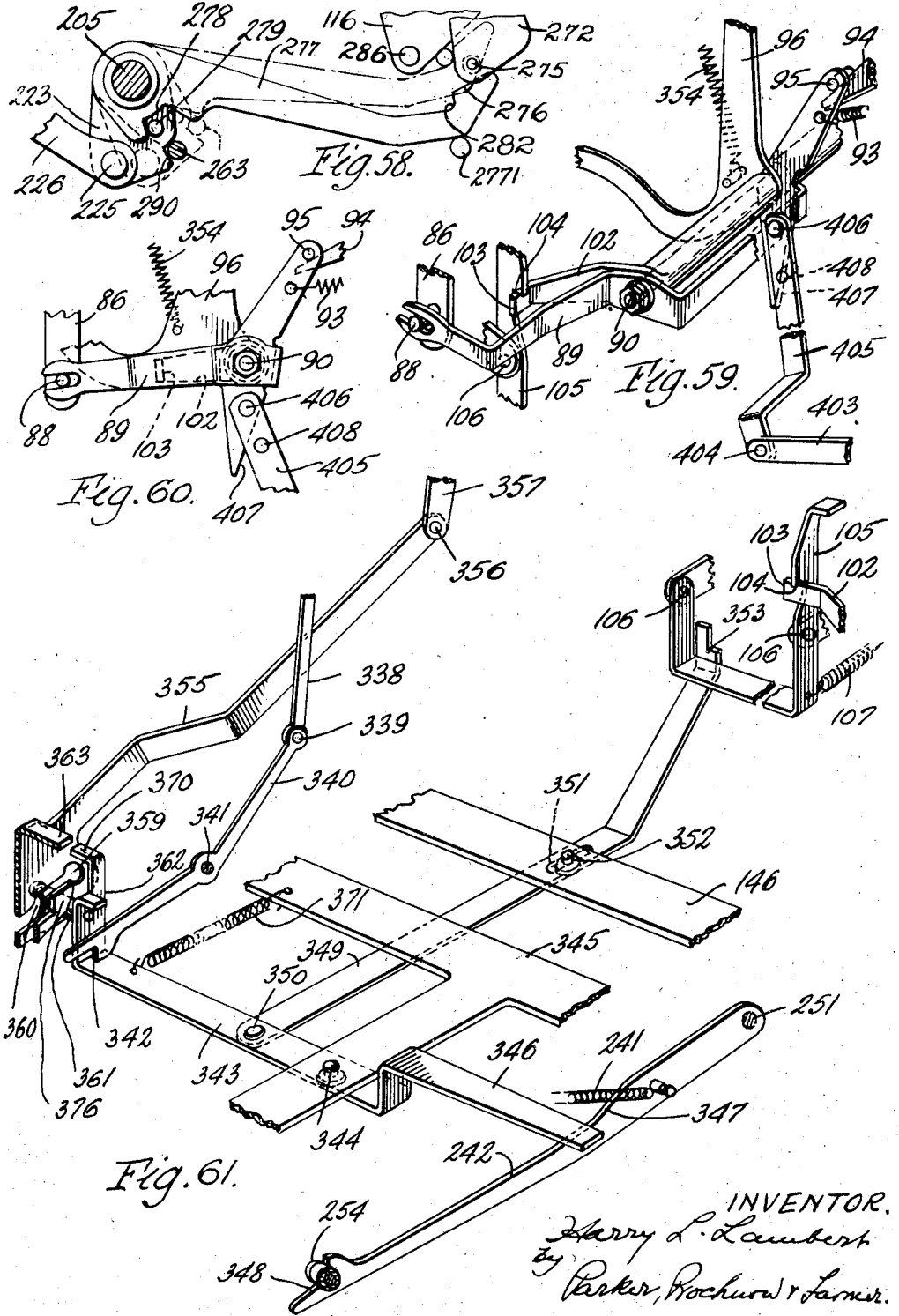

Sept. 30, 1947. H. L. LAMBERT 2,428,084
CALCULATING MACHINE
Filed Oct. 28, 1941 18 Sheets-Sheet 16
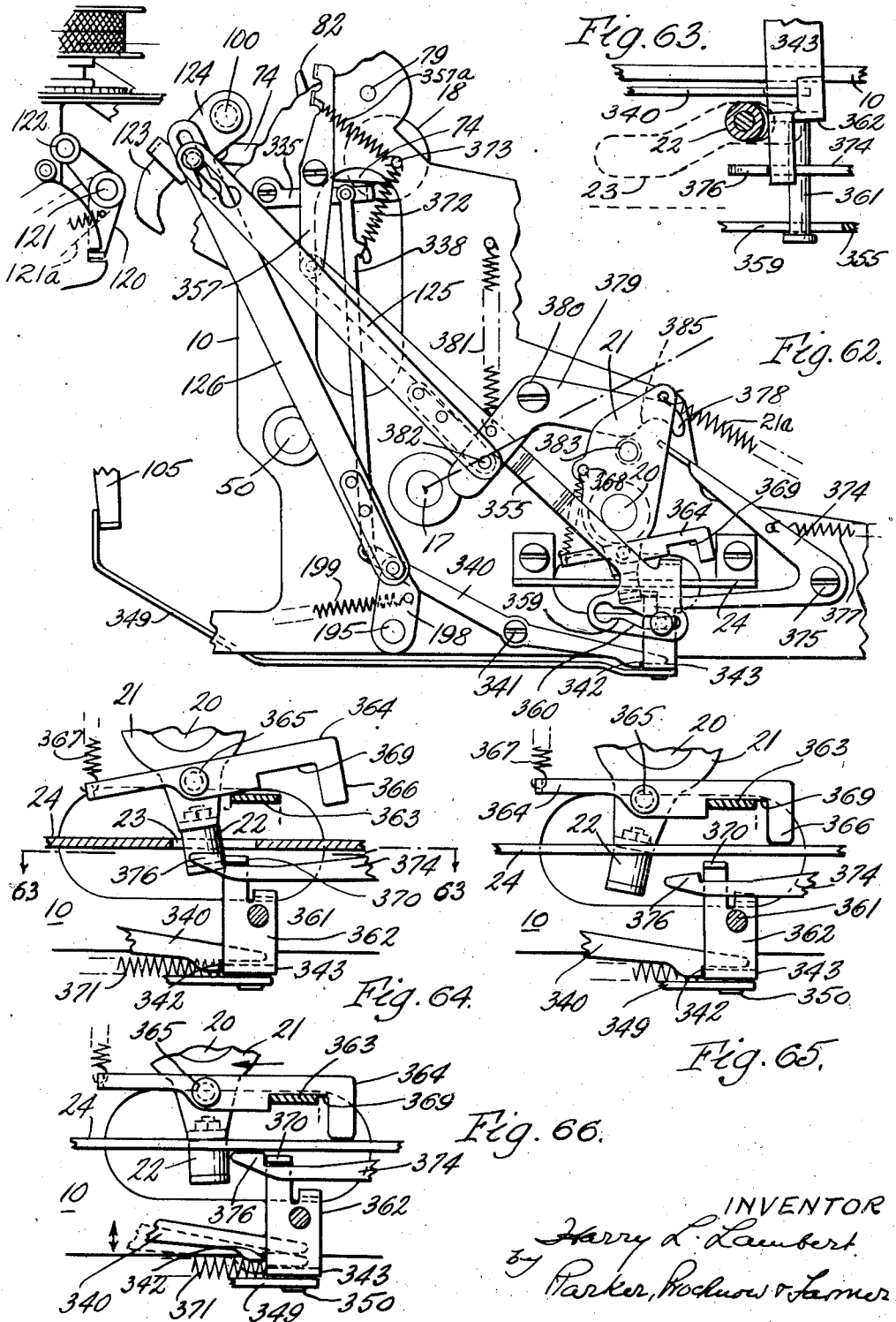
INVENTOR
Harry L. Lambert.
by Parker, Rockwood & Farmer
ATTORNEYS.

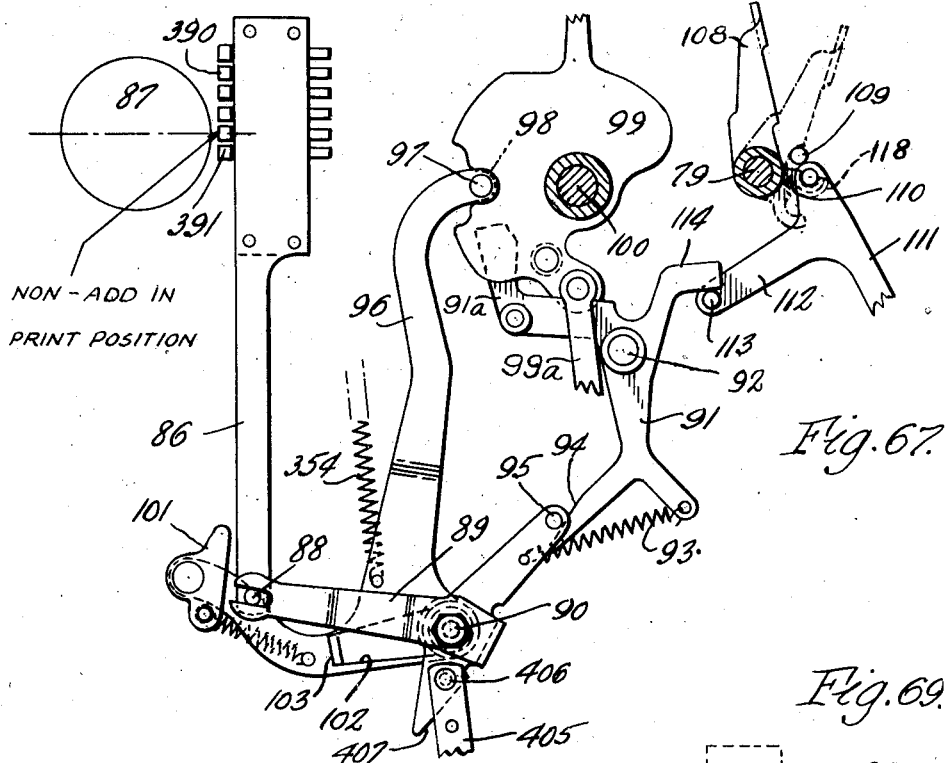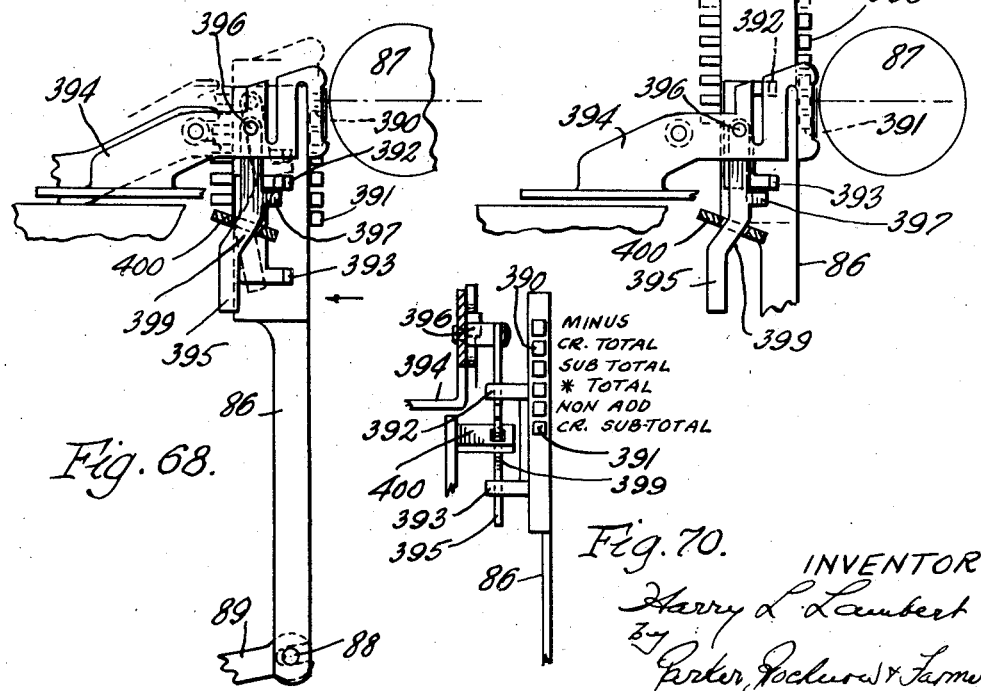

Sept. 30, 1947. H. L. LAMBERT 2,428,084
CALCULATING MACHINE
Filed Oct. 28, 1941 18 Sheets-Sheet 18
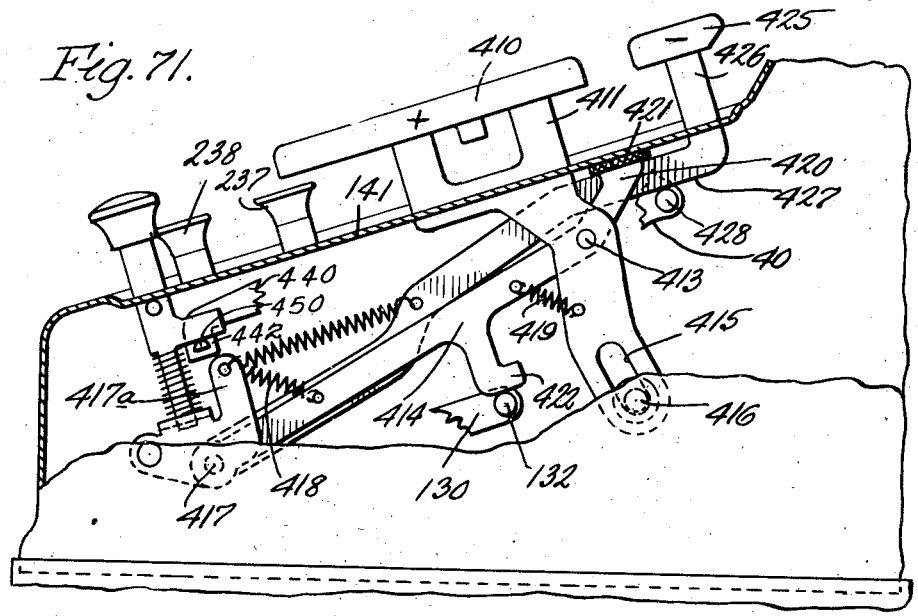
INVENTOR.
Harry L. Lambert
by Parker, Rockwood & Farmer.
ATTORNEYS.

Patented Sept. 30, 1947

2,428,084

UNITED STATES PATENT OFFICE 2,428,084

CALCULATING MACHINE

Harry L. Lambert, Enfield, N. Y., assignor to Allen Wales Adding Machine Corporation, Ithaca, N. Y.

Application October 28, 1941, Serial No. 416,833

33 Claims. (Cl. 235—60)

This invention relates to improvements in calculating machines of the addition and subtraction type, and particularly to such machines in which subtraction is performed by the addition of complements.

Certain features of the invention are particularly applicable to machines of the kind mentioned above which are power-operated, and in which the various calculations are performed automatically upon actuation of the addition key and the subtraction key or the key for taking totals and sub-totals.

An object of the invention is to provide improved means for adding and subtracting numbers, in which the totalizer wheels rotate in the same direction for both addition and subtraction, which will be operative and correct when the results of the addition and subtraction operations produce a negative total, as well as when a positive total is produced, which may be operated to automatically clear the machine and print the correct total, whether positive or negative, or to automatically print the correct sub-total without clearing the machine, whether the total is positive or negative, which will prevent the operation of the usual positive total and sub-total taking lever whenever there is a negative total in the totalizer, which will prevent the operation of the negative total and sub-total keys whenever there is a positive total in the totalizer wheels, which may be easily incorporated in previous addition and subtraction machines of this type without extensive modifications in the addition, subtraction and total-taking mechanisms previously incorporated therein, and which will be relatively simple, compact, fool-proof, rapid in operation, and inexpensive.

Another object of the invention is to provide an improved addition and subtraction machine, in which subtraction is performed by complemental addition, which will correctly calculate totals, whether positive or negative, within the capacity of the machine, with which a correct sub-total, whether positive or negative, may be printed at any time without clearing the machine, which automatically distinguishes between positive and negative totals in the totalizer and makes operation of the usual positive total and sub-total mechanism impossible when the total in the totalizer wheels is negative, and prevents operation of the negative total and sub-total mechanism when the total indicated in the totalizer wheels is positive, and which automatically and correctly indicates the character of the total or sub-total printed upon the taking of any total or sub-total.

Another object of the invention is to provide an improved calculating machine, in which both addition and subtraction may be performed on the same machine, the subtraction by complemental addition, and which will be accurate whether the total in the totalizer is positive or negative, and with which the machine may be cleared mechanically and automatically whether the total in the totalizer wheels at any time be positive or negative.

A further object of the invention is to provide, in an addition and subtraction machine, improved means for subtracting and then later adding a value of "one" automatically when taking a negative total or sub-total.

A further object of the invention is to provide an improved calculating machine in which both addition and subtraction are performed by rotation of the totalizer wheels in the same direction, and which automatically differentiates between positive and negative totals in the totalizer wheels, and automatically prevents improper operation of the machine by the operator, such as in attempting to take a negative total when the total in the totalizer is a positive total.

Other objects of the invention are to provide an improved calculating machine which, when a larger amount is subtracted from a smaller amount, will indicate the presence, in the totalizer wheels, of a negative total and enable such amount to be printed with a suitable accompanying sign or symbol indicating the negative character of such totals, or when desired, to print it as a negative sub-total with a sign indicating its character; also to construct a calculating machine with which, when a positive total is present in the machine, will enable such total to be taken by the actuation of the appropriate lever, and the actuation of the means for taking negative totals and negative sub-totals will be automatically prevented, and in which, when a negative total is present, the means for taking a positive total is rendered inoperable and the means for taking a negative total or negative sub-total is automatically conditioned for operation.

Other objects of the invention are to provide a calculating machine which, when a negative total is present therein, will automatically enable the machine to be set to perform a cycle of operations during which the amount in the totalizer wheels will be converted from the tens complement of the negative total to the nines complement of the negative total, to then selectively print the correct amount of the negative total or negative sub-total, to then clear the machine if a negative total was taken, or leave the tens complement of the negative total or in the machine if a negative sub-total was taken; also to provide a machine which, when a positive or true total is present, enables an amount to be printed to correspond to such true total, but which, when a negative total is present and it is desired to take a negative total or a negative sub-total, automatically causes the subtraction of "one" from the units column totalizer wheel, before printing, to convert the amount from the tens complement of the negative total to the nines complement of the negative total, adds the "one" back into the units column after printing to restore into the totalizer wheels the amount present therein before the "one" was subtracted if a negative sub-total has been taken, or causes the totalizer to be cleared if a negative total has been taken.

Other objects and advantages will appear from the following description of one embodiment of the invention, and the novel features will be particularly pointed out hereinafter in connection with the appended claims.

In the accompanying drawings:

Fig. 1 is a longitudinal sectional elevation of a calculating machine embodying the invention.

Fig. 2 is a fragmentary horizontal section thereof, taken approximately on the line 2—2 of Fig. 1.

Fig. 3 is an elevation of a portion of the right hand side of the machine, illustrating, in an intermediate position, certain parts employed in a subtraction operation.

Fig. 9 is a fragmentary longitudinal section of the machine, with the parts in normal position, and illustrating the mechanism for setting up the complement of a number in the totalizer wheels.

Fig. 10 is a fragmentary longitudinal section of the latching means for the bail which tensions the mechanism for restoring the value of "one" into the totalizer, taken on line 10—10 of Fig. 48.

Fig. 11 is a view similar to Fig. 9, with the parts in the position in which the differentially operable means has been set to the nines complement of a number on the totalizer wheel.

Fig. 16 is a perspective view of a part of the mechanism for restoring the value of "one" into the units denomination of the totalizer, the parts being in normal position.

Fig. 17 is an elevation of the parts shown in Fig. 16.

Fig. 18 is a similar view, taken from the opposite side, and showing the parts in one operated position.

Fig. 19 is a similar view of the parts in another operative position.

Fig. 20 is a side elevation of the mechanism in the position shown in Fig. 18, but viewed from the opposite side.

Fig. 21 is a view similar to Fig. 20, with the parts in the position of Fig. 19.

Fig. 22 is a fragmentary horizontal section of the mechanism, taken on line 22—22, Fig. 17.

Fig. 23 is a fragmentary side elevation of a portion of this mechanism, in which the parts are about to be restored to their normal positions.

Fig. 24 is an enlarged fragmentary longitudinal section on line 24—24, Fig. 25, of another portion of the mechanism for restoring the value of "one" into the units denominational order of the totalizer, the parts being in normal position.

Fig. 25 is a top plan view of the parts shown in Fig. 24.

Fig. 26 is a view of some of the parts shown in Fig. 24, with the parts in an operated position.

Fig. 27 is a fragmentary transverse vertical section of a portion of the mechanism shown in Fig. 24.

Figs. 28 and 29 are respectively a fragmentary side elevation and a fragmentary front elevation of certain parts shown in Fig. 24.

Fig. 34 is a fragmentary elevation of the left-hand side of the machine, with the parts in normal position.

Fig. 35 is a fragmentary sectional elevation of the last or left hand transfer lever and the associated transfer lever latch, and certain parts associated therewith, in the latched position.

Fig. 36 is a similar figure with the parts in unlatched position as in Fig. 34.

Fig. 37 is an enlarged fragmentary sectional elevation of parts of the mechanism shown in Fig. 34, taken on line 37—37, Fig. 2.

Fig. 38 is a transverse vertical section of the mechanism shown in Fig. 37, taken on line 38—38, Fig. 34.

Fig. 39 is a fragmentary side elevation, similar to Fig. 34, but with the parts in a different position.

Fig. 40 is a fragmentary plan view of the parts shown in Fig. 35, and taken on line 40—40, Fig. 34.

Fig. 41 is a view similar to Fig. 37, with the parts in a different position.

Figs. 42 to 45 are enlarged, fragmentary longitudinal sections of the mechanism for controlling the operation of the machine for performing negative total and negative sub-total-taking operations, Fig. 42 being taken approximately on line 42—42, Fig. 48.

Fig. 46 is a view of the mechanism shown in Fig. 42, together with the non-add lever, the symbol type bar of the machine, and the mechanism for operating the spacing stroke lock.

Fig. 47 is a fragmentary view of a portion of the mechanism shown in Fig. 46, with the parts in the position in which the non-add link is locked in operated position.

Fig. 48 is a fragmentary horizontal section, showing the mechanism seen in Fig. 42, the section being taken approximately on line 48—48 of Fig. 42.

Fig. 49 is an enlarged, fragmentary transverse vertical section, taken on line 49—49, Fig. 42.

Figure 4:
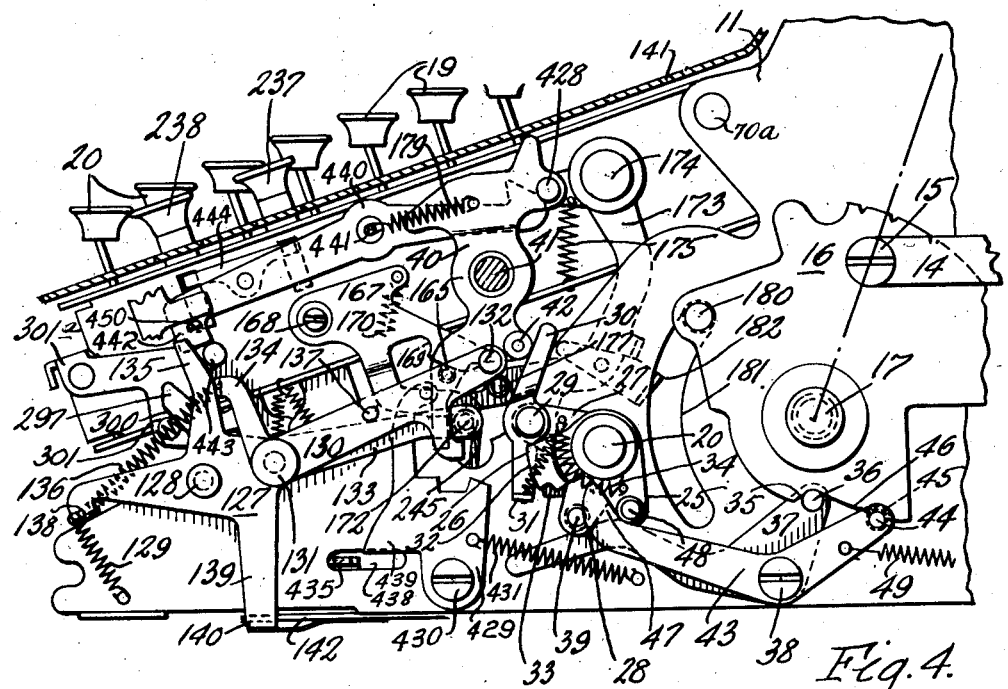
Fig. 4 is a fragmentary sectional elevation, also of a portion of the right hand side of the machine, the parts being in their normal positions.
Figure 5:
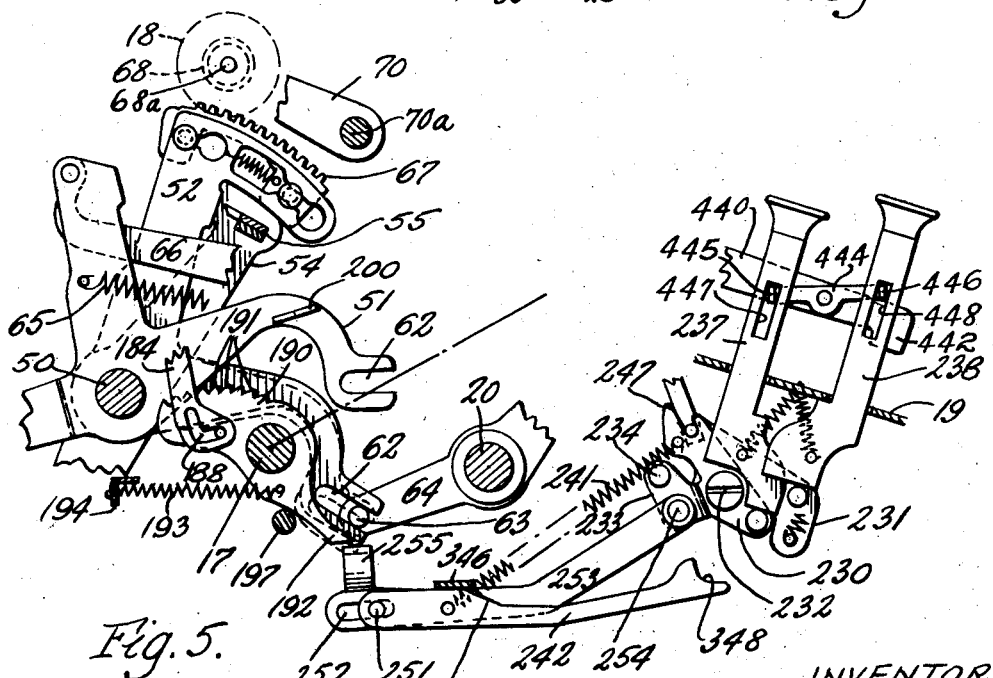
Fig. 5 is a fragmentary longitudinal section, illustrating parts of the machine in position for controlling the units denominational rack lever in the first machine cycle of an operation in which a negative total is printed.

Figs. 50 and 51 are similar figures taken respectively on lines 50—50 and 51—51 of Fig. 42.

Figs. 52 and 53 are similar figures taken respectively on lines 52—52 and 53—53, Fig. 51.

Fig. 54 is a sectional view similar to that of Fig. 52, but with the parts in a different position.

Figs. 55 to 57 are perspective views of parts of the control mechanism of Fig. 42.

Fig. 58 is a fragmentary vertical sectional elevation of part of the control mechanism of Figs. 42 and 48, showing means for effecting the automatic operation of the non-add mechanism.

Fig. 59 is a perspective view of the means shown in Fig. 46 for locking the positive total and sub-total lever, and for actuating the symbol type bar.

Fig. 60 is a fragmentary side elevation of a part of the mechanism of Fig. 59.

Fig. 61 is a fragmentary perspective view of an interlock mechanism disposed between the positive total-taking control means and the negative total and sub-total-taking control means.

Fig. 62 is a fragmentary side elevation similar to Figs. 34 and 39, showing another position of the mechanism.

Fig. 63 is a fragmentary plan view, on line 63—63, Fig. 64, showing the actuation of the interlock of Fig. 61, in the same position as that illustrated in Fig. 64.

Figs. 64 to 66 are fragmentary sectional elevations, similar to Figs. 37 and 41, showing different positions of the parts.

Fig. 67 is a longitudinal vertical section, illustrating the positive total and sub-total lever and the non-add link in operated position and the symbol type bar shifted to "non-add" printing position prior to its movement to position for printing the "credit sub-total" symbol.

Fig. 68 is a fragmentary sectional elevation viewed from the opposite side of the symbol type bar from that of Fig. 67, illustrating means for shifting that type bar into positions for printing the "minus" symbol or the "credit sub-total" symbol.

Fig. 69 is a fragmentary view similar to Fig. 68, showing the parts in the position of Fig. 67.

Fig. 70 is a rear elevation of the parts viewed in the direction of the arrow in Fig. 68.

Fig. 71 is a fragmentary sectional elevation of a part of the right-hand side of the machine, illustrating touch bars or keys for actuating the addition and subtraction mechanisms respectively.

Fig. 72 is an elevation of the rear portion of the left-hand side of the machine, illustrating the operating motor, one-revolution clutch, and driving connections therefor.

Fig. 73 is a sectional elevation, partly diagrammatic, showing a switch which is actuated upon each operation of the one-revolution clutch.

DETAILED DESCRIPTION

Keyboard

The machine is provided with a suitable keyboard upon which amounts may be set up to control the entries of amounts in the machine.

The keyboard used in the novel machine is of the well-known type fully shown and described in the United States patent to Peters, No. 1,386,021, to which reference may be had for the details of its construction.

For an understanding of the instant invention, it is only necessary to explain that the keyboard is made up of a plurality of denominational rows of digit keys 19, which are normally out of controlling relation with the differential mechanism and which, when they are depressed to set up amounts to be entered into the machine, are moved into positions to control the differential mechanism according to these amounts. Each row of keys is provided with a zero stop lever, which is normally in position to block the operation of the differential mechanism but which can be moved to ineffective position as any key in the row is depressed. Suitable means are provided to latch the keys in the rows in depressed position until another key of a row is depressed or until they are released by the operation of the usual key release bail 301a.

Differential mechanism

The differential mechanism used in the novel machine is essentially like the one fully shown and described in the United States patent to White, No. 1,854,875, and will be but briefly described herein.

A differentially operable means is provided for each denominational row of keys 19; however, since all of the differentially operable means are substantially alike, it is believed that an understanding of the construction and operation of these means will be clear from a description of one of them.

Immediately below a row of keys 19 is a stop bar 66 (Figs. 1 and 9), which is pivotally connected at its rear end to a diverging lever 51 and is suitably guided by a supporting bar at its forward end so as to be movable longitudinally immediately below the keys. A spring 66a (Figs. 9 and 11), which is connected to the stop bar 66 and to the supporting bar, normally urges the stop bar to the right, and, when the machine operates, the stop bar 66 will be allowed to be moved to the right by the spring 66a until one of the abutments on the upper edge of the bar engages the lower end of a depressed key to limit the movement of the stop bar 66 to an extent which corresponds to the value of the depressed key.

The diverging lever 51 is pivotally mounted on a diverging lever shaft 50 and has a rearward extension (Fig. 1), to which is connected an amount printing type bar 51a. As the stop bar 66 moves to the right, the diverging lever 51 will move therewith and will rock clockwise (Fig. 1) about the shaft 50 a distance proportional to the value of the depressed key and will position the type bar accordingly to place the type corresponding to the depressed key in printing position.

Also pivotally mounted on the shaft 50, immediately adjacent the diverging lever 51, is a rack lever 52, which carries at its upper end a totalizer actuating rack 67.

The diverging lever 51 and its associated rack lever 52 are provided with forwardly-extending, gooseneck-shaped arms which contain at their forward ends slots 62, which are substantially radial to the shaft 50. A pin 63, carried by an arm 64 of a complementary lever rotatable about a shaft 20, extends through the slots 62 in the forward extensions of the pair of levers 51 and 52 and couples these levers for joint movement during the operation of the machine for addition. Thus, when the diverging lever 51 rocks clockwise about the shaft 50 as the stop bar 66 moves forward to contact a depressed key, the rack lever 52, which is coupled thereto by pin 63, will be given a similar movement.

Figure 30:
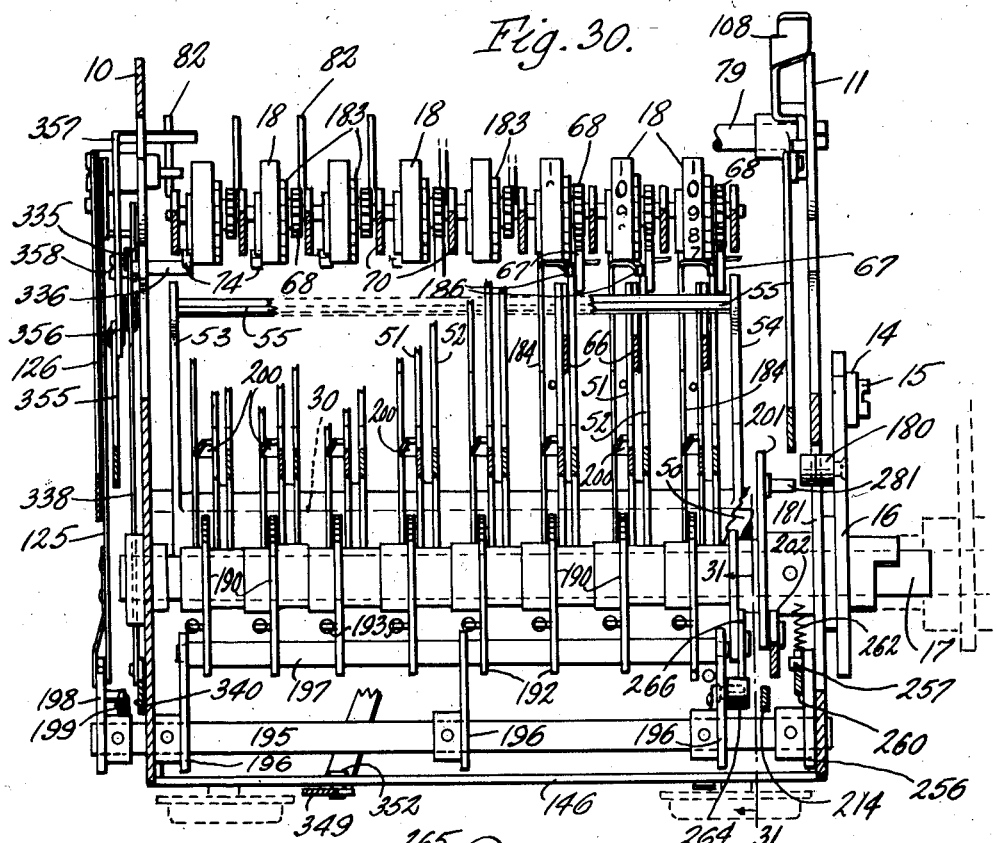
Fig. 30 is a fragmentary transverse vertical section of the mechanism taken approximately on the line 30—30, Fig. 34.

The diverging lever 51, the rack lever 52, and the stop bar 66 are normally held in their home positions, shown in Fig. 1, by means of a cross bar 55, which engages the front edge of the levers. Cross bar 55 extends across the machine and is supported near the top of arms 53 and 54 (Figs. 1 and 30), which are secured to the shaft 50 adjacent the inner sides of two vertical side frames 10 and 11 of the machine, in which side frames the shaft is rockably journaled. The arm 54 extends below the shaft 50 a substantial distance and at its lower end is pivoted to one end of a link 56 (Fig. 1), the other end of this link 56 being provided with a slot 57, which straddles a rear shaft 9, so that this other end of the link may be slidably guided thereon. A roller 60, which is provided on the side of the link 56, cooperates with a cam edge 59 on a main cam 58 fixed to the rear shaft 9 and enables the cam to control the movement of the link 56 and thereby the cross bar 55. A spring 61 is connected at one end to the arm 54 and at its other end is hooked over the rear shaft 9 as shown in Fig. 1, so as to normally urge the arm 54 clockwise in Fig. 1 and at the same time to press the roller 60 against the cam edge 59 of the main cam 58. When the rear shaft 9 rotates clockwise in Fig. 1, which is the direction of rotation at the beginning of a cycle of operation of the machine, the cam 58 will release the roller 60 for movement to the left, and the spring 61 will then rock the arm 54 clockwise (Fig. 1) and through it move the cross bar 55 toward the front of the machine to the extent permitted by the periphery of the cam 58, to release the diverging lever, the rack lever, and the stop bar for movement by the spring 66a.

The diverging lever, the rack lever, and the stop bar will move with the cross bar 55 until the levers and the stop bar move an extent corresponding to a depressed key and one of the abutments on the stop bar 66 engages the lower end of a depressed key to prevent their further movement, after which the cross bar 55 leaves the front edge of the levers and continues its movement as determined by the shape of the edge 59. When the shaft 9 returns to its normal position, shown in Fig. 1, the cam moves the roller 60 to the right and through it restores the cross bar 55 into the position shown, and the bar 55, in its return movement, picks up the diverging lever 51 and the rack lever 52 from their set positions and carries them and the stop bar with it back to their normal positions.

In the operation of the machine for addition, pinion 68 of the totalizer wheel 18 related to this differentially operable means will be engaged with the rack 67 during the return movement of the rack lever 52 by the cross bar 55 and will be rotated clockwise, as seen in Fig. 1, to enter into the totalizer an amount corresponding to the value represented by the displacement of the rack.

Accordingly, the differential mechanism can be controlled by the keyboard in operations of the machine for addition to cause the entry into the totalizer of such amounts as are set up thereon by the depression of the keys.

Totalizer

The totalizer is similar to the one disclosed in the United States patents to Peters, No. 1,386,021, and White, No. 1,854,875, and will be but briefly described.

A totalizer wheel 18 is provided for each of the differentially operable means to be operated thereby. Secured to each of the totalizer wheels is a pinion 68, which can be meshed with the totalizer actuating rack 67 of its related differentially operable means at suitable times to enable the rack to drive the totalizer wheel. The totalizer wheels 18 and their related pinions 68 are rotatably mounted on a rod 68a, which is carried by a totalizer frame composed of members 70, which extend between adjacent totalizer wheels and are secured to a rod 70a. The rod 70a is journaled in the side frames 10 and 11 and enables the totalizer frame to be rocked to move the pinions 68 into and out of mesh with the totalizer actuating racks 67.

Suitable engaging mechanism, as disclosed in the United States patent to Peters, No. 1,386,021, rocks the totalizer frame in adding operations to move the pinions 68 out of engagement with the racks 67 before the rack levers 52 are released by the cross bar 55, and rocks the totalizer frame to engage the pinions with the racks before the beginning of the return of the rack levers to their home position by the cross bar.

The totalizer wheels, therefore, will be operated clockwise in Fig. 1 by the racks, during adding operations, extents corresponding to the values of the keys depressed on the keyboard to enter this amount in the totalizer and add it to any amount previously therein.

Tens transfer mechanism

The tens transfer mechanism disclosed herein is similar to the one shown and described in the United States patent to Peters, No. 1,386,021.

Each totalizer actuating rack 67 (Figs. 24, 25, and 26) is mounted on the upper end of its rack lever 52 for limited movement relative thereto. A spring 69, connected to the rack and to the rack lever 52, continuously urges the rack toward the rearward limit of its movement to provide for an additional movement of the rack to an extent corresponding to that required to enter a value of "one" in the totalizer, but the engagement of a lug 71 on the rack 67 with an abutment 75 on a transfer lever will prevent this movement and will cause the rack to be stopped in the position shown in Fig. 24.

The usual transfer levers 74 are provided between adjacent denominational orders of the totalizer. These levers are pivotally mounted on a rod 73 supported by a series of arms 80 disposed one above each pinion 68 and mounted on a stop rod 78 and another rod 79, which are secured in the side frames 10 and 11. The arms 80 are formed at their forward ends to act as detents for the pinions 68 when the pinions are out of mesh with the racks 67.

Each transfer lever 74 has, at its forward end, a laterally-extending lug 74a, which lies in the path of movement of a transfer cam 18a on one denominational totalizer wheel and has laterally-extending abutments 75 and 76 (Figs. 25, 28 and 29), which cooperate with the lug 71 on the rack 67 of the next higher denominational order, as shown in Fig. 25.

The forward free end of the transfer lever 74 is urged upwardly by a spring 77, connected to the transfer lever 74 and to a forwardly-extending arm 84 of a related transfer lever latch 82, and normally lies in a position where the abutment 75 is in the path of the movement of the lug 71 on the rack, as shown in Fig. 24, to prevent the full movement of the rack to the rear. As the totalizer wheel 18 passes from the position in which it indicates "9" to the position in which it indicates "0," the transfer cam 18a will engage the lug 74a and will depress the end of the transfer lever 74, and this movement of the transfer lever will remove the abutment 75 from the path of movement of the lug 71 and will place the abutment 76 in its path of movement. As seen in Fig. 28, the abutment 76 is located to the rear of the abutment 75 and allows the rack to move the full distance to the rear to cause the entry of a value of "one" in the next higher order in addition to the value which would otherwise be entered.

The position of the transfer levers 74, when the abutments 75 are in the path of the lugs 71, is determined by the engagement of laterally-extending lugs 85 on the downwardly-extending arms 83 of the transfer lever latches 82 with the upper surface of the transfer levers 74 as shown in Fig. 36, a transfer lever latch 82 being provided for each transfer lever 74. The transfer lever latches 82 are pivotally supported on a rod 81 extending through the arms 80 and are individually urged clockwise about the rod 81, as seen in Figs. 35 and 36, by the springs 77, so that, when the free end of any transfer lever 74 is depressed by the transfer cam 18a associated therewith, the lug 85 on the arm 83 will engage over a step on the transfer lever 74, as shown in Fig. 35, and will latch the transfer lever in a position where the abutment 75 is out of the path of movement of the lug 71 on the rack 67. In this moved position of the transfer lever 74, the rack can move until the lug 71 engages the abutment 76 and thus causes the entry of the value of "one" in addition to the value which would otherwise have been entered.

Any transfer lever 74 which is operated by its related transfer cam 18a will be latched in its operated position by the transfer lever latch 82 until the latch is restored by the engagement of one of the members 70 with the forwardly-extending arm 84 of the latch as the totalizer is rocked out of engagement with the racks at the beginning of a subsequent operation of the machine.

While the transfer lever 74 associated with the highest denominational order of the totalizer has no higher order rack to control, the transfer lever is provided and is operated by the transfer cam 18a of its related totalizer wheel in the same manner as the transfer levers for the lower orders and is used to enable the totalizer to control an interlocking mechanism according to whether the total is positive or negative.

Usually the lug 71 on the rack 67 in the units denomination order engages a fixed stop which prevents rearward movement of the rack in all operations to prevent the entry of the additional unit. In the novel machine, however, the fixed stop is not used, and a transfer lever 72 is provided (Fig. 26). This lever 72 is provided with abutments 75 and 76 and is so formed that it will engage the stop rod 78 to position the abutment 75 normally in the path of the lug 71 on the rack 67. Means are provided to rock the transfer lever 72 counter-clockwise (Fig. 24) to the position shown in Fig. 26, at an appropriate time in a negative total recording operation or a negative sub-total recording operation, to remove the abutment 75 from the path of the lug 71 to allow the spring 69 to move the rack relatively to the rack lever 52 until the lug 71 engages the abutment 76, thereby to cause the entry of a unit value in the units denominational order totalizer wheel.

*Driving mechanism*

In the illustrated embodiment of the invention (Figs. 2, 72, and 73), the motive power for operating the machine is obtained from a suitable electric motor 1, which is controlled by a switch 2 in series with the motor, and also by a suitable speed governor switch 3 also in series with the motor. The motor with the switch and governor is connected to line wires $L^1$ and $L^2$. The motor operates, through a suitable speed reduction gearing 4 and a one-revolution clutch mechanism 5, to rotate a crank arm 6. A link 7, which is pivotally connected to the crank arm 6, is also pivotally connected by a pin 7a to an arm 8 loose on the rear shaft 9 but coupled thereto by means of a yieldable driving connection. The yieldable driving connection includes a lever 8a pivoted on the pin 7a and having a roller 8b on the side of the lever 8a which is urged by a spring 8c into a notch in the edge of a plate 9a secured to the rear shaft 9. The spring 8c is strong enough to maintain the roller 8b in the notch in the plate 9a to form a driving connection which transmits the movement of the arm 8 to the shaft 9 in normal operations of the machine. If the shaft 9 is blocked against operation, the spring 8c will yield and allow roller 8b to cam itself out of the notch in the plate 9a to interrupt the driving connection and allow the arm 8 to be driven independently of the shaft 9.

The shaft 9 extends transversely between the side frames 10 and 11 (Fig. 2) and is supported by suitable bearings for oscillating motion therein. Adjacent the side frame 11, the shaft 9 is provided with an upwardly-extending crank arm 12 (Figs. 1 and 2), which, at its upper end, carries a stud 13 pivotally connected to one end of a link 14, the other end of the link being pivotally connected by a pin 15 (Fig. 4) to a full-stroke sector 16, which is fixed on a main shaft 17. The shaft 17 extends transversely between, and is mounted in, the side frames 10 and 11 for oscillation therein, and is parallel to but spaced forwardly from the rear shaft 9. One end of the main shaft 17 extends to the right of the side frame 11 (Fig. 2) a short distance and is formed to receive a handle for manual operation when necessary.

In order to render the driving mechanism operable to cause a machine cycle of operation of the machine, means, including a multi-arm trip lever 127 (Fig. 4), is provided to control means for closing the motor circuit and engaging the clutch mechanism 5 to connect the motor drive to the crank arm 6, which drives the rear shaft 9.

Referring now particularly to Fig. 4, the multi-arm trip lever 127 is pivoted on a stud 128 projecting from the outside face of the side frame 11. A spring 129, connected between the side frame 11 and a laterally-extending lug 138 on a forwardly-extending arm of the lever, normally urges the lever counter-clockwise (Fig. 4) until the lug 138, which extends over the side frame 11, engages the side frame 11 and limits the counter-clockwise movement of lever 127.

The lever 127 is provided with a depending arm 139, which terminates at its lower end in a lateral lug 140 (Fig. 2), to which one end of a link 142 is connected. This link 142 extends rearwardly beneath the machine, and its other end is pivotally connected to a lever 144, which is pivoted on a stud 145 on a bottom frame member 146. The left end of the lever 144, as shown in Fig. 2, extends through a slot 147 (Figs. 2 and 73) provided in a supporting bracket member 148 fixed to the frame of the motor 1, which slot 147 guides the end of the lever 144 and limits its movement.

Fixed on a short shaft 149 (Figs. 72 and 73), which is rockably supported in the motor frame, are a plurality of arms, 150, 151, 152, and 159, which operate with one another as a unit through their connection with the shaft 149, said arms 151 and 152 being integral and spaced from arms 150 and 159 along the shaft 149. The arm 150 has, at its free end, a downwardly-extending nose 153, which nose has a notch 154 at its downward extremity and an inclined cam surface 155 extending upwardly from the notch.

A spring 156 (Fig. 72), acting on the arm 152, urges the shaft 149 counter-clockwise (Fig. 73), but this movement is normally prevented by engagement of the notch 154 in the arm 150 with the upper surface of the lever 144. When the trip lever 127 is rocked clockwise about the stud 128, it will cause the lever 144 to be moved out of the notch 154 and into alinement with the inclined cam surface 155. The removal of the lever 144 from the notch 154 enables the spring 156 to become active and cause the shaft 149 and the arms thereon to rock counter-clockwise. The inclined cam surface 155 will move the lever 144 forward, so that the nose 153 of the arm 150 can drop behind the lever 144 and retain the lever 144 in this position until shaft 149 is restored to normal position and the lever 144 is allowed to return to its position below the notch 154.

When the shaft 149 is rocked counter-clockwise from its normal position, arm 151 thereon, which functions as a stop arm, is removed from engagement with a stop dog 157 on the one-revolution clutch mechanism 5 (Fig. 72) to allow the clutch mechanism 5 to be effective to connect the drive from the speed reduction gearing 4 to the crank arm 6. Also, when the shaft 149 rocks counter-clockwise (Fig. 72), a roller 160 on the arm 159 closes the switch 2 in the motor circuit by engaging a flexible blade 161 of the switch and moving it into engagement with the other blade 162 thereof.

The crank arm 6, which is rotated by the motor when the clutch 5 is effective, carries a cam 163, which, as the crank arm is about to complete a cycle of operation, engages with a roller 164 provided on the arm 152 and rocks the arm 152 clockwise (Fig. 72) to restore the shaft 149 to normal position. This moves the nose 153 of the arm 150 from in back of the lever 144, and thereupon the spring 129 (Fig. 4) rocks the lever 127 in a direction to replace the lever 144 fully in the notch 154, which holds the arm 150 elevated and the stop arm 151 in the path of the stop dog 157, thus terminating a cycle of operation. The restoring movement of the shaft 149 also removes the roller 160 from the flexible switch blade 161, which blade 161 normally returns to open-circuit position when released by the roller 160.

Accordingly, when the trip lever 127 is rocked clockwise (Fig. 4) about stud 128, it will remove lever 144 from blocking relation with the arm 150 to release the shaft 149 for counter-clockwise movement (Fig. 72), so that arms thereon can cause the motor circuit to be closed and the clutch 5 to connect the shafts 9 and 17 of the machine to the motor for a cycle of operation. Near the end of the cycle of operation, shaft 149 is restored, and the lever 144 can return to blocking relation with arm 150.

The following means are provided to rock the trip lever 127 to initiate an operation of the machine for addition.

A bell crank lever 133 (Fig. 4), having an upstanding arm 134, is pivotally mounted on a stud 131 carried by the trip lever 127 eccentrically of the stud 128. The arm 134 is provided with a laterally-extending lug which extends directly behind an upstanding arm 135 of the lever 127 and is urged into engagement with this arm by a spring 136, which is connected to the laterally-extending lug and to the lug 138 on the forwardly-extending arm of the trip lever 127. The spring 136 is strong enough to maintain the lug on arm 134 normally in engagement with the upstanding arm 135, but allows independent clockwise rotation of the bell crank 133 relative to the trip lever 127 if the trip lever should be blocked when the bell crank is operated.

Also pivotally mounted on the stud 131 is an addition lever 130, which carries a pin 137 extending over the bell crank 133, so that, when a stud 132 on the end of the lever 130 is depressed, the pin 137 will engage a rearwardly-extending arm of the bell crank 133 and will cause a downward thrust on the bell crank 133. Since the spring 136 maintains the laterally-extending lug on the arm 134 of the bell crank 133 in engagement with the upstanding arm 135, the downward thrust on the bell crank 133 will be transmitted to the trip lever 127 and will cause the trip lever to rock clockwise about the stud 128 (Fig. 4) and cause the motor circuit to be closed and the clutch to be rendered operative.

The addition lever 130 can be depressed by mechanism shown in Fig. 71 when it is desired to perform an addition operation in the machine. An addition touch bar 410 is carried on a lever 411 extending through a slot in the top of an outer casing 141 of the machine. The lever 411 is pivotally connected by a pin 413 to an addition lever actuating member 414. The lower extremity of the lever 411 is provided with a slot 415 operatively engaging a fixed stud 416 secured to the inner face of the side wall of the outer casing 141. The actuating member 414 is mounted to swing about a stud 417 secured to a bracket 417a on the inner face of the side wall of the outer casing 141, and springs 418 and 419, operatively connecting the member 414 with an arm on the bracket 417a and with the lever 411 of the touch bar 410, respectively, act to retain the touch bar 410, the lever 411, and the actuating member 414 in their upper positions, shown in Fig. 71, in which positions the lower end of the slot 415 in the lever 411 is in engagement with the stud 416. At this time, an abutment 420 at the rear, upper end of the member 414 is yieldingly held in engagement with a stop 421 on the top of the outer casing 141. The member 414 has a depending lug 422, which engages the stud 132 on the addition lever 130, as shown in Fig. 71, so that, when the addition touch bar 410 is depressed, the lug 422, by its engagement with the stud 132, will depress the addition lever 130 and, through the engagement of the stud 137 with the upper edge of the bell crank 133, will cause the bell crank to rock the trip lever 127 and set the machine into operation to perform addition.

*Subtraction mechanism*

The machine is also provided with a mechanism similar to that disclosed in the United States patent to White, No. 1,845,875, for performing subtraction by complementary addition.

When subtraction is performed by complementary addition, the amount to be subtracted is set up on the keyboard, and the tens complement of this amount is entered additively into the totalizer to be added to the amount previously contained therein; consequently, the totalizer wheels are rotated in the same direction in a subtraction operation as in an operation of the machine for addition, and the operation of the tens transfer mechanism in carrying amounts between adjacent wheels of the totalizer is the same in both kinds of operations.

In order to obtain the complement of the amount to be subtracted, the following means are provided.

As explained earlier herein, each of the differentially operable means includes an arm 64 (Figs. 1, 5, 7, 9, and 11), which carries the coupling pin 63. This arm is rotatable freely on the shaft 20 and, in the operation of the machine to perform addition, is in a position where the pin 63 couples the diverging lever 51 and the rack lever 52 for joint operation.

Secured to the arm 64, and to the left thereof (Fig. 7), is an arm 64a, which, during the operation of the machine for addition, lies to the left of a stud 67a on the stop bar 66 and moves with the arm 64 but without exerting any control.

While the arms 64 and 64a associated with the various differentially operable means are freely rotatable on the shaft 20, they are secured against movement longitudinally of the shaft and will move with the shaft when it is moved longitudinally.

Figure 7:
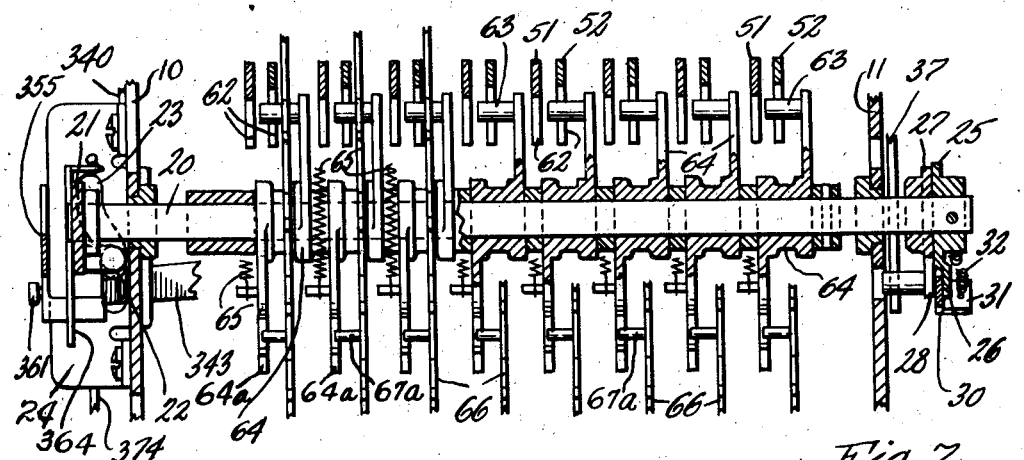
Fig. 7 is a transverse horizontal section of the shaft and associated parts which are shifted to the right of the machine in subtraction operations.

In an operation of the machine for subtraction, the shaft 20 is given a movement to the right of the machine to shift the arms 64 and 64a to the right relative to their related differentially operable means until they occupy the position shown in Fig. 7. As shown in Fig. 7, this shifting of the arm 64 has moved the pin 63 out of engagement with slot 62 in the diverging lever 51 to uncouple the rack lever 52 therefrom, and at the same time the arm 64a is shifted into engaging relation with the stud 67a on the stop bar 66.

A spring 65 (Figs. 9 and 11), which is provided for each differentially operable means, is connected between the diverging lever 51 and its related arm 64a and urges the arm 64a into engagement with the stud 67a in subtraction operations. This spring is also effective, through the arms 64a and 64 and the pin 63 to urge the rack lever 52 forwardly, so that the rack lever can be set differentially when the cross bar 55 moves away from it during the first part of a machine operation.

The stud 67a on the stop bar 66 is so located thereon and in relation to the arm 64a that, in orders above the units denominational order, when the arm 64a is moved by the spring 65 to engage the stud 67a, the rack lever 52 will be operated an extent to cause the value of "nine" to be entered into the totalizer when the stop bar is held against movement by the usual zero stop and will be operated an extent to enter the nines complement of any value which the stop bar represents by its forward movement.

The stud 67a on the stop bar 66 in the units denominational order cooperates with its related arm 64a in a similar manner but is so located on the stop bar 66 and in relation to the arm 64a that, when the arm 64a is moved by the spring 65 to engage the stud 67a, the rack lever 52 in this order can be operated to cause the value of "ten" to be entered into the totalizer when the stop bar is held against movement by the usual zero stop and to cause the entry of the tens complement of any value which the stop bar 66 represents by its movement.

It should be noted that, while the rack levers 52 are operated respectively according to the nines complement and the tens complement of the digits of the amounts to be subtracted, as explained above, the diverging levers 51, which are connected to the stop bars 66, will be operated according to the various digits of the amount and will set the amount type bars 51a to print the true amount that is being subtracted.

Accordingly, in an operation of the machine for subtraction, the amount type bars will be operated to print the amount being subtracted, and the rack levers will be operated to enter the tens complement of this amount, additively, into the totalizer.

The means for shifting the shaft 20 to the right to render the differentially operable means operable to enter the tens complement of the amount to be subtracted will now be described.

The shaft 20 has fixed thereon an arm 21 (Figs. 2, 34, 39, and 62 to 66), which carries a roller 22 rotating about an axis approximately radial to the shaft 20, and this roller 22 is received in a cam slot 23 (Fig. 2) provided in a bracket 24 fixed on the outside of the side frame 10. The cam slot 23 has two offset portions connected by an oblique section, and, as the arm 21 rocks counter-clockwise (Fig. 34) with the shaft, the roller 22 will move forward in the slot 23 and will cause a shifting of the shaft 20 endwise to the right, as shown in Fig. 2. A spring 21a (Fig. 34), connected between arm 21 and the frame, continuously and yieldingly urges arm 21 and shaft 20 clockwise (Fig. 34), tending to maintain the shaft 20 in adding position.

Accordingly, each time the shaft 20 is rocked counter-clockwise (Fig. 34), the roller 22, cooperating with the cam slot 23, will shift the shaft longitudinally to the right of the machine.

In the above-mentioned White patent, the shaft is rocked manually, but in the instant machine the shaft 20 is rocked and shifted by power in a manner which will now be explained.

Figure 6:
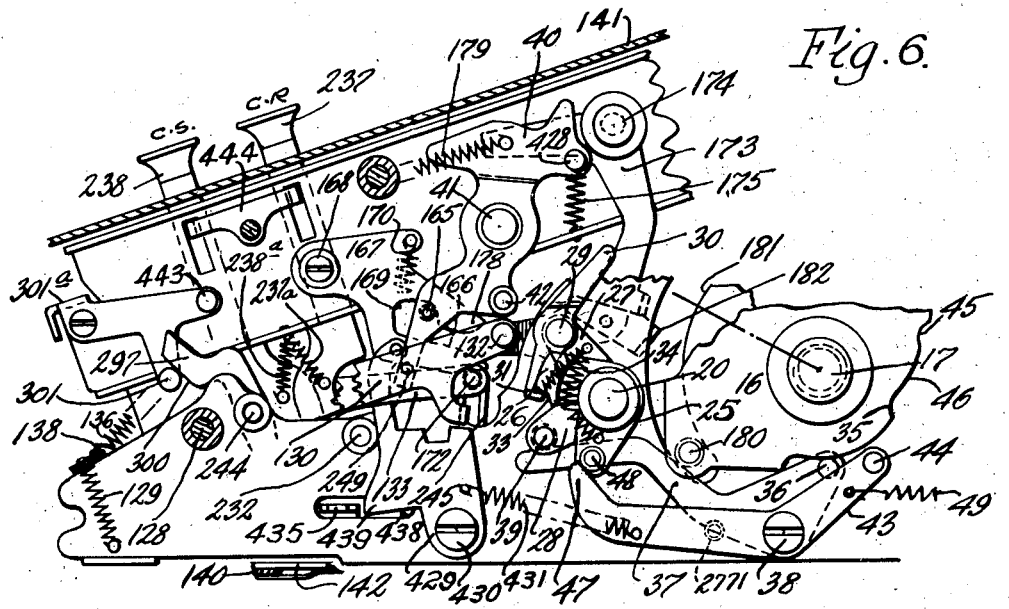
Fig. 6 is a view similar to Fig. 4, but with the parts in position for a subtraction operation.

Pivoted on a stud 41 (Fig. 4), on the right side of the keyboard, is a subtraction control lever 40, which is rocked from its normal position, as shown in Fig. 4, clockwise to the position shown in Fig. 6 each time the machine is to perform an operation of subtraction. The subtraction control lever 40 controls the rocking means for the shaft 20 and enables the rocking means to be operable in subtraction operations as follows.

On the outside of the side frame 11 (Figs. 2 and 4), at the right-hand side of the machine, the shaft 20 has fixed thereon a bell crank formed by arms 25 and 26 (Figs. 2, 3, 4, 6, 7, and 8). Alongside the bell crank formed by the arms 25 and 26, and free on the shaft 20, is a bell crank made up of the arms 27 and 28. The arm 27 has, near its free end, a stud 29, upon which a coupling lever 30 is pivoted. The lower end of the coupling lever 30 is formed with laterally-extending ear 31, which is yieldingly urged by a spring 32 toward the end edge of the arm 26. The arm 26 has in its edge a notch with a shoulder 33, into which the ear 31 may engage, under action of the spring 32, when the coupling lever 30 is released and the arm 27 is rocked relatively to the arm 26. A coil spring 34 is connected between the arm 27 and the arm 25, so as to urge the arm 27 normally counter-clockwise (Figs. 3 and 4) until the ear 31 is approximately alined with the notch having the shoulder 33, as shown in Fig. 4, so that, unless the coupling lever 30 is restrained against the action of spring 32, the ear 31 will enter the notch and engage the shoulder 33 to couple the arm 27 to the arm 26 secured to the shaft 20.

The bell crank formed by the arms 27 and 28 is given a positive operation clockwise (Fig. 4) during the first part of a machine operation, and, when the arm 27 is coupled to the arm 26 on the shaft 20, this positive movement of the bell crank is transmitted to the shaft 20 to provide a similar clockwise movement thereto. When the shaft 20 is rocked in a clockwise direction in Fig. 4 and in a counter-clockwise direction in Fig. 34, it will also be shifted to the right of the machine by the cooperation of the roller 22 and the cam slot 23. At the same time, the operation of the arm 21 will tension the spring 21a.

The means for imparting clockwise movement to the bell crank formed by the arms 27 and 28 is shown in Figs. 3, 4, and 6. Referring particularly to Fig. 4, the full-stroke sector 16 is provided with a cam surface 35, against which rides a roller or pin 36 carried on a lever 37 pivoted on a stud 38 on the side frame 11. The lever 37 has a tail which engages beneath a roller 39 rotatably mounted on and extending sidewise from the arm 28 of the free bell crank. Thus, when the full-stroke sector 16 rocks counter-clockwise (Fig. 4), the cam surface 35 will rock the lever 37, and the latter, by engagement with the roller 39, will rock the bell crank formed by the arms 27 and 28 clockwise (Fig. 4) to the position shown in Fig. 3, during which movement it tensions the spring 34.

If the arm 27 is coupled to the arm 26, the spring 34 will be tensioned to a slight degree, but, if the arm 27 is not coupled to the arm 26, the spring will be tensioned to a much greater extent by the relative movement between the two arms, as shown in Fig. 3.

Figures 8, 8A:
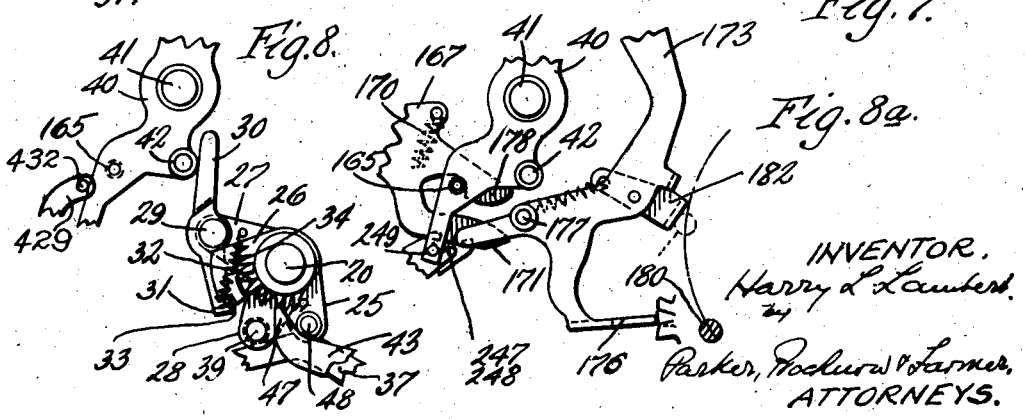
Figs. 8 and 8a are fragmentary side elevations of some of the parts shown in Figs. 4 and 6, but with these parts disposed in other positions.

When the full-stroke sector 16 returns to its normal home position (Fig. 4), the spring 34 will return the bell crank, formed by the arms 27 and 28, from its moved position, shown in Fig. 3, back to its home position, shown in Figs. 4 and 8.

The subtraction control lever 40 carries a stud 42 in a position to engage the tail of the coupling lever 30, when the subtraction control lever 40 is in its non-operated position, as shown in Fig. 4, and hold the coupling lever 30 in a rocked position in which the ear 31 is out of the notch having the shoulder 33, so that, when the bell crank, formed by the arms 27 and 28, is rocked through the action of the full-stroke sector, the coupling lever 30 will be held out of the notch and free of the shoulder 33 until the ear has passed beyond the notch, in which case the ear 31 then rides upon the end edge of the arm 26. From this it will be observed that, when the subtraction control lever 40 is in its normal, inoperative position (Fig. 4), the machine is set for addition, and the operation of the full-stroke sector 16 will merely rock the bell crank formed by the arms 27 and 28 idly. Under these conditions, there will be no actuation of the arm 26 and the shaft 20. If, however, the subtraction control lever 40 is operated into the position shown in Figs. 6 and 8 to cause a subtraction operation, the stud 42 will move to the left from the position shown in Fig. 4 to that shown in Figs. 6 and 8, so that the coupling lever 30 may now swing upon its pivot 29 under the action of spring 32, which urges the tail of the lever in a direction to follow the stud 42, and the ear 31 on the coupling lever 30 can enter the notch in the arm 26 and engage behind the shoulder 33, as shown in Fig. 8. With the parts in these positions, it will be observed that, when the full-stroke sector 16 is rocked counter-clockwise (Figs. 4 and 6), as usual in this type of machine, the resulting rocking movement of the bell crank formed by the arms 27 and 28, which has just been explained, will, through the engagement of the ear 31 with the shoulder 33, rock the arm 26 clockwise (Figs. 4 and 6). Since the arm 26 is fixed on the shaft 20, it will cause a corresponding clockwise movement (Fig. 3) of the shaft 20. This movement of the shaft causes the roller 22 (Figs. 2, 34, 39, and 41) to move along the cam slot 23, which will cause an endwise movement of the shaft 20, from the position shown in Fig. 2 to that shown in Fig. 7.

This rocking of the bell crank formed by the arms 27 and 28 and, through it, the rocking of the bell crank formed by the arms 25 and 26 and the shaft 20 connected thereto, which have just been explained, occur at the beginning of the forward movement of the full-stroke sector 16. It will be noted that the initial movement of the sector 16 causes the cam surface 35 to shift the stud 36 downwardly, and thereafter the stud 36 rides on an arcuate edge of the full-stroke sector 16, which edge is concentric to the axis of the shaft 17, so that the shaft 20 will be held in its moved position during the remainder of the forward stroke of the full-stroke sector 16. In fact, the parts will be held in their moved positions (Fig. 3) until the full-stroke sector has practically completed its return to normal position (Fig. 4), at which time the stud 36 can ride along the cam surface 35 of the full-stroke sector and thus release the bell crank formed by the arms 27 and 28 and the shaft 20, which is coupled thereto. When the shaft 20 is released in this manner, spring 21a returns it and the arms 25 and 26 to normal adding position. As the shaft 20 is returned to its normal position, the spring 34, connected between the arm 25 and the arm 27, restores the bell crank formed by the arms 27 and 28 to its normal position.

In order to insure that the shaft 20 will be returned fully to its normal adding position at the end of each subtraction operation, the following means are provided.

Freely pivoted on the stud 38 (Fig. 4) is a lever 43, which has at its rear end a stud or roller 44, which also can bear against the edge of the sector 16; however, when the sector 16 is in its home position (Fig. 4), the roller 44 is opposite a clearance notch 45 in the edge of the sector 16. The lever 43 is urged clockwise (Fig. 4) by a spring 49 to maintain a tail portion 47 of the lever 43 in engagement with a stud 48 carried by the arm 25, which is secured to the shaft 20.

The edge of the sector 16 which will be opposite the roller 44 during the operation of the machine is so shaped as to have a decreasing radius between the notch 45 and the cam surface 35, forming a cam surface 46. In an early part of a subtraction operation, when the shaft 20 is rotated by the bell crank formed by the arms 27 and 28, the stud 48 will cam the lever 43 counter-clockwise (Fig. 4). At this time, the sector 16 will have moved so that the portion of the sector 16 having the smaller radius will be opposite the roller 44, and the lever 43 will be free to move the roller 44 toward the shaft 17. During the return movement of the sector 16, the roller 44 will be engaged by the cam surface 46 and will restore the lever 43 to its initial position. During the restoration of the lever 43, the tail portion 47 thereof will engage the stud 48 on the arm 25 and will return the arm 25 and the shaft 20 to their normal adding position at the end of the operation.

In an operation of the machine for addition, however, the shaft 20 is not shifted, and the stud 48 engaging the tail portion 47 of the lever 43 will enable the spring 49 to maintain the lever 43 in the position shown in Fig. 4, even though the portion of the cam surface 46 having the smaller radius has moved opposite the roller 44.

It is apparent from the above, therefore, that, when the subtraction control lever 40 is set to cause a subtraction operation and the coupling lever 30 is released while in the position shown in Fig. 4, the ear 31 of the lever will engage with the shoulder 33 on the arm 26, and, as the sector 16 begins its stroke, the cam surface 35 will rock the lever 37 in a direction to operate the bell crank lever formed of arms 27 and 28 and carry with it the bell crank formed by the arms 25 and 26 and thereby operate the shaft 20, as explained previously. When the sector 16 returns to its home position and just before it reaches that position, the cam surface 46 on the edge of the sector 16 will engage the roller 44 on the lever 43 and rock the lever 43 clockwise in Figs. 3 and 4 and, through engagement of the tail 47 of the lever 43 with the stud 48 on the arm 25, will rock the bell crank formed by arms 25 and 26 and through it the shaft 20 counter-clockwise (Figs. 3 and 4) to restore the shaft 20 to its home or adding position. The return of the bell crank formed by the arms 25 and 26 is effective, through the spring 34, to return the bell crank formed by the arms 27 and 28 to the initial position, shown in Fig. 4.

When the subtraction control lever 40 is moved into the position shown in Fig. 6, a spring 179 connected thereto will be tensioned, so that retaining means must be provided to maintain the subtraction control lever 40 in its moved position, which retaining means is also effective to cause an operation of the trip lever 127 to render the driving mechanism operable in subtraction operations. These means and their operation will now be explained.

The subtraction control lever 40 has thereon a stud 165, which extends into a slot 166 in a latch 167 pivoted on the stud 168 on the side of the keyboard. A spring 170, acting between the bottom plate of the keyboard and the latch 167, urges the latch clockwise, as viewed in Fig. 4, to maintain the upper edge of the slot 166 in engagement with the stud 165. As the subtraction control lever 40 is rocked clockwise about the stud 41 from the position shown in Fig. 4 to the position shown in Fig. 6, the stud 165 will move along the upper edge of the slot 166. Near the end of its movement, the stud 165 will move opposite an enlarged recess 169, formed at the inner end of the slot 166, and the spring 170 will rock the latch 167 clockwise until the upper edge of the recess engages the stud 165, as shown in Fig. 6. This will retain the subtraction control lever 40 in its moved position.

A latch 173, which is provided usually to retain the non-add lever and the total key in operated position, is used to release the latch 167 for the subtraction control lever 40. The latch 173 (Figs. 4, 6, and 8a) is pivoted on a stud 174 on the side of the keyboard and is urged counter-clockwise (Figs. 4 and 6) by a spring 175. A depending rearwardly-extending tail 176 (Figs. 8a, 42, 44, 46, and 47) on the latch 173 limits the counter-clockwise movement of the latch by engaging a bell crank 271 and plates as 116 and 270, which are positioned by a total and subtotal lever 99 and a non-add key 108, respectively. A roller 177 (Fig. 8a), carried by the latch 173, is engageable with an end 178 of the subtraction control lever latch 167 when the latch 173 is rocked clockwise (Fig. 8a) and rocks the latch 167 counter-clockwise (Fig. 8a) to a position in which the notch 169 clears the stud 165 on the subtraction control lever 40 and allows the spring 179 (Figs. 4 and 6) to return the subtraction control lever 40 to its normal position.

The latch 173 is rocked clockwise near the beginning of the return stroke of the shaft 9 and the main shaft 17 by the following means:

Referring now to Figs. 4 and 6, the full-stroke sector 16 is provided with a roller 180, which extends through an arcuate slot 181 in the side frame 11, and, during the forward movement of the sector, the roller 180 engages and passes idly by a by-pass pawl 182 pivoted on the latch 173 without causing any movement of the latter. As the full-stroke sector 16 returns to its original position, the stud 180 engages the by-pass pawl 182 and, through the latter, rocks the latch 173 clockwise (Fig. 8a) and thus carries the roller 177 against the end 178 of the latch 167 and causes a release of the subtraction control lever 40.

The latch 167 has a tail 171 (Figs. 4 and 8a) for engaging a stud 172, which is carried by the bell crank 133 and extends through an opening in the side frame 11 into the path of movement of the tail 171. As the latch 167 rocks into position to retain the subtraction control lever 40 in its operative position, the tail 171 will depress the stud 172 carried by the bell crank 133 and will rock the bell crank 133, and thereby the trip lever 127, to render the driving mechanism operable to drive the machine.

When the machine is to be operated in an operation in which an amount on the keyboard is to be subtracted from an amount on the totalizer, the subtraction control lever 40 is rocked by a subtraction touch bar 425 (Fig. 71), which is located to the right of the keyboard and adjacent the addition touch bar 410. The subtraction touch bar 425 is provided with a depending shank 426 extending through a slot in the top of the outer casing 141 of the machine, thence forwardly to form a lever 427, which terminates in a pivotal connection with the stud 417, upon which the addition lever actuating member 414 is pivoted. The lower edge of the lever 427, adjacent the shank 426, bears on a stud 428 on the subtraction control lever 40, so that, by depression of the subtraction touch bar 425, the lever 427, by its engagement with the stud 428, will cause the subtraction control lever to swing clockwise about the stud 41, as seen in Fig. 4, to move the control lever from its normal inoperative position, shown in Fig. 4, to its operative position, shown in Fig. 6.

In order to provide for the printing in red of any amounts that are subtracted, the machine is supplied with a two-color ribbon and a ribbon shifting mechanism by which the ribbon is shifted vertically to present different color zones in printing position. This mechanism is fully described in the White patent and will be but briefly described herein.

Normally, the ribbon is positioned with a black zone of the ribbon in printing position, but the following mechanism is effective to raise a ribbon supporting means to place a red zone in printing position when desired.

Referring to Figs. 34, 39, and 40, a dog 120 is pivoted on a stud 121 in the end of an arm 121a secured on the usual rock shaft 122a. Shaft 122a, which corresponds to shaft 172 shown in the Peters Patent No. 1,386,021, is driven counter-clockwise (Fig. 34) from a home position and back to home position in each machine operation by means of a linkage, shown in the Peters patent, which connects shaft 122a for operation by the rear shaft 9.

The dog 120 is spring-urged clockwise (Fig. 34) about the stud 121 and is provided at one end with a laterally-extending lug and at the other end with a roller 122, which cooperates with the cam end of a cam arm 123 (Figs. 34, 39, and 40) of a bail 124, which is pivoted on a total lever shaft 100.

The bail 124 is normally urged by a suitable spring into the position where the cam end of the arm 123 engages the roller 122 to position the dog 120 with the bent-over ear out of the notch in the edge of a ribbon shifting cam, so that the dog will have no driving engagement with the shifting cam and will operate idly relatively thereto when the shaft 122a is operated.

When the shaft 20 rocks counter-clockwise (Figs. 34 and 62) in a subtraction operation, a roller 383 on the arm 21 will engage one side of a notch 385 in a bell crank 379 and will rock the bell crank about a stud 380 on the side frame 10 against the tension of the spring 381. A link 125 is connected at one end to one arm of the bell crank 379 by a pivot pin 382 and has at its other end a slot which receives a stud carried by the other arm of the bail 124. This rocking of the bell crank 379, as shown in Fig. 62, will draw the link 125 downwardly to rock the bail 124 and withdraw the cam arm 123 from engagement with the roller 122 to allow the spring to rock the dog 120 clockwise about the stud 121 to engage the bent-over ear on the dog 120 in the notch in the edge of the shifting cam (see Fig. 39). When the shaft 122a rocks, it will operate the shifting cam and raise the ribbon supporting frame to place the red portion of the ribbon in printing position.

As the shaft 20 returns to its home position near the end of a subtraction operation, the bell crank 379 will be rocked clockwise by the spring 381 and will raise the link 125 to allow the bail 124 to return to its normal position, where the arm 123 engages the roller to render the ribbon shifting means inoperative.

Non-add mechanism

The instant machine is provided with the usual form of non-add mechanism which controls the totalizer engaging mechanism to prevent the engagement of the totalizer with the racks during the rearward movement of the racks, and consequently prevents the entry of the amount therein. This mechanism is fully shown and described in the United States patent to Peters, No. 1,386,021, and will be described herein only to bring out how this mechanism is coordinated with the novel mechanisms. For further details of the non-add mechanism, reference may be had to this Peters patent.

The non-add key 108 (Figs. 46, 47, and 67) and an arm 110 are loosely mounted on the rod 79, which is secured in the side frames 10 and 11. The usual non-add link 111 is connected at its upper end to the arm 110 by a pivot pin 119 and is connected at its lower end to the latch plate 116 by a pin 115. The non-add key 108 is normally in the position where it engages a pin 109 in the side frame 11, and has an arm 118, which engages under the pin 119 to maintain the link 111 normally in the position shown in Fig. 46. The non-add link 111 is urged downwardly by a spring in the manner explained in the Peters patent.

The non-add latch plate 116 (Figs. 46, 52, and 53) is rockably mounted on a bearing shank 269 of a stud 117 mounted on the side frame 11 and has a forwardly-projecting finger 288, which, in the normal position of the link 111, lies below the tail 176 of the latch 173. The latch plate 116 is formed with a hub which extends along the shank of the stud 117, and mounted on this hub, beside the latch plate 116, is a plate 270, which has a finger 285, with which the tail 176 of the latch 173 engages when the non-add key 108 is in its normal position. A pin 286 on the latch plate 116 extends into the notch 287 in the plate 270 and enables the plate 270 to be moved by the latch plate 116.

When a non-add operation is desired, the non-add key 108 is rocked counter-clockwise (Fig. 67) from its normal position, shown in dot-and-dash lines, to its position shown in full lines, and its arm 118 will raise the non-add link 111, which in turn will rock the plate 116 counter-clockwise (Fig. 46) about the stud 117. The initial movement of the latch plate 116 will not move plate 270, due to the clearance between the pin 286 and the upper edge of the slot 287, but, as the finger 288 is moved opposite the tail 186, the pin 286 will engage the edge of the notch 287, and the plates 116 and 270 will move together until the fingers 285 and 288 move above the tail 176, which is then free, and the spring 175 can move it under the fingers to latch the non-add mechanism in moved position until the latch 173 is rocked clockwise (Fig. 6) shortly after the sector 16 begins its clockwise return movement, as explained earlier herein.

When the tail 176 of the latch 173 moves under the fingers 285 and 286, the forward extension of the latch, which carries the roller 177, will engage the stud 172 on the bell crank 133 and depress the stud to cause the bell crank to rock the trip lever 127, which causes the driving mechanism to function in the manner explained earlier herein.

The non-add link 111 is formed with the usual rearwardly-extending arm 112, by which it can control the totalizer engaging means to prevent the engagement of the totalizer with the racks when the link 111 is raised. The manner in which the arm 112 controls the engaging means is fully described in the Peters Patent No. 1,386,021.

Space stroke lock

The machine is provided with the usual space stroke locking means for the total and sub-total lever 99, which means is fully shown and described in the United States patent to Peters, No. 1,646,105, and will be but briefly described herein. This locking means compels a blank or spacing stroke to be made after any amount-entering operation to insure that any operated transfer levers will be restored before the total and sub-total lever 99 can be operated to initiate a total or a sub-total recording operation when the total is positive.

Mounted on a stud 90 (Fig. 46) is a space stroke locking lever 96, which, at its upper end, carries a pin 97 adapted to enter a notch 98 in the total and sub-total lever 99, which is mounted to rock on the shaft 100. Whenever the lever 96 is in locking position, the pin 97 is in the notch 98, and the total and sub-total lever 99 is locked against movement. The locking lever 96 is urged clockwise about the stud 90 by a spring 354, which tends to move the pin 97 into the notch 98.

The locking lever 96 carries a by-pass pawl 101 on a rearwardly-extending arm. This pawl 101 cooperates with the stud 13 on the crank arm 12 on the rear shaft 9, the cooperation of the pawl 101 and the stud 13 being such that, if the lever 96 is in locking position, the stud 13 passes the pawl 101 idly on the forward stroke of the arm but engages the pawl at the beginning of the return stroke to rock the lever 96 counter-clockwise to remove the stud 97 from the notch 98 to unlock the total and sub-total lever.

Extending rearwardly from and secured to the locking lever 96 is an arm 102, which terminates in a lug 103, which can be engaged by a notch 104 in one arm of a bail 105 when the lever 96 has been moved counter-clockwise to remove the stud 97 from engagement with the notch 98 and enables the bail 105 to retain the lever 96 in its unlocking position. The bail 105 is pivoted on pins 106, and a spring 107 (Fig. 61), connected to the bail 105, urges it in a direction to carry the notch 104 into latching engagement with the lug 103. The horizontal member of the bail 105 (Fig. 61) lies closely adjacent the forwardly-extending lower ends of the amount type bars 51a (Fig. 1) in the manner shown in the above-mentioned Patent No. 1,646,105, and any movement of the type bars, in setting up an amount to be printed, will rock the bail 105 and move the notch 104 from the lug 103 to allow the locking lever 96 to be moved clockwise (Fig. 46) by spring 354 to engage the pin 97 in the notch 98 and lock the total and sub-total lever 99 against movement.

If, in the operation being performed, any amount type bars had been set to printing position, their forwardly-extending lower ends, during their return movement, would engage the bail 105 after the locking lever 96 had been moved to unlocking position by the engagement of the pawl 101 by the stud 13 and would rock the bail to remove the notch 104 from engagement with the lug 103 to release the locking lever 96 for movement by spring 354 to engage the stud 97 in the notch 98.

In the blank or idle spacing operation, no amount type bars are set to printing position, and the notch 104 in the arm of the bail 105 will remain in engagement with the lug 103 on the arm 102 to retain the locking lever 96 in its moved or unlocking position. In this position of the locking lever 96, the stud 97 is out of engagement with the notch 98, and the total and sub-total lever can be operated. Thus the total lever 99 will be locked against movement after any amount-entering operation in which any type bar has been displaced from its home position, and compels a blank or idle operation to be made before the total and sub-total lever 99 can be operated to cause a total or a sub-total recording operation.

Positive total- and sub-total-taking means

When the total in the totalizer is positive, the total may be recorded in the well-known manner and by the well-known total- and sub-total-taking means fully described in the United States patents to Peters and White referred to earlier herein.

In a total-taking operation, the zero stops are removed from in front of the stop bars 66, and the totalizer is retained in mesh with the racks during their forward movement, which causes the wheels to be rotated clockwise (Figs. 24 and 26) until the straight forward face of the transfer cams 18a engage the laterally-extending lugs 14a of the transfer levers 74 to stop the totalizer wheels in their zero positions.

This positions the differentially operable means according to the various digits of the total and sets the amount type bars 51a so that the amount of the total can be printed.

It will be noted that, in this operation, the wheels of the totalizer were cleared or set to their zero positions by rotation in a direction which is opposite to that which takes place in amount-entering operations.

At the beginning of the second half of the machine cycle of operation, before the cross bar 55 begins to return the racks, the totalizer is disengaged from the racks and accordingly remains in its cleared or zeroized condition.

A sub-total-taking operation is similar to the total-taking operation but differs therefrom in that the totalizer remains in engagement with the racks during their return movement, and the amount of the total is re-entered into the totalizer.

Only those details of the positive total- and sub-total-taking means which are necessary to show the relation of these means to the negative total-taking means will be given herein. For further details of the positive total- and sub-total-taking means, reference may be had to the Peters and White patents.

Extending downwardly from the total and sub-total lever 99 (Fig. 46) is the usual link, as 99a, which is connected at its lower end to a horizontal arm of the bell crank, as 294, a portion of a downwardly-extending arm of which is shown in Fig. 42. When the total and sub-total lever 99 is moved to cause either of these operations to take place, the lower end of the bell crank 294 will be moved to the rear of the machine, or to the left as seen in Fig. 42.

The lower end of the bell crank 294 is pivotally connected by a pin 293 to the rear end of a link 214. The forward end of the link 214 is provided with an elongated slot 295, through which extends a stud 296 on the depending end of a key release lever 297, which is pivoted on a stud 244 on the side frame 11. A spring 299 is connected between the link 214 and the frame of the machine and urges the link to the right as seen in Fig. 42.

The key release lever 297 terminates at its upper end in a cam surface 300 (Figs. 4 and 5), which engages with a stud 301 on a rearwardly-extending arm of the usual key release bail 301a to release the keys and also remove the zero stops from in front of the stop bars when the link 214 is moved to the left by the operation of the total and sub-total lever 99 to initiate a total- or sub-total-taking operation.

The bell crank 271 (Fig. 42) has a depending arm with a slot 291, which engages a pin 292 on the link 214 and enables the bell crank to be rocked clockwise (Fig. 42) by the link 214 when the link is moved to the left by the lever 99. As seen in Figs. 42, 43, and 52, the bell crank 271 has, at its forward edge, a finger which can co-operate with the tail 176 of the latch 173. A stud 2691 on the bell crank extends over the upper forward edge of the plate 270 and is effective, when the bell crank 271 is moved clockwise to position the finger thereon beside the finger 285 on the plate 270, to engage the plate and move the plate with the bell crank until the fingers are below the tail 176. This allows the tail to move over the fingers to latch the total and sub-total lever 99 in its operated position.

The plate 270 (Fig. 46) carries a pin 289, which rides on the upper edge of the bell crank 271, and the cooperation of this pin with the bell crank 271, together with the engagement of the lower surface of the notch 287 in the plate 270 with the pin 286 in the non-add latch plate 116, positions the plate 270 in its normal position, in which the finger 285 is opposite the tail 176.

This movement of the tail 176 on the latch 173 to latching position causes the latch to rock counter-clockwise (Fig. 6) and enables the forward extension of the latch 173 to engage the stud 172 on the bell crank 133 to operate the trip lever 127 and render the driving mechanism operative, as explained earlier herein.

The total and sub-total lever 99 will be released when the latch 173 is rocked clockwise (Figs. 4 and 8a) by the engagement of the pin 180 with the by-pass pawl 182 during the first part of the return movement of the sector 16, as explained earlier herein.

Accordingly, when the link 214 is moved to the left in Fig. 42, it will render the latching means operative to retain the lever 99 in its moved position, will operate the key release bail 301a, and will cause the driving mechanism to be operative.

*Negative total-taking mechanism*

When the total in the totalizer is negative, the wheels of the totalizer will be set to represent the tens complement of the true value of the negative total, and the usual method of taking a total, as used when the total is positive, cannot be used.

In order to perform a total-taking operation to record the true value of the negative total and to cause the totalizer to be cleared, novel means are provided which operate to produce this result during two machine cycles of operation of the machine which occur automatically in succession.

During the first machine cycle of a negative total-taking operation, a value of "one" is subtracted from the tens complement of the negative total to change this tens complement of the negative total to the nines complement. This subtraction is accomplished by adding the tens complement of "one" to the tens complement of the negative total.

During the second machine cycle of a negative total-taking operation, the totalizer controls the setting of the amount type bars and the racks according to the nines complement of the nines complement of the negative total. This enables the true negative total to be printed. In this cycle, the totalizer is engaged with the racks, and the nines complement of the nines complement is entered in the totalizer and added to the amount therein to bring all the wheels to their nine position. After the printing of the true negative total has taken place and after the wheels have been set to their nine position, a value of "one" is entered into the lowest denominational order wheel of the totalizer, additively, to turn this wheel to zero and, through the successive operation of the transfer mechanism between higher orders, to bring all of the wheels of the totalizer to their zero or cleared positions.

To illustrate further the steps which occur in the operation in which the negative total is recorded and the totalizer is cleared, the various steps which take place in the performance of the problem of subtraction of 257 from 234 to obtain a negative total of 23 and in the recording of the negative total and the clearing of the totalizer will be tabulated.

The amount in the totalizer before subtraction will be _____ 000234
Subtract by adding the tens complement of 257 _____ 999743
The result is the tens complement of the negative total, 23 _____ 999977
To take the total, "one" is subtracted by adding the tens complement of one __ 999999
This changes the tens complement of the negative total to the nines complement 999976
Next, the nines complement of the nines complement is printed to give the true negative total, and the printed amount is added in the totalizer _____ 000023
This causes all the wheels to be set to their "nine" position _____ 999999
Near the end of the total-taking operation, "one" is added to the lowest order of the totalizer _____ 1
This causes the lowest order wheel to turn to zero and enables the transfer mechanism between higher orders to turn other wheels to their zero or cleared position _____ 000000

From the above it will be seen that, during a negative total-taking operation, the totalizer wheels are not cleared or returned to their zero positions by being rotated in the reverse direction, as is the case when a positive total is taken, but are set to their cleared or zero positions by being rotated in the same direction as when amounts are entered therein during addition or subtraction operations.

The mechanism which is operable in a negative total-taking operation to cause the true amount of the negative total to be recorded and the totalizer to be cleared will now be explained.

A negative total key 237 (Figs. 1, 42, 43, and 44) is mounted at the right of the keyboard and is urged upwardly by a spring 237a until a shoulder on the key engages the lower plate of the keyboard, as shown in Figs. 1, 42, and 43.

Immediately below the negative total key 237 is a negative total-taking control lever 230, which is rockable on a stud 232 on the side frame 11 and has, at its forward end, a stud 239 in position to be engaged by the end of the negative total key 237. A spring 241 (Figs. 5 and 43), connected between a latch lever 242 and the lever 230, urges the lever 230 counter-clockwise into the position shown in Fig. 43, where the stud 239 engages the bottom of the underpressed negative total key 237.

When the negative total key 237 is depressed, it will, through its engagement with the stud 239, rock the negative total-taking control lever 230 from the position shown in Fig. 43 clockwise to the position shown in Fig. 44, and the lever will control the following means to subtract "one" from the tens complement of the negative total during the first machine cycle of the negative total-taking operation.

The negative total-taking control lever 230 is provided with a notch 247 having an extended lower edge which lies below a stud 249 on the subtraction control lever 40. The notch 247 is so formed that, when the subtraction control lever 40 is rocked by the subtraction touch bar 425, the stud 249 will clear the notch 247, but, when the lever 230 is rocked clockwise by the key 237, the extended lower edge of the notch will engage the stud 249 and rock the subtraction control lever 40 to condition the machine for a subtraction operation. As explained earlier herein in connection with the description of the subtraction mechanism, when the lever 40 moves to its operative position, it allows the latch 167 to rock counter-clockwise (Figs. 43 and 44) to a position to latch the lever 40 in its moved position and to enable the tail 171 to engage the stud 172 on the bell crank 133 on the trip lever 127 to rock the trip lever and cause the driving mechanism to be effective to drive the machine.

This operation of the trip lever 127 by the tail of the latch 167 renders the driving mechanism operative during the first machine cycle of the two-machine-cycle negative total-taking operation.

As shown in Fig. 44, the stud 249 will enter the notch 247 in the end of the lever 230 when the levers 230 and 40 are in their moved position, and will retain the lever 230 in its moved position until the subtraction control lever 40 is released shortly after the beginning of the return stroke of the sector 16, as explained previously, even though the key 237 has been released.

In addition to setting the machine for subtraction, the negative total-taking control lever 230 operates the following means to control the differential mechanism to cause it to enter the tens complement of "one" into the totalizer.

As explained earlier herein, if no keys are depressed on the keyboard and the zero stops remain in position to prevent the movement of the stop bars 66, then, in a subtraction operation, the rack levers and their racks above the units denomination order will be given a movement sufficient to cause the entry of a value of "nine" into each of these orders of the totalizer, and the rack lever and rack in the units denominational order will be given a movement sufficient to cause the value of "ten" to be entered into the units denominational order of the totalizer. In order to limit the movement of the units denominational order rack lever 52 and the rack 67 to cause the tens complement of "one," or the value of "nine," to be entered into the units denominational order of the totalizer instead of the usual value of "ten," a blocking member 255 (Fig. 1) is provided on a link 253, which has in one end a slot 252, which receives a bearing stud 251 carried by a bracket 250 extending from the bottom frame of the machine, which link is pivoted at its other end on a stud 254 carried by a depending tail portion of the negative total-taking control lever 230. Normally the blocking member 255 is in its forward position, out of the path of movement of the forwardly-extending gooseneck-shaped arm of the rack lever 52 in the units denominational order, but, when the negative total-taking control lever 230 is rocked clockwise about the stud 232 by the depression of the negative total key 237, the blocking member 255 will be moved rearwardly to the position shown in Fig. 5 and will stop the rack lever 52 and the rack 67 short of their full extent movement, so that, on the return movement of the rack lever and the rack thereon, an entry of "nine" instead of "ten" will be made in this order of the totalizer. When the negative total-taking control lever 230 is released after the beginning of the return movement of the rack levers and racks, the blocking member 255 will move forward out of the path of movement of the rack lever to allow the full movement of the rack lever during subsequent operations if such a movement should be required.

Accordingly, the negative total-taking control lever 230, when operated, will set the subtraction control lever 40 to condition the machine for a subtraction operation during the first machine cycle of the two-machine-cycle negative total-taking operation; will render the driving mechanism effective to drive the machine during this machine cycle; and will control the extent of movement of the differential mechanism so that the value of "one" will be subtracted from the totalizer during this machine cycle to change the tens complement of the negative total to the nines complement thereof.

In addition to the above controls, the negative total-taking control lever 230 controls the following means, which are operated near the end of the first machine cycle of operation and which exert the controls which are necessary to control the operation of the various mechanisms during the second machine cycle of the negative total-taking operation.

Referring now particularly to Figs. 1 and 42 to 57, the main shaft 17 is provided with a cam member 201, which is fixed to the shaft to oscillate therewith. A link 202 is pivotally connected at one end to one arm of the cam member 201 by a pin 203, and at its other end is provided with a slot 204, which receives and is slidably supported on a stud 205 fixed in the side frame 11. The upper edge of this link 202 is provided with an elevated surface 206 and a lower surface 207. A pair of plates 208, 209 (Fig. 55) are connected together by a stud 210, supporting a roller 211, and these plates 208 and 209 are rockably mounted on the stud 205. The link 202 extends between the plates 208 and 209, with the roller 211 riding upon the surfaces 206 and 207 of the link 202. A spring 212 (Figs. 42, 45, and 48), which is connected at one end to a pin 213 on the plate 208 and is connected at the other end to the link 214, urges the plates 208 and 209 in a counter-clockwise direction (Fig. 42), so as to press the roller 211 against the upper edge of the link 202 at all times. When the main shaft 17 is in its normal position, shown in Figs. 42 and 46, the roller 211 will be riding upon the higher surface 206, but, when the main shaft 17 is rocked clockwise (Figs. 42 and 43) in the first half of a machine cycle of operation, the link 202 will be pulled rearwardly, and, shortly after the link 202 begins to move rearwardly, the roller 211 will ride down an inclined portion connecting the surfaces 206 and 207 under the urging of the spring 212, which will result in a rocking of the plates 208 and 209 about the stud 205 into the positions shown in Fig. 43. When the main shaft 17 returns to its normal position, as shown in Fig. 42, the inclined portion of the upper edge of the link 202 will engage the roller 211 shortly before the link 202 reaches its normal position, and will cam the roller 211 upwardly, so that it will again engage the elevated surface 206, thereby rocking the plates 208 and 209 back into their normal position, as shown in Fig. 42. The plate 208 is provided in its peripheral edge with a V-shaped notch 215 (Fig. 55).

Disposed between the plates 208 and 209 (Figs. 50 and 56) is a clutch member 217, which has a bearing passage 218, by which it is rockably supported on the stud 205. This clutch member 217 carries a pivot pin 219, on which is rockably supported a coupling dog 220 having on one edge a V-shaped nose 221 (Figs. 46 and 56), which is urged toward the plate 208 by a spring 222, connected at one end to the pin 213 and at its other end to a stud on the dog 220.

The negative total-taking control lever 230 has a depending tail 233 (Fig. 43), which at its free end carries a stud 234. In the normal unoperated position of the lever 230, the stud 234 is in a position to engage the free end of the dog 220 and hold the V-shaped nose 221 of the dog out of engagement with the plate 208, against the tension of the spring 222; however, when the negative total-taking control lever 230 has been rocked by the depression of the negative total key 237, the stud 234 will be removed from engagement with the free end of the dog 220, and the spring 222 can rock the dog until the nose 221 engages the plate 208. In the first machine cycle of the negative total-taking operation, when the plate 208 is rocked counter-clockwise (Fig. 42), the notch 215 will be moved to a position opposite the nose 221, and the spring 222 will urge the nose into the notch to couple the clutch member 217 to the plate 208, so that, as the plate 208 is rocked clockwise (Fig. 42) near the end of the first machine cycle of the negative total-taking operation, the clutch member 217, which is then connected thereto, will be given a similar clockwise movement from the position shown in Fig. 43 to the position shown in Fig. 44.

The clutch member 217 has thereon a pin 244a (Fig. 56), by which the lower end of a link 245 is pivotally connected to the clutch member. The upper end of the link 245 has therein an elongated slot 246, which receives the stud 172 on the arm of the bell crank 133, so that, when the clutch member is rocked by the plate 208, the link 245 can pull the stud 172 downwardly. This is effective, through the bell crank 133, to hold the trip lever 127 in its moved position and prevents the end of the lever 144 (Fig. 73) from returning to the notch 154 when the shaft 149 is rocked clockwise (Fig. 72) by the engagement of the cam 163 with the roller 164 on the arm 152, so that the shaft 149 will be rocked counter-clockwise (Fig. 72) immediately by the spring 156 and will cause the driving mechanism to drive the machine automatically in the second machine cycle of the negative total-taking operation.

The clutch member 217 is also connected through the pivot pin 219 with one end of a link 302, the other end of which is provided with a slot which receives the stud 296 on the key release lever 297, so that, when the clutch member 217 is operated, it will draw the link 302 to the left (Fig. 44) and will rock the key release lever 297 to operate the bail 301a to remove the zero stops from in front of the stop bars 66, so that the bars may move forward in the second machine cycle of the negative total-taking operation. A spring 303, acting between the side frame 11 and the link 302, urges the link to the right and also tends to return the clutch member 217 to its home position if the member has been rocked clockwise.

In addition to the above functions, the clutch member 217 also renders the means controlled by the totalizer effective to set the type bars and racks according to the nines complement of the nines complement of the negative total to enable the true value of the negative total to be printed and the totalizer wheels to be set to their "nine" position. The means controlled by the totalizer and the manner in which it is rendered effective by the clutch member will now be described.

Referring now particularly to Figs. 1, 2, 9 to 15, and 30 to 33, each totalizer wheel 18 has secured thereto a stepped cam 183, which rotates with the wheel. The cam 183 is formed with a series of steps corresponding to the various digits 0 to 9 on the totalizer wheel 18, which steps are angularly disposed about the supporting rod 68a and are at progressively greater distances therefrom. The relation between the steps and the values on the totalizer wheel is such that the step farthest from the rod 68a represents zero, and succeeding steps represent the other digits in order, with the step representing "nine" being closest to the rod 68a.

A sensing finger 184 is provided for each of these stepped cams, and these fingers are pivotally supported for individual rocking movement on a common rod 185, which extends through and is supported by the individual arms 80, already described. Each finger 184 has a tip 186, which is adapted to move into engagement with the periphery of the stepped cam. An individual spring 187 urges each sensing finger 184 in a direction to carry its tip 186 toward the stepped cam with which it is associated. The finger 184 has a descending arm which extends close to the main shaft 17 and at its end has an angular slot 188, which receives a pin 189 on a stop piece 190. The slot 188 in the descending arm of the sensing finger 184 is formed by two angular portions, one portion of the slot being approximately radial to the rod 185, which is the pivot upon which the sensing finger swings, and the other portion of the slot making a substantial angle to the radial portion. Pin 189, engaging in said other portion of the slot 188, will be effective to move the tip 186 of the sensing finger 184 clear of the periphery of the cam 183 when the stop piece is moved to its normal position, as shown in Fig. 9.

The stop piece 190, of which there is one for each sensing finger 184, is rockably mounted on the main shaft 17 and is settable to different positions about the shaft under control of the sensing finger according to the amount on the totalizer wheel.

Each stop piece 190 is provided along a portion of its upper edge with a series of steps 191, which can selectively cooperate with a laterally-extending lug 200 on an associated diverging lever 51 to control the setting of the lever. The steps 191 are at progressively greater distances from the shaft 17, and their treads are concentric about the axis of the shaft. In the normal position of the stop pieces, the steps 191 are out of the path of movement of the lugs 200 and have no controlling effect on it, but, as the stop pieces 190 are moved to various positions, the steps 191 will be moved into the path of movement of the lug 200 to control the movement of the diverging lever 51.

The relation between the steps on the cams 183 and the steps 191 on the stop pieces is such that the diverging levers 51 will be positioned according to the nines complement of the values on the respective wheels. For example, when the totalizer wheel 18 is in its zero position, the portion of cam 183 having the greatest radius will be opposite the tip 186 of the sensing finger and will arrest the sensing finger after it has moved only a short distance, which movement of the finger will cause the stop piece 190 to be positioned with the step 191 at the right of the series of steps (Fig. 9) in the path of movement of the lug 200 to allow the diverging lever 51 to be displaced an extent to represent the value of "nine," which is the nines complement of zero. In a similar manner, the diverging lever may be controlled to represent the nines complement of any other digit value to which its related totalizer wheel may be set.

When the diverging levers 51 of the various differentially operable means are thus set according to the nines complement of the amount on the totalizer, which amount on the totalizer at this time is the nines complement of the negative total, they will position the amount type bars 51a accordingly to enable the complement of the complement to be printed. The printed amount will be the true value of the negative total.

As explained earlier herein, the machine is restored to adding condition automatically at the end of a subtraction operation, so that, at the end of the first machine cycle of a negative total-taking operation, the machine will be in adding condition, in which the pins 63 are in position to couple the rack levers 52 to the diverging levers 51 to be set thereby. Accordingly, when the diverging levers 51 are set under control of the totalizer during the first part of the second machine cycle of a negative total-taking operation, they will also set the rack levers 52.

During the return movement of the rack levers 52 in the last half of the second machine cycle of a negative total-taking operation, the totalizer will be engaged with the racks as in ordinary adding operations, and the complement of the complement will be entered therein to cause all the wheels to be set to their "nine" position.

The stop pieces 190 and the sensing fingers 184 are normally retained in their ineffective position (Fig. 9) by a bail rod 197, which extends across the machine below the stop pieces 190. Each stop piece 190 is provided with a tail piece 192, which extends generally downwardly, and an individual spring 193, connected to each tail piece 192 and to a cross bar 194 (Figs. 2 and 9) supported by upwardly-extending posts 194a secured to the bottom frame member 146, urges the stop pieces 190 clockwise about the shaft (Fig. 9), so that the tail pieces 192 will be in engagement with the bail rod 197.

Figure 12:
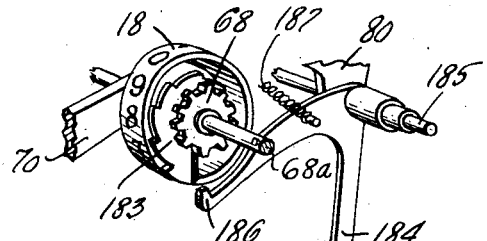
Figs. 12 and 13 are fragmentary perspective views of some of the mechanism shown in Figs. 9 and 11, the parts being in the same respective positions as shown in those figures.
Figure 13:
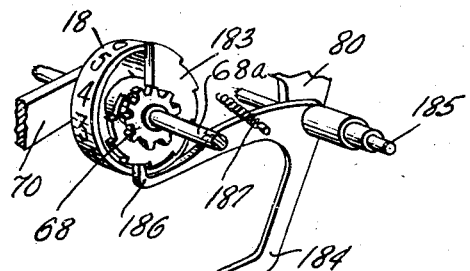
Figure 14:
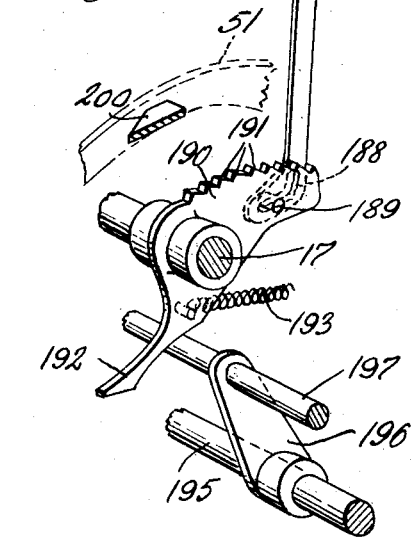
Fig. 14 is an enlarged side elevation of one of the totalizer wheels of the machine, taken on the line 14—14, Fig. 15.
Figure 15:
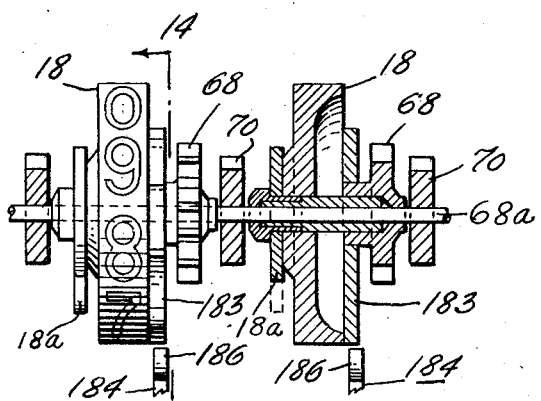
Fig. 15 is a front elevation, partly in section, of two of the totalizer wheels and their supporting shaft.

In the normal position of the parts, as shown in Figs. 1, 9, and 12, the bail rod 197 is in its forward position, where it maintains the stop pieces 190 in their furthermost counter-clockwise position with the springs 193 under tension and, through the stop pieces 190, maintains the sensing fingers 184 out of engaging relation with their related stepped cams 183 with the springs 187 under tension.

When the clutch member 217 is operated near the end of the first machine cycle of the negative total-taking operation, it controls means which allow the bail rod 197 to move toward the rear of the machine to free the stop pieces 190 and their related sensing fingers 184 for movement by their springs to set the stop pieces according to the values in the totalizer and enable the diverging levers 51 to be set according to the nines complement of the nines complement of the negative total in the second machine cycle of the negative total-taking operation.

The bail rod 197 is supported by a plurality of arms 196 (Fig. 30) secured to a bail shaft 195, which extends through and is rockably supported in the side frames 10 and 11. The bail shaft 195 (Figs. 2, 30, 42, 43, and 44) has an arm 256 fixed thereon adjacent the side frame 11, which arm at its free end carries a stud 257, which is normally engaged by a notch 258 in a latch lever 260 pivoted on a stud 261 on the side frame 11 and urged by a spring 262 to engage the notch 258 with the stud 257.

A spring 199 (Fig. 2), connected between the side frame 10 and a crank arm 198 fixed to the left end of the bail shaft 195, urges the shaft counter-clockwise (Fig. 39) and tends to move the bail rod 197 from its forward position (Figs. 1, 9, and 12) toward the rear of the machine and away from the tail pieces 192 of the stop pieces 190 (Figs. 11 and 13), but this movement is prevented by the engagement of the notch 258 in the latch lever 260 with the stud 257 on the arm 256.

The latch lever 260 (Figs. 42, 43, and 44) has a forwardly-extending arm which at its forward end is positioned over a stud 263 on the clutch member 217, so that, as the clutch member 217 is operated, it will rock the latch lever 260 counter-clockwise (Fig. 42) about the stud 261 and remove the notch 258 from engagement with the stud 257 on the arm 256. As soon as the notch 258 is disengaged from the stud 257, the spring 199 will rock the bail shaft 195 counter-clockwise (Fig. 42) until the stud 257 engages a notch 259 in the latch lever 260, which movement of the bail shaft 195 will move the bail rod 197 to its rearward position to free the stop pieces 190 so that they may be set under control of the totalizer to control the setting of the diverging levers 51 and the rack levers 52.

After the diverging levers 51 and the rack levers 52 have been set to their various positions under control of the stop pieces 190 during the first half of the second machine cycle of the negative total-taking operation, the bail rod 197 is returned to its forward position and the stop pieces 190 and the sensing fingers 184 are returned to their ineffective positions. This restoration takes place during the last half of the second machine cycle of the negative total-taking operation and is effected by the following mechanism.

Referring now particularly to Figs. 2, 30, 31, 32, and 33, one of the bail arms 196 is provided with a laterally-extending roller 264, which is disposed adjacent the main shaft 17. Fixed on the main shaft 17 is a cam member or arm 265, upon which a by-pass pawl 266 is pivotally supported by a pin 267 and urged into a position against a collar on the arm 265 by a spring 268. The pawl is free to rock in a direction to tension the spring 268, but the collar limits the movement of the pawl under the action of the spring 268. As long as the stud 257 on the arm 256 engages the notch 258 in the lever 260, the bail shaft 195 and the bail arms 196 are in the position shown in Fig. 31. When the main shaft 17 operates in the direction of the arrow (Fig. 31), the end of the pawl 266 will slightly engage and snap idly over the roller 264, as shown by the dotted lines in Fig. 32, and the arm 265 will move into the position shown in full lines in Fig. 32, at the completion of the forward or advance movement of the shaft 17. As the main shaft 17 returns to its initial position, the pawl 266 will, just before the shaft 17 completes its return movement, engage the roller 264 and cam the bail shaft 195 slightly farther toward the left, as viewed in Fig. 32, which would carry the stud 257 toward the right, as viewed in Figs. 42 and 44, slightly away from the notch 258, and then release it, at which time the stud 257 again engages in the notch 258 and the bail shaft remains substantially in the same position.

Figures 31, 32, 33:
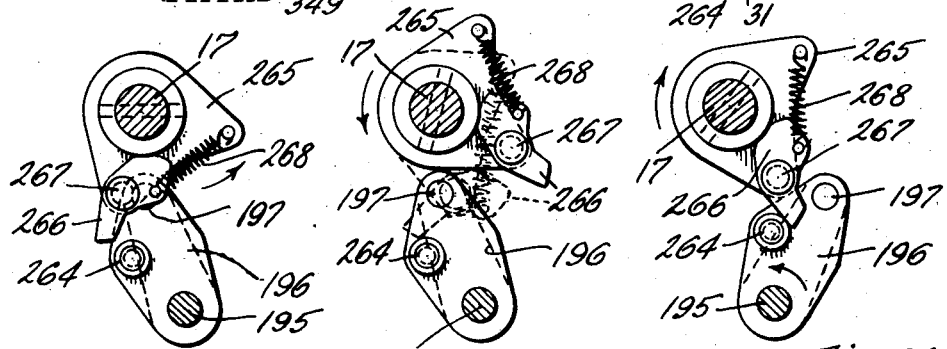
Figs. 31, 32 and 33 are fragmentary, longitudinal sectional elevations on an enlarged scale, taken on line 31—31, Fig. 30, showing the parts respectively in normal and in two different operative positions.

If the bail shaft has been released by the lever 260 and has been operated into the rearward position by its spring 199, then the stud 257 will be engaged in the notch 259 of lever 260, as shown in Fig. 44, and the arm 196, which carries the roller 264, will be in the position shown in Fig. 33. When the bail shaft is in this position, as the main shaft 17 operates in its forward movement, which is counter-clockwise in Fig. 33, the pawl 266 will snap idly over the roller 264 and clear it, as shown in Fig. 33. As the shaft 17 begins its return movement, however, the pawl 266 will engage with the roller 264, and, since the pawl is held now against rocking movement (see Fig. 33), it will cam the roller 264 in a direction to restore the bail shaft 195 to its former position, shown in Figs. 31 and 32. It will be noted that, when the arm 196, carrying the roller 264, is in the released position, shown in Fig. 33, the roller 264 is nearer the main shaft 17 and consequently will be more firmly engaged by the pawl 266, so that a full movement of the bail shaft 195 will occur as the main shaft 17 completes its return movement, which movement of the bail shaft 195 will carry the stud 257 into relatching engagement with the notch 258.

Near the end of the second machine cycle of the negative total-taking operation and after the nines complement of the nines complement of the negative total has been entered into the totalizer to set all the totalizer wheels to their "nine" position, a value of "one" is entered additively into the units denominational order wheel, causing this wheel to be moved from its "nine" position to its "zero" position and causing, through the successive operation of the transfer mechanism, the wheels of the higher denominational orders of the totalizer to be moved to their "zero" position, so that the totalizer will be in its zero or cleared condition at the end of the negative total-taking operation.

The trigger mechanism for causing this additive entry of "one" will now be described.

A bracket 304 (Figs. 1 and 16 to 22) is secured to the bottom frame member 146 of the machine and serves as a support for the various levers and latches of the trigger mechanism. Pivoted on a stud 305 on an upright flange on the bracket is a lever 306, which is urged counterclockwise (Fig. 16) about the stud 305 by a spring 315 connected to the lever 306 and to a stud 313 in an upwardly-extending arm on the bracket. The engagement of a shoulder 314 on the lever 306 with the stud 313 determines the normal position of the lever.

Also pivoted on the stud 305, but spaced laterally from the lever 306, is a lever 310 having a stud 311, which extends through a slot 312 in the lever 306. A spring 316, connected between a stud 317 on the lever 310 and a stud 318 on the lever 306, normally urgest the stud 311 into engagement with one end of the slot 312 and thus determines the normal relative position between the two levers.

Pivoted on a stud 307 on the flange of the bracket 304 is a latch 309 for controlling the time of operation of the lever 310. A spring 319, connected to the latch 309 and to a stud 320 on the flange of the bracket 304, urges the latch 309 counter-clockwise (Figs. 1, 9, 18, and 19) until a stud 332 on a rearward extension thereof rests on the edge 59 of the cam 58 on the rear shaft 9. The latch 309 is formed with a retaining shoulder 322, which is opposite a bent-over lug 323 (Fig. 22) on a rearwardly-extending arm of the lever 310 when the lever 310 is in its normal position.

In the home position of the shaft 9, the cam 58 is in the position shown in full lines in Fig. 9, and the stud 332 on the latch 309 has been moved upwardly to shift the latch 309, so that the notch 322 therein is out of engagement with the lug 323 on the arm of the lever 310, as shown in full lines in Fig. 9. When the shaft 9 operates during a cycle of operation of the machine, the cam 58 moves away from the stud 332 and allows the latch 309 to be rocked by the spring 319 to move the retaining shoulder 322 into engagement with the lug 323 on the rearwardly-extending arm of the lever 310 to prevent any counter-clockwise movement of the lever 310, as viewed in Fig. 9. The moved position of latch 309 is shown in dotted lines in Fig. 9 and in full lines in Fig. 11.

Also pivoted on the stud 307 on the flange of the bracket 304 is a latch 308 having a notch 325 therein forming a retaining shoulder. The latch 308 is urged clockwise (Fig. 17) about the stud 307 by a spring 321 until its upper end engages the inner face of a lug 324 (Fig. 22) which is bent over from a rearward extension of the lever 306. In the normal position of the lever 306, the lug 324 is above the notch 325 in the latch 308, as shown in Fig. 17.

The lever 306 has a forward extension 327 (Fig. 16), which at its free end carries a by-pass pawl 328. The by-pass pawl 328 is pivoted on a pin 329 and is urged by a spring 330 clockwise until its movement is limited by engagement of a pin 331 on the pawl with the upper edge of the forward extension 327, as shown in Fig. 16.

The by-pass pawl 328 is disposed in the path of travel of the bail rod 197, which is connected through arms 196 to the bail shaft 195, so that, when the bail shaft 195 is released and the bail rod 197 is moved toward the rear of the machine by its spring 199, which would be clockwise in Fig. 17, the bail rod 197 will cam the by-pass pawl 328 idly to one side and clear it, after which the by-pass pawl 328 drops back into its normal position. When the bail rod 197 is returned to its forward position, during the last half of the second machine cycle of the negative total-taking operation, the bail rod 197 will engage the pawl 328 (see Figs. 18 and 20), and, since the movement of the pawl is prevented by the pin 331, further return movement of the bail rod 197 will rock the lever 306 clockwise (Figs. 17 and 20) to carry the lug 324 downwardly until it is opposite the notch 325 in the latch 308. As soon as the lug 324 moves into alinement with the notch, the spring 321 shifts the latch 308 into latching engagement.

It will be remembered that, as the cam 58 moved from its home position, the latch 309 moved the retaining shoulder 322 under the lug 323 to prevent counter-clockwise movement of the lever 310 (Fig. 18), so that, when the lever 306 is rocked counter-clockwise, it will tension spring 315 and will also move relatively to lever 310, as shown in Fig. 18, to tension the spring 316 and prepare the lever 310 for counter-clockwise movement (Fig. 18) thereby when the lug 323 is released from the retaining shoulder 322 on the latch 309. Accordingly, the forward or restoring movement of the bail rod 197 is effective to cock the trigger device.

As the cam 58 on the rear shaft 9 returns to its home position near the end of the second machine cycle of a negative total-taking operation, it will engage the stud 332 on the latch 309 and will rock the latch clockwise (Fig. 18) to remove the retaining shoulder 322 from the lug 323 and allow the lever 310 to be rocked counter-clockwise (Figs. 1 and 18) by the spring 316 until the pin 311 re-engages the end of the slot 312 in the lever 306.

When the lever 310 is thus shifted by the spring 316, the pin 311 will move to the left, as shown in Fig. 1, and will straighten out a toggle formed by the arm of the lever 310 between the stud 305 and the pin 311 and by the link 333 pivoted on the stud 311 and connected at its upper end by stud 334 to the transfer lever 72 pivoted on rod 73. The straightening of the toggle upon the movement of the pin 311 will raise the upper end of the link 333 and will rock the transfer lever 72 counter-clockwise (Fig. 26) to the position shown in Fig. 26 to remove the abutment 75 from the lug 71 on the rack 67 of the lowest denominational order to allow the rack to be moved by the spring 69 until the lug 71 engages the abutment 76, a distance of one step, to enter a value of "one" additively in the lowest denominational order wheel of the totalizer.

This entry of the value of "one" additively in the totalizer shifts the units order wheel from "nine" to "zero" and starts successive tens transfer operations between the wheels of higher denominations to change the setting of all the totalizer wheels from "nine" to "zero."

After the cam 58 has rocked the latch 309 to remove the retaining shoulder 322 from engagement with the lug 323 on the lever 310, and lever 310 has been operated by the spring 316, further movement of the cam 58 will rock the latch 309 farther until a stud 326 therein (Figs. 18, 21, and 23) engages the upper end of the latch 308 and removes the notch 325 from latching engagement with the lug 324 on the lever 306 to allow the lever 306 to be returned to its normal position by the spring 315. Since the lever 310 is also free at this time, it will be restored to its normal position along with the lever 306.

When the latches 308 and 309 are released at the end of the second machine cycle, levers 306 and 310 are only partially restored, as permitted by the play between lugs 71 and 75, as shown in Fig. 26. This partial restoration of levers 306 and 310 brings the lug 324 on the lever 306 slightly above the notch 325 in the latch 308 and out of latching engagement therewith. Then, when the totalizer actuating rack 67 moves forward at the beginning of the next machine cycle of operation, the lug 75 is released, and the levers 306 and 310 are completely restored by spring 315. Spring 315 must be strong enough to move the levers 306 and 310 against the pressure of latches 308 and 309 as then exerted by springs 319 and 321.

It is therefore seen that, at approximately the end of the negative total-taking operation, the totalizer wheels are placed in their "zero" position and the machine is ready for further calculating operations.

In order that negative totals will be printed in red, a link 126 (Figs. 34 and 39), connected to the crank arm 198 and to the bail 124, is drawn downwardly by the crank arm 198 when the bail shaft 195 is rocked counter-clockwise (Fig. 34) near the end of the first machine cycle of the negative total-taking operation. This downward movement of the link 126 will rock the bail 124 to remove the cam arm 123 from cooperative relation with the roller 122, so that the ribbon shifting cam will be coupled to the shaft 122a and will be operated thereby during the second machine cycle of the negative total-taking operation to shift the red portion of the ribbon into printing position when the true negative total is printed during this second machine cycle of the negative total-taking operation.

It will be noted that the links 125 and 126 have slotted ends through which they are connected to the bail 124 for controlling the ribbon shifting mechanism. This enables either one of the links to operate the bail 124 without interference by the other link.

From the above, it is clear that the depression of the negative total key 237 will initiate a two-machine-cycle negative total-taking operation, in which the totalizer will be cleared and the true value of the negative total will be printed in red.

Negative sub-total-taking mechanism

When it is desired to take a sub-total of a negative total, a two-machine-cycle operation is performed, in which operation the steps are similar in many respects to those which occur in the negative total-taking operation explained above.

During the first machine cycle of the negative sub-total-taking operation, the value of "one" is subtracted from the tens complement of the negative total, just as in the negative total-taking operation.

In the second machine cycle, the totalizer controls the setting of the amount type bars and racks according to the nines complement of the nines complement of the negative total, and this value, which is the true value of the negative sub-total, is printed, just as in the negative total-taking operation. In the sub-total-taking operation, however, the nines complement of the nines complement of the negative total is not entered into the totalizer, and the totalizer wheels are not set to their "nine" position, as in a negative total-taking operation, the totalizer being kept disengaged from the racks at this time, so that the nines complement of the negative total remains in the totalizer. After the printing of the true negative sub-total takes place, the value of "one" is entered into the lowest denominational order wheel of the totalizer, additively, just as in the negative total-taking operation; however, since the wheels are standing at the nines complement of the negative total and are not at their nines position, as in negative total-taking operations, this entry of the value of "one" will not cause the wheels to go to their "zero" or clear position, but will change the nines complement of the negative total back to the tens complement of the negative total, which was the setting of the totalizer before the negative sub-total-taking operation began.

The mechanism which is operable in a negative sub-total-taking operation to cause the true amount of the negative total to be printed and the tens complement of the negative total to be left on the totalizer at the end of the operation, so that further amounts can be added or subtracted from this total, if desired, will now be explained.

A negative sub-total key 238 (Figs. 1, 42, 43, and 44) is mounted at the right of the keyboard and immediately in front of the negative total key 237 and is urged upwardly by a spring 238a until a shoulder on the key engages the lower plate of the keyboard.

The lower end of the negative sub-total key 238 is effective to engage the stud 239 on the negative total-taking control lever 230, and, upon depression of the key, the lever will be rocked in the same manner as when operated by the negative total key 237.

The negative total-taking control lever 230 will exert the same controls in the negative sub-total-taking operation as in the negative total-taking operation which has just been explained; that is, it will operate the subtraction control lever 40 to set the machine for subtraction and, through the latch 167 for the subtraction control lever, will operate the trip lever 127 to set the driving mechanism in operation for the first machine cycle of the two-machine-cycle negative sub-total-taking operation; and it will move the blocking member 255 into cooperative relation with the forwardly-extending gooseneck-shaped arm of the rack lever 52 of the units denominational order to stop the rack lever short of its full extent of movement to cause the entry of "nine" in the units denominational order, which, in conjunction with the mechanism rendered operable by the subtraction control lever, enables the differentially operable means to be controlled to enter the tens complement of "one" in the totalizer during the first machine cycle of the negative sub-total-taking operation. Accordingly, at the end of the first machine cycle of a negative sub-total-taking operation, a value of "one" will have been subtracted from the amount on the totalizer to change the tens complement of the negative total to the nines complement thereof.

The negative total-taking control lever will also render the coupling dog 220 operable to couple the clutch member 217 to the plate 208, so that the clutch member 217 can operate near the end of the first machine cycle of the negative sub-total-taking operation to control the operation of the driving mechanism to cause the second machine cycle of the operation to take place. The clutch member 217 will also cause the zero stops to be moved from in front of the stop bars 66 in the second machine cycle of the operation and will release the bail rod 197 to render the totalizer-controlled means operable in the second machine cycle of the operation to set the type bars and racks according to the nines complement of the nines complement of the negative total to enable the true value of the negative sub-total to be printed, just as in the negative total-taking operation explained above.

As explained earlier herein, the negative sub-total-taking operation differs from a negative total-taking operation in that the totalizer is not engaged with the racks in the second machine cycle of the negative sub-total-taking operation, so that the nines complement of the nines complement of the negative total is not entered in the totalizer, and the totalizer remains set according to the nines complement of the negative total instead of having all its wheels set to their "nine" position, as is the case in the corresponding phase of the negative total-taking operation.

The means for preventing the entry of the nines complement of the nines complement of the negative total into the totalizer during the second machine cycle of a negative sub-total-taking operation is as follows.

Disposed beside the negative total-taking control lever 230 (Figs. 42, 43, 44, and 56), and rockable on the stud 232, is a negative sub-total-taking control lever 231. The forward end of the negative sub-total-taking control lever 231 extends beyond the negative total-taking control lever 230, and a spring 243, connected to a stud on this extension and to the pivot stud 244, normally urges the lever counter-clockwise (Fig. 42) about the stud 232 until a stud 240 on the extension engages the bottom of the negative sub-total key 238 and determines the normal position of the lever.

The rear end of the negative sub-total-taking control lever 231 is provided with a notch 248 (Fig. 44), which, in the normal position of the control levers 230 and 231, lies opposite and is alined with the notch 247 in the negative total-taking control lever 230. In the normal position of the lever 231, the notch 248 is also out of the path of movement of the stud 249 on the subtraction control lever 40, so that the control lever 40 can be rocked by the subtraction touch bar 425 in normal subtraction operations without affecting the lever 231.

When the negative sub-total key 238 is depressed and rocks the levers 230 and 231, the levers will be moving in unison and the stud 249 on the subtraction control lever 40 will be moved into the notches 247 and 248 early in the movement of the levers 230 and 231 and will couple the two levers for joint movement thereafter. The engagement of the stud 249 with the notches also serves to retain the two control levers in their moved position until the subtraction control lever 40 is released near the beginning of the second half of the first machine cycle of the negative sub-total-taking operation. The control levers are shown in their moved positions in Fig. 46.

The negative sub-total-taking control lever 231 is provided with a depending tail 235 (Fig. 44), which carries a stud 236 for controlling the effectiveness of a coupling dog 226 (Fig. 57) pivoted on a pin 225 on a clutch member 223 located between the clutch member 217 and the plate 209. The clutch member 223 has a bearing passage 224, by which it is rockably supported on the stud 205. On one edge of the coupling dog 226 is a V-shaped nose 227 (Fig. 44), which is urged toward the plate 209 by a spring 228 connected between a stud on the coupling dog 226 and a stud 229 (Fig. 55) on the plate 209. In the normal position of the negative sub-total control lever 231, the stud 236 will engage the free end of the coupling dog 226 and hold the V-shaped nose 227 away from the plate 209, against the action of the spring 228. When the negative subtotal-taking control lever 231 is rocked clockwise (Fig. 46), the stud 236 will move away from the coupling dog 226 and will allow the nose 227 to engage the periphery of the plate 209.

As shown in Fig. 55, the plate 209 has a V-shaped notch 216, into which the nose 227 of the released coupling dog 226 can snap when the plate 209 is rocked counter-clockwise (Figs. 42, 43, and 44) as the roller 211 descends from the elevated surface 206 to the lower surface 207 of the link 202 early in the first machine cycle of the negative sub-total-taking operation. With the nose 227 in the notch 216, the clutch member 223 will be coupled to the plate 209 and will be rocked clockwise (Figs. 42, 43, 44, and 46) with the plate 209 when the link 202 is moved forward near the end of the first machine cycle and the roller 211 rides up on the elevated surface 206.

This operation of the clutch member 223 is similar to, and occurs at the same time as, the operation of the clutch member 217 and enables the clutch member 223 to condition means which will cause the operation of the non-add mechanism in the second machine cycle of the negative sub-total-taking operation to prevent the engagement of the totalizer with the totalizer actuating racks 67. The pin 263 (Figs. 56 and 58) on the clutch member 217 is long enough to cooperate with a notch 290 (Figs. 57 and 58) in the edge of the clutch member 223 and prevent the overrunning of the clutch member 223 in advance of clutch member 217.

As explained earlier herein, the non-add mechanism is effective whenever the link 111 (Fig. 46) is raised, and the clutch member 223 will, when operated, condition the following means so that the link 111 will be raised automatically near the beginning of the second machine cycle of the negative sub-total-taking operation.

The link 111 has been described as being pivotally connected at its lower end to the latch plate 116, which is rockably mounted on the shank 269 of the stud 117 extending from the side frame 11.

Also individually rockable on the shank 269 of the stud 117, between the plate 116 and the side frame 11, is an actuating member 272 (see Figs. 46, 47, and 54 particularly). A spring 273, connected between the actuating member 272 and a pin on the side frame, urges the actuating member 272 in a direction to engage a pin 274 on the plate 116, as shown in Fig. 53. On the lower end of the actuating member 272 is a stud 275, which is engaged by a cam surface 276 on one end of a lever 277 (Fig. 58) pivoted on the stud 205, which rockably supports the plates 208 and 209. The lever 277 adjacent the stud 205 is provided with a notch 278, which embraces a stud 279 carried by the clutch member 223 (Fig. 58).

When the clutch member 223 is operated by the plate 209, the stud 279 will first move idly along the notch 278 and then will engage with the right-hand end of the notch (Fig. 58) and will rock the lever 277 upwardly, causing the cam surface 276 on the lever to engage the stud 275 on the actuating member 272 and rock the actuating member counterclockwise (Figs. 42 and 43) to an initial position. When the member 272 has been rocked to its initial position by the lever 277, such movement is sufficient to cam the stud 275 on the member 272 beyond the end of cam edge 276 and into a latching notch 282 (Fig. 58) of lever 277, which retains the actuating member in its initial position. This actuating member 272 (Fig. 42) is provided on the rear or wide edge toward the main shaft 17 with an arcuate edge 280, which, when the actuating member 272 is in its normal position, shown in Fig. 42, is approximately concentric with the shaft 17. A pin 281 on the cam member 201 normally clears the arcuate edge 280, when the shaft 17 rotates clockwise from the position shown in Fig. 42 to the position shown in Fig. 43 and does not actuate the member 272. However, when the actuating member 272 is moved to its initial position, a cam surface 283 of the actuating member 272 is positioned in the path of travel of the pin 281 on the cam member 201 as it moves with the main shaft 17 (Fig. 46). Now, when the shaft 17 rocks clockwise in Fig. 46 and into the position shown in Fig. 47, the pin 281 will engage the cam surface 283 of the actuating member 272 and pass along the forward edge of that member and force the latter farther in the rearward direction toward the shaft 17, as shown in Figs. 47 and 54. When the actuating member 272 begins this operation under actuation of the pin 281, the stud 275 (Figs. 53 and 54) engages the lower edge 284 of the plate 116 and cams the plate counter-clockwise (Fig. 53), thus elevating link 111 (Fig. 46) to the position shown in Figs. 47 and 54, which automatically operates the non-add mechanism in the same manner as when the link 111 is operated manually by means of the non-add key 108, as described in the Peters Patent No. 1,386,021.

It should be understood that the swinging of the lever 277 by the stud 279 on the clutch member 223 (Fig. 58) is of such an extent as merely to shift the actuating member 272 into the position of Fig. 46 for engagement by the pin 281 on member 201, the lever 277 being latched in this position by the engagement of the stud 275 in the notch 282 in this lever (see dotted lines in Fig. 58). The subsequent camming of the actuating member 272 by the pin 281 engaging the cam surface 283 causes the member 272 to move away from the lever 277, thus freeing the stud 275 from the notch 282, and since, in the mean time, the clutch member 223 will have returned to its normal position, the stud 279 will have moved out of its lever-lifting and -holding position, and the lever 277 will be permitted to drop by gravity into its lower, inactive position as shown in full lines in Fig. 58. This movement of the lever 277 is arrested by the engagement of the lower edge of the arm 277 with a stud 2771 (Figs. 6 and 58) mounted on the right side plate 11.

Accordingly, because of the operation of the non-add mechanism, the nines complement of the negative total will remain in the totalizer during the second machine cycle of the negative sub-total-taking operation.

The operation of the bail rod 197 is also effective to cause the trigger mechanism to be operable to enter a value of "one" in the lowest denominational order of the totalizer near the end of the second machine cycle of the negative sub-total-taking operation, just as in the negative total-taking operation, but the effect of this entry of "one" in the totalizer near the end of the negative sub-total-taking operation is different from that obtained in the negative total-taking operation. In the negative total-taking operation, this entry of "one" near the end of the second machine cycle of operation causes the wheels of the totalizer, which had been set to their "nine" position, to be set to their "zero" position, but in the negative sub-total-taking operation the wheels of the totalizer are set to represent the nines complement of the negative total, and the entry of "one" by the trigger mechanism merely restores the value of "one" which was subtracted during the first machine cycle and reconverts the nines complement of the negative total to its tens complement.

The negative sub-total will also be printed in red. The operation of the bail rod 197 will, just as in the negative total-taking operation, draw the link 126 downwardly in a negative sub-total-taking operation to render the ribbon shifting mechanism operable in the second machine cycle when the negative sub-total is printed.

From the above it is clear that the depression of the negative sub-total key 238 will initiate a two-machine-cycle operation, in which the true value of the negative total will be printed and the tens complement of the negative total will be left on the totalizer at the end of the operation, so that further amounts can be added to or subtracted from this total, if desired.

Interlocks

In order to prevent the machine from being operated improperly, certain interlocks are provided.

The interlock which prevents the simultaneous operation of the positive total and sub-total lever 99 and the substraction control lever 40 is shown in Figs. 2, 4, 6, 42, 48, and 49.

A lever 429 (Figs. 3, 4, and 6) is pivoted on a stud 430 on the outside of the side frame 11 and is urged clockwise about the stud 430 by a spring 431 to maintain a stud 432 in an upward extension of the lever 429 in engagement with the edge of the subtraction control lever 40. The lever 429 will follow the movement of the subtraction control lever 40 and will be rocked counter-clockwise when the subtraction control lever 40 is rocked from its normal inoperative position (Fig. 4) to its operative position (Fig. 6).

A lever 435 (Figs. 2, 48, and 49) is pivotally mounted on a stud 436 on a bottom frame member 345 and passes through a slot 437 in the link 214. The end of the lever 435 extends through an opening 438 in the side frame 11 to a point adjacent a shoulder 439 on the lever 429.

When the positive total and sub-total lever 99 is operated to initiate either of these operations, it will draw the link 214 to the left (Fig. 42) and will rock the lever 435 about the stud 436 to place the end of the lever 435 under the shoulder 439 on the lever 429, which will prevent the lever 429 from rocking counter-clockwise about the stud 430 and will block the subtraction control lever 40 from being moved to its operative position.

When the subtraction control lever 40 is moved to its operative position, it will move the lever 429 to place the shoulder behind the end of the lever 435 and will thus prevent the end of the lever from moving rearwardly. This blocking of the rearward movement of the end of the lever 435 will block the movement of the link 214 to the left, as seen in Fig. 42, and will prevent the positive total and sub-total lever 99 from being operated.

An interlock is provided to control the locking and unlocking of the positive total and sub-total lever 99 and the negative total and sub-total keys 237 and 238. This interlock is effective to lock the negative total and sub-total keys 237 and 238 and to unlock the positive total and sub-total lever 99 whenever the total in the totalizer is positive, and is effective to unlock the negative total and sub-total keys 237 and 238 and to lock the positive total and sub-total lever 99 when the total in the totalizer is negative.

In order to obtain a control according to whether the total in the totalizer is positive or negative, advantage is taken of the fact that, in subtracting by the method of adding complements, the sum of the two amounts involved will always exceed the capacity of the totalizer whenever a smaller amount is subtracted from a larger amount, leaving a positive total, and whenever a number is subtracted from a negative total. Under these circumstances, the highest denominational order totalizer wheel will pass from its "nine" position to or through the "zero" position and will cause the highest denominational order transfer lever to operate. This operation of the transfer lever will cause the positive total and sub-total lever 99 to be unlocked and the negative total and sub-total keys 237 and 238 to be locked whenever the total is positive. Means are provided to prevent the operation of the transfer lever from unlocking the positive total and sub-total lever 99 when an amount is subtracted from a negative total and the total in the totalizer remains negative.

Whenever a larger amount is subtracted from a smaller amount, resulting in a negative total, the sum of the amounts involved will not exceed the capacity of the totalizer, and all the totalizer wheels to the left of the highest digit involved in the calculation will be set to their "nine" position. Under these circumstances, the highest denominational order totalizer wheel will not pass from its "nine" position to its "zero" position, and the highest denominational order transfer lever will not operate. The failure of the transfer lever to operate in a subtract operation causes the positive total and sub-total lever 99 to be locked and the negative total and sub-total keys 237 and 238 to be unlocked, which condition will continue until the highest denominational order transfer lever operates in an addition operation to indicate that the amount added has changed the negative total previously in the totalizer to a positive total.

The means whereby the highest denominational order transfer lever can control the locking and unlocking of the positive total and sub-total lever and the negative total and sub-total keys will now be described.

Adjacent to the transfer lever 74 (Fig. 35) cooperating with the highest denominational order totalizer wheel, there is an auxiliary lever 335, which is pivotally mounted on the side frame 10 and has a lug 336 extending, through an opening in the side frame, to a point under the transfer lever 74 (Figs. 35 and 36). Pivotally connected by a pin 337 to this auxiliary lever 335 is one end of a link 338, which is in turn pivotally connected at its other end by a pin 339 to one end of a latch lever 340. The latch lever 340 is pivoted on stud 341 on the outside of side frame 10 (Fig. 34), and the other end of this lever is provided with a notch 342, which is adapted to engage with an edge of an interlock lever 343 (Figs. 2, 34, and 61), which is pivoted on a stud 344 on the bottom frame member 345. The lever 343 has an offset end 346, which extends over the upper edge of the latch lever 242, previously described as the lever to which one end of spring 241 is connected. The lever 242 is pivoted on the bearing stud 251 and is urged upwardly by the spring 241 into contact with the overhanging offset end 346 of lever 343. The upper edge of lever 242 is provided with an inclined cam surface 347 (Figs. 1, 5, and 61), and, when the lever 343 is in its home position with its end 346 on the lower portion of the upper edge of the lever 242, the end of the lever 242 can move upwardly to a position (Fig. 1) where a notch 348 in the end of the lever engages the stud 254 to block the operation of the negative total-taking control lever 230 and thereby locks or blocks operation of the negative total and sub-total keys 237 and 238.

When the lever 343 is rocked counter-clockwise Fig. 61) from its home position, the end 346 will ride up the cam surface 347 and will depress the end of the lever 242 to remove the notch 348 from engagement with the stud 254, thus freeing the negative total-taking control lever 230 for operation and thereby unlocking and rendering the negative total and sub-total keys 237 and 238 operative.

A link 349 (Fig. 61) is pivotally connected at one end by a pin 350 to the lever 343, and intermediate its ends the link is provided with a slot 351, through which extends a shouldered stud 352 that is threaded into the bottom frame member 146 (see also Fig. 2). The rear end 353 of the link 349 is bent upwardly to a point immediately behind the cross bar of the bail 105, previously described. When the lever 343 is rocked counter-clockwise (Fig. 61), it moves the link 349 endwise in a forward direction, and the upstanding end 353 will, by engagement with the bail 105, rock the bail 105 clockwise in Fig. 61, to disengage the notch 104 in the bail from the lug 103 on the arm 102 connected to the locking lever 96, as shown in Fig. 39. When the arm 102 is released, the spring 354 (Fig. 59) rocks the locking lever 96 in a direction to carry its pin 97 into locking engagement with the notch 98 of the positive total and sub-total lever 99.

When the lever 343 moves clockwise (Fig. 61), the end 353 of link 349 will move rearwardly and release the bail 105, so that, in the next operation of the machine, when lever 96 is moved by the cooperation of the stud 13 and the by-pass 101, as explained previously, to remove the stud 97 from the notch 98, the bail 105 will be free to engage the notch 104 therein in latching relation with the end 103 of the arm 102 by action of the spring 107 (Fig. 61) and will retain the locking lever 96 in this position to free the total and sub-total lever 99 for operation unless an amount type bar has been displaced in this operation of the machine.

An interlock control link 355 (Fig. 34) is pivotally connected by a pin 356 to the depending end of a lever 357, which is pivoted by pin 358 (Figs. 34 and 39) to the side frame 10. The other end of the link 355 is provided with a slot 359 (Fig. 34), which has two substantially horizontal parallel offset sections connected by an inclined cam portion 360. A stud 361 passes through this slot 359 and is secured to an upstanding part 362 on one end of the lever 343 (Fig. 61). The lower end of the link 355 is also provided with a laterally-extended lug 363 (Fig. 61), which is disposed above the horizontal arm of the bracket 24 (Fig. 34) employed in the subtraction mechanism and described previously.

A latch 364 (Figs. 34 and 37) is pivoted by a pin 365 to the arm 21, which is fixed on the shaft 20 and carries the roller 22 running the slot 23, and this latch 364 has a nose 366, which is urged toward the upper surface of the bracket 24 by a spring 367, which is connected to a tail of the latch 364 and to a pin 368 on the arm 21. The under edge of the latch 364 (Figs. 39, 64, 65, and 66) is provided with a notch 369, of a length sufficient to loosely receive the lug 363 on the lower end of the link 355. The free end of the upstanding part 362 on the lever 343 is flanged horizontally to form a lug 370, which extends into the path of travel of the roller 22 on the lower end of the arm 21, which rocks with the shaft 20, as explained previously. When the roller 22 moves forwardly along the slot 23, it engages the lug 370 (Figs. 39 and 64) and rocks the lever 343 counter-clockwise (Fig. 61) from its home position against the action of a spring under tension between the lever 343 and the bottom frame member 345 (Fig. 61), and this shifts the offset end 346 in a direction to engage the cam surface 347 on the latch lever 242 and rock the latter out of engagement with the stud 254. The same movement of the lever 343 also pulls on link 349 and rocks the bail 105 to release the locking lever 96 to enable the locking lever to be moved to engage the stud 97 thereon with the notch 98 in the positive total and sub-total lever 99.

Auxiliary lever 335 will be held out of engagement with the transfer lever 74 by the engagement of the end of the latch lever 340 with the top surface of the lever 343 when the lever 343 is in its home position. However, when lever 343 is moved by the roller 22, the edge of the lever is carried beyond the notch 342 in the lever 340, and a spring 372, connected to the link 338 and to a pin 373 on the side frame 10, causes the lever 340 to rock, so that the notch 342 can engage the lever 343 in the manner shown in Fig. 41 and retain the lever 343 against return movement to home position under the action of the spring 371. This movement of the lever 340 to the position where the notch 342 engages the lever 343 also rocks the auxiliary lever 335 (Fig. 35) to move its offset end 336 up into engagement with the transfer lever 74 (Fig. 36), which is the last transfer lever at the left of the machine, to enable this transfer lever to rock the latch 340 to move the notch 342 from engagement with the lever 343 when the total is or becomes positive.

It should be noted here that a spring 357a, connected between an ear on the lever 357 and the stud 373 on the side frame 10, urges the lever 357 clockwise (Fig. 34) until the lateral extension thereon engages a portion of the framework of the machine, and this positioning of the lever 357 is effective to hold the lower end of the link in its rearmost position where the lug 363 is slightly to the rear of the notch 369 in the latch 364.

When the lever 343 is rocked by the forward movement of the roller 22, the stud 361, carried by the upstanding end 362 (Figs. 34, 37, and 38), will move along the slot 359 from the higher horizontal section, along the inclined cam portion 360 and into the lower horizontal section of the slot and, in doing so, will cam the lower end of link 355 upwardly, so as to position its lug 363 against the under face of the latch 364, but out of alinement with the notch 369, as shown in Figs. 62 and 64, which elevates the latch 364. The engagement of the nose of latch 364 with the upper face of the horizontal bracket arm 24 prevents the engagement of the notch 369 of the latch with the lug 363 when the stud 361 is in the left-hand end of the slot 359 in Fig. 34; that is, when the lower end of link 355 is in its lowermost position. When the shaft 20 returns to the position shown in full lines in Fig. 34, the roller 22 will move backwardly along the slot 23 and release the lug 370 on the upstanding end 362 of lever 343, but lever 343 will remain in its moved position if the latch lever 340 remains in latched position, because the lever 335 is not held depressed by the operation of the transfer lever 74. If the transfer lever 74 has been operated and the free, notched end of the latch lever 340 is elevated to release the lever 343, then, when the roller 22 moves backwardly, the spring 371 (Fig. 61) will return the lever 343 to the initial or home position, shown in Fig. 61, unless otherwise restrained.

Also mounted on the side frame 10 is a V-shaped latch lever 374 (Fig. 34), which is pivoted on a stud 375 at the vertex of the V. One arm of the lever 374 extends beneath the bracket shelf 24 and is there provided with an upstanding hooked end 376 (Fig. 37), which is disposed so as to engage behind the lug 370 when the lever 374 is rocked clockwise in Fig. 34. A spring 377 (Fig. 34) acts on the lever 374 to urge it clockwise in a direction to carry the hooked end 376 upwardly against the under face of the lug 370. Thus, when the lug 370 moves forwardly of the machine under the action of the roller 22 carried by the arm 21 on the shaft 20, the hooked end 376 will engage with the lug 370 and prevent return movement of the lever 343 until the lever 374 is rocked in a releasing direction, as will appear presently. The other arm of the lever 374 extends upwardly into a position below a nose 378 (Figs. 34 and 39) on the bell crank 379, which is pivoted on the stud 380 on the side frame 10. As explained earlier herein, the bell crank 379 is urged clockwise (Figs. 34 and 39) by a spring 381, which is connected at one end to the lever 379 and at its other end is connected to the frame, as shown in Fig. 34, until one arm of the bell crank rests on roller 383 on the arm 21. The nose 378 serves as a limit stop for the upward movement of the lever 374 under the action of its spring 377.

When the shaft 20 is in its normal home position, the roller 383 is received in the notch 385 in the lower edge of the arm of bell crank 379, which arm is formed with the nose 378. The spring 381 thus rocks the bell crank lever 379 clockwise in Fig. 34 until stopped by engagement of the notch 385 with the roller 383, at which time the nose 378 of the bell crank lever engages and depresses the adjacent arm of the lever 374, which tensions the spring 377 and carries the hooked end 376 below the path of travel of the lug 370 on the lever 343. When the shaft 20 begins to rock counterclockwise (Fig. 34), the roller 383 on the arm 21 engages with the side of the notch 385 and cams the bell crank 379 counterclockwise in Fig. 34, to lift the nose 378 and allow rotation of lever 374 by spring 377 in a direction to engage the hooked end 376 against the lug 370, so that, as the lug 370 passes the hooked end 376, the lever 374 will be snapped upwardly into latching engagement with lug 370, thus preventing return movement of the lever 343 until the lower arm of the lever 374 is depressed by re-engagement of the nose 378 of the bell crank 379 with the upper end of that lever.

It will be understood that the shaft 20 is operated only during subtraction operations, so that, each time that the lever 343 is operated from its home position by the roller 22, the stud 361 shifts the lower end of the link 355 upwardly, and the notch 342 on the latching lever 340 drops in back of the lever 343 to lock the lever in moved position. So long as the total remains positive, the transfer lever 74 will be operated in each subtraction operation and will remain latched in operated position at the end of the operation and until early in the next operation of the machine. The transfer lever 74, in its operated position, depresses the link 338 and elevates the notch 342 to release the lever 343 at the end of the operation, which allows the lever 343 to return to its initial or home position under action of the spring 371, as soon as it is released by the lever 374 (Fig. 66). If, however, during a subtraction operation, the total becomes negative, the transfer lever 74 will not be operated and the link 338 will not be depressed; hence the lever 343 will not be released at the end of the operation (see Fig. 65). This leaves the lever 343 in the moved position, in which the end of the lever 242 is out of blocking relation with the stud 254 on lever 239 and the negative total and sub-total keys 237 and 238 remain unlocked, and the positive total and sub-total lever 99 remains locked. The lever 343 will thus be retained in its moved position until it is again released by the operation of the transfer lever 74 in an adding operation to indicate that the amount added has made the total positive.

However, when there is a negative total in the totalizer, the wheels of the totalizer will be set to the tens complement of this negative total, and the adding of complements of other amounts in further subtracting operations will cause the highest denominational totalizer wheel 18 to pass from "nine" through "zero" and operate the transfer lever 74 for the highest order wheel. As explained earlier, the operation of this transfer lever 74 is used to indicate that the total is positive and to reelase the lever 343 and cause the negative total and sub-total keys to be locked. The following means are therefore provided for preventing the release of the lever 343 by the operation of this transfer lever during further subtractions from a negative total.

As explained earlier herein, during the subtraction operation in which the total becomes negative, the transfer lever 74 related to the highest denominational order totalizer wheel will not be operated and the latching lever 340 will remain in position where its notch 342 retains the lever 343 in its moved position, where it causes the negative total and sub-total keys to be unlocked. The stud 361 on the upstanding end 362 of the lever 343 will also be retained in its forward position and in the lower horizontal portion of the cam slot 359 in the lower end of the interlock control link 355, and will retain the lower end of the control link in its elevatde position, as shown in Figs. 62 and 64. With the lower end of the control link in its elevated position, the lug 363 will be in a position to be engaged by the notch 369 in the latch 364 when the shaft 20 returns to home position at the end of this operation, as shown in Fig. 65.

In any subsequent subtraction operation with these parts in this position, the rocking of the shaft 20 counter-clockwise will, through the arm 21, shift the latch 364 and the lug 363 forward, as shown in Fig. 39. The forward shift of the lug 363 will pull the interlock control link 355 and rock the lever 357 counter-clockwise (Figs. 34, 35, 36, and 39) about the stud 358, against the action of the spring 357a, to cause the lateral extension of the lever to move from the position shown in Figs. 34 and 35 to the position shown in Figs. 36 and 39, where the extension engages the transfer lever latch 82 for the transfer lever 74 associated with the highest denominational totalizer wheel, and moves this latch to its ineffective position. During this operation, the transfer lever 74 will be operated by the transfer cam on the highest denominational order wheel and will operate the lever 335, the link 338, and the latch lever 340 to remove the notch 342 from latching relation with the lever 343, but at this time the hooked end 376 on the V-shaped lever 374 is in engagement with the lug 370 on the lever 343, and the lever 343 is retained in its moved position. Since the transfer lever latch 82 is ineffective during this operation, the springs 77 and 372 are effective, respectively, to restore the transfer lever 74 to its unoperated position and to restore the notch 342 into latching position just as soon as the transfer cam 18a on the totalizer wheel has passed out of contact with the transfer lever. Accordingly, when the lever 374 is restored to its home position near the end of the operation and the hooked end 376 is removed from engagement with the lug 370, the notch 342 is in engagement with the lever 343 and retains the lever 343 in moved position, in which position of the lever 343 the negative total and sub-total keys are unlocked, and the positive total and sub-total lever remains locked.

It should be noted that, while the lug 363 on the control link 355 is engaged by the notch 369 on the latch 364 whenever the total is negative, the link 355 is shifted to disable the transfer lever latch 82 only in subtraction operations, so that, in any adding operation following the subtraction operation in which the total became negative, the transfer lever 74 can be latched in operated position if the total becomes positive and can retain the notch 342 out of engagement with the lever 343 so that the lever 343 can return to its home position to cause the positive total and sub-total lever 99 to be unlocked and the negative total and sub-total keys to be locked.

This interlocking means, therefore, is controlled by the totalizer according to whether the total is positive or negative, and enables the total and sub-total lever 99 to be operated only when the total is positive and enables the negative total key 237 or the negative sub-total key 238 to be operated only when the total is negative.

A further interlock is provided to insure that the zero stops are returned to their position in front of the stop bars before the driving mechanism can be effective in the first machine cycle of either a negative total- or sub-total-taking operation. This interlock is shown particularly in Figs. 1, 4, 5, and 6.

A lever 440 is pivotally mounted on a stud 441 on the right side of the keyboard, and this lever at its forward end is provided with a downward extension 442, which lies over a roller 443 on the rearwardly-extending arm of the key release bail 301a. A bridging member 444, pivoted on the forward end of the lever 440, has extensions 445 and 446, which extend through slots in the side of the keyboard and into slots 447 and 448, respectively, in the negative total and sub-total keys 237 and 238. Either the negative total key or the negative sub-total key, when depressed, will engage its related extension 445 or 446 and will lower its related end of the bridging member 444, causing the forward end of the lever 440 to be depressed, so that the downward extension 442 thereon can engage the roller 443 and rock the bail 301a to release any depressed digit keys before the negative total- or sub-total-taking operation begins.

The bail 301a, in addition to releasing the digit keys, will move the zero stops from in front of the stop bars 66, as is well known in this type of machine. While the movement of the zero stops from in front of the stop bars is necessary at the beginning of a positive total- or sub-total-taking operation, the zero stops must be in front of the stop bars before a negative total- or sub-total-taking operation is begun, in order that the stop bars can be arrested in their zero position in all denominational orders above the units denominational order to enable the subtraction of "one" from the negative total to take place in the first machine cycle of either a negative total- or sub-total-taking operation.

To insure that the zero stops are in front of the stop bars before a negative total- or sub-total-taking operation is begun, the lever 440 is provided with a stud 450, which can move behind the rear edge of the upwardly-extending arm 135 of the trip lever 127 and prevent the trip lever from rocking clockwise (Fig. 6) to render the driving mechanism operative as long as the forward end of the lever 440 is depressed sufficiently to cause the bail 301a to remove the zero stops from in front of the stop bars 66. If the trip lever 127 is blocked against movement when the tail 171 of the subtraction lever latch 167 depresses the stud 172 to render the driving means operable during the first machine cycle of either a negative total- or sub-total-taking operation, as explained earlier herein, the spring 136 between the arm 134 of the bell crank 133 and the trip lever 127 will be tensioned, and, as soon as the depressed negative total or sub-total key is released sufficiently so that the lever 440 can be restored by a suitable spring to a position where bail 301a can return to a position which allows the zero stops to move in front of the stop bars, the trip lever can operate to render the driving mechanism operable to cause the first machine cycle of the negative total- or sub-total-taking operation to take place.

*Symbol type bar*

Mounted at the right-hand side of the group of amount type bars is a symbol or sign type bar 86 (Figs. 46, 47, 67, 68, 69, and 70), which can be used to print different distinctive symbols to indicate the kind of operation being performed by the machine.

As shown in Fig. 70, the type bar 86 is provided with six individual type elements, of which the top element is provided with the "minus" symbol for indicating a subtraction operation; the next lower element is provided with the "credit total" symbol for indicating a negative total-taking operation; the next lower element is provided with the "sub-total" symbol for indicating a positive sub-total-taking operation; the next lower element is provided with the "total" symbol for indicating a positive total-taking operation; the next lower element is provided with the "non-add" symbol for indicating a non-add operation; and the lowest element is provided with a "credit sub-total" symbol to indicate a negative sub-total-taking operation.

The type bar 86 is normally positioned with the top or "minus" type element below the printing position in front of the platen 87. The following mechanisms are provided for shifting the type bar different extents from this normal position to place the various type elements in printing position.

The symbol type bar 86 (Figs. 59, 60, and 67) is connected to a three-armed lever 89 by a pin 88, which extends into a slot in a rearwardly-extending arm of the lever. The lever 89 is pivotally supported on the long stud 90, which extends crosswise of the machine. Another lever 91 (Figs. 46 and 67) is pivotally supported on a stud 92 extending from the inner face of the side frame 11 and is connected by a spring 93 to an upwardly-extending arm of the lever 89 so as to urge a tail 94 of the lever 91 against a pin 95 on the upwardly-extending arm of the lever 89.

In a non-add operation, the link 111 is shifted upwardly, as explained previously, and a pin 113 on the arm 112 extending rearwardly from the link 111 engages a tail 114 on the lever 91 and rocks the lever 91 counter-clockwise (Fig. 46). This movement of the lever 91 tends to carry the tail 94 away from the pin 95 and tensions the spring 93, causing a clockwise movement of the three-armed lever 89 and the lifting of the symbol type bar 86 sufficiently to position the type element having the "non-add" symbol, in printing position as shown in Fig. 67.

An extension 91a of the lever 91 cooperates with a roller on the positive total and sub-total lever 99 and enables the lever 91 to be rocked different extents when the lever 99 is set to condition the machine for a positive total or sub-total-taking operation, and, through the spring 93, causes the lever 89 to be rocked to position the symbol type bar 86 with either the type element for indicating a positive total-taking operation or the type element for indicating a positive sub-total-taking operation in printing position.

This positioning of the symbol type bar in non-add operations and in positive total- and sub-total-taking operations is similar to that shown in the Peters Patent No. 1,386,021.

As explained earlier herein, the ribbon supporting means is shifted in subtraction operations in order that the amounts which are subtracted will be printed in red. This shifting of the ribbon supporting means is effective, through the following means, to shift the symbol type bar 86 from its normal ineffective position to the position where the type element provided with the "minus" symbol is in printing position opposite the platen 87.

As shown in Figs. 68, 69, and 70, the symbol type bar 86 is provided on its side face, remote from the group of amount type bars 51a, with a pair of laterally-extending lugs 392 and 393, which are spaced apart and disposed vertically one below the other. Carried on the rearwardly-extending, adjacent frame member 394 of the ribbon supporting means is a depending symbol type bar actuating member 395, which is pivoted on a stud 396 secured to the member 394. This actuating member 395 is provided with a rearwardly-extending finger 397, which, as shown in Fig. 68, is normally disposed below and slightly in advance of the upper lug 392, before described. The actuating member 395 is offset forwardly of the machine, so as to provide an oblique portion 399 connecting the upper portion with the lower free portion of the member. The oblique portion 399 extends through and is guided in a slot in a stationary bracket 400 fixed to an adjacent part of the machine frame.

The relative position of the finger 397 with respect to the lugs 392 and 393 is such that, when the symbol bar 86 is raised to print the total, sub-total, or non-add symbols, the symbol bar can move up and down for this purpose without interference with the finger 397 of the member 395.

When a subtraction operation is made and printing is to be done in red, the ribbon shift mechanism is rendered operable and shifts the ribbon supporting means upward, and, in this movement, the actuating member 395 is also moved upwardly through its connection with the ribbon supporting means frame member 394, resulting in the passage of the oblique portion 399 upwardly through the slot in the fixed bracket 400, which causes the actuating member to swing rearwardly about its pivot 396. This movement will carry the finger 397 beneath the upper lug 392 on the symbol type bar, whereby the symbol type bar is lifted from its normal position to the position shown in dotted lines in Fig. 68, to place the type element which is provided with the "minus" symbol in printing position to print that symbol.

The mechanism by which the type elements provided with the "credit total" and "credit sub-total" symbols are set to printing position in negative total-taking and negative sub-total-taking operations, respectively, is as follows.

As explained earlier herein, the bail shaft 195 is released in negative total-taking operations and rocks counter-clockwise (Fig. 46) to move the bail rod 197 toward the rear of the machine. One of the arms 196 secured to the bail shaft 195 has thereon a stud 402, on which is pivoted a rearwardly-extending link 403. The rear end of the link 403 is pivotally connected by a pin 404 to the lower end of another link 405, the upper end of which is, in turn, pivotally connected by a pin 406 to a downwardly-extending arm of the three-armed lever 89. This downwardly-extending arm of the lever 89 is provided with an oblique front face 407, which normally engages a laterally-extending pin 408 on the link 405 (see also Figs. 59 and 60). This rearward actuation of the links 403 and 405 when the bail shaft 195 is released is such that the pin 408 on the link 405, bearing against the oblique face 407 of lever 89, shifts that lever about its pivot in a clockwise direction (Fig. 46), and the symbol type bar 86 is elevated a distance such that the type element 390, which is provided with the "credit total" symbol, is placed in printing position to enable this symbol to be printed during a negative total-taking operation.

The ribbon shifting mechanism is operable in negative total-taking operations to cause the negative totals and the "credit total" symbols to be printed in red. The shifting of the ribbon supporting means, however, will have no effect on the setting of the symbol type bar 86 during these operations, because the laterally-extending lugs 392 and 393 are out of the path of movement of the finger 397 on the actuating member 395 when the type bar is set to cause the printing of the "credit total" symbol.

In a negative sub-total-taking operation, the bail shaft 195 is also released, and this would tend to place the symbol type bar in the same position as in a negative total-taking operation. However, in the negative sub-total-taking operation, the non-add link 111 is raised during the second machine cycle of the operation, and this operation of the link 111 causes the pin 113 on the link 111 to engage the tail 114 of lever 91 to swing this lever about its pivot 92 so that its depending portion swings counter-clockwise in Fig. 46, and, since this portion is attached by spring 93 to lever 89, this spring is placed under tension, and lever 89 is swung about its pivot to an extent such as to raise the symbol type bar 86 from the position in which the type element having thereon the "credit total" symbol is in printing position, as shown in Fig. 46, to the position in which the type element having thereon the "non-add" symbol is in printing position, as shown in Fig. 67. When this action occurs, the links 403 and 405, being connected to the bail arm 196, remain substantially in the full-line position shown in Fig. 46, and the described movement of the lever 89 merely results in the oblique face 407 of the lever moving rearwardly out of contact with stud 408 on link 405, as indicated in Fig. 67. To effect the necessary further movement of the symbol type bar 86 from the "non-add" position to the "credit sub-total" position in order to print the "credit sub-total" symbol in a negative sub-total-taking operation, the actuating member 395 on the ribbon supporting means is again brought into play.

Inasmuch as printing is done in red in the negative sub-total-taking operation, the ribbon shifting mechanism will operate to shift the ribbon supporting means. As shown in Fig. 69, the symbol type bar 86 is in the "non-add" position, the same as in Fig. 67, but, in this figure, the parts are viewed from the opposite side. In this position of the symbol type bar 86, the lower lug 393 on its side has been brought into the same position relative to the finger 397 on the actuating member 395 as was this finger with relation to the other lug 392 prior to a "minus" symbol printing operation. When the ribbon supporting means is shifted, the oblique portion 399 of the actuating member 395 will again be drawn upwardly through the slot in the fixed bracket 400, thereby causing the finger 397 to be moved rearwardly and engage underneath the lower lug 393 on the symbol type bar 86 and upon the completion of the upward movement of the member 395 will engage beneath the lug 393 and lift the symbol type bar one space, thereby placing the type element 391 having the "credit sub-total" symbol thereon in printing position for printing such a symbol in red during a negative sub-total-taking operation.

While the form of mechanism shown and described herein is admirably adapted to fulfill the objects primarily stated, it is to be understood that it is not intended to confine the invention to the one form or embodiment disclosed herein, for it is susceptible of embodiment in various forms all coming within the scope of the claims which follow.

I claim as my invention:

1. An addition and subtraction machine comprising a set of totalizer wheels of different orders; carry-over means acting between said wheels; an individual stepped cam rotatable with each totalizer wheel and having the steps thereof progressively ranging in the same manner as the numbers on the related totalizer wheel; an individual sensing finger for each cam movable into and out of engagement with the steps of its related cams; an individual stepped stop piece for each finger connected to its related sensing finger, the steps on each of said stop pieces being arranged in succession to represent the complements of the numbers shown by the respective totalizer wheels; means for printing selected numbers; and selectively controlling means cooperating with said stop pieces for setting said printing means for printing the correct amount of a negative total, and adding automatically to the negative total shown in the totalizer wheels the complement of that total to clear the machine by bringing all of said wheels to nine.

2. An addition and subtraction machine comprising a single set of wheels of different orders; carry-over means acting between said wheels and forming with the wheels a single totalizer; actuating means for entering selected numbers into said wheels for performing addition through the rotation of said wheels; means for controlling the actuating means to perform subtraction by complemental addition with rotation of said wheels in the same direction as for addition; means for printing selected numbers; selectively controlled means for controlling the operation of the actuating means, the totalizer, and the printing means to set said printing means to print the amount of a positive total in said wheels and also for setting said wheels to zero; and selectively controlled means for causing said printing means to print the true value of any negative total in said wheels and for causing said wheels to be set to zero by rotation in the same direction as when amounts are entered therein, said last-named control means including mechanism for, first, controlling the actuating means to subtract one from the amount in the totalizer, then controlling the actuating means and the printing means, respectively, to enter into the totalizer the nines complement of the amount shown by the wheels to set all the wheels to "nines" position and to cause this nines complement to be printed to show the true value of the negative total, and mechanism for adding one to the units wheel to set this wheel to zero position and to cause the carry means to set all the other wheels to zero position.

3. An addition and subtraction machine comprising a single set of wheels of different orders; carry-over means acting between said wheels and forming with the wheels a single totalizer; actuating means for entering selected numbers into said wheels to perform addition through the rotation of said wheels; means for controlling the actuating means to perform subtraction by complemental addition with rotation of said wheels in the same direction as for addition; a support; a plurality of normally ineffective stepped stop pieces individually rotatable on said support, the steps on said stop pieces representing nines complements of the numbers shown in reading position on the wheels, said stop pieces, when rendered effective, serving to control the actuating means; a cam associated with each wheel and rotatable therewith; an individual sensing finger for each wheel and cooperating with the cam associated with its related wheel, each sensing finger being operatively connected to a related stop piece to position the latter in accordance with the position of the related cam engaged by the sensing finger; retaining means normally engaging said stop pieces to hold them and said sensing fingers free of the related cams; and control means which can be operated whenever a negative total is in the totalizer, for releasing said retaining means to allow the sensing fingers to cooperate with their related cams to set the stop pieces according to the number on the wheels so that the stop pieces can control the actuating means to enter into the wheels the nines complement of the number on the wheels to move all the wheels to their nine positions.

4. An addition and subtraction machine comprising a single set of wheels of different orders; carry-over means acting between said wheels and forming with the wheels a single totalizer; actuating means for entering selected numbers into said wheels to perform addition through the rotation of said wheels; means for controlling the actuating means to perform subtraction by complemental addition with rotation of said wheels in the same direction as for addition; means selectively operable to print numbers; an individual stepped cam rotatable with each wheel, said cams having the steps thereof corresponding in order to the numbers on the related wheels; a support; a plurality of stepped stop pieces, one for each stepped cam, individually rotatable on said support, the steps on said stop pieces representing nines complements of the numbers shown in reading position on the wheels and operable to control the actuating means and the printing means accordingly; an individual sensing finger for each wheel and cooperating with the cam of its related wheel, each sensing finger being operatively connected to a related stop piece to position the latter in accordance with the step of the related cam engaged by the sensing finger; means normally engaging said stop pieces to hold them and said sensing fingers free of the related stepped cams; and selectively controlled means operable whenever a negative balance is represented in said totalizer wheels, said selectively controlled means including mechanism for controlling the subtraction means and the actuating means to subtract one by complemental addition to the total shown by said wheels, and for then releasing the holding means for the sensing fingers to allow the sensing fingers to set the stop pieces to control the printing means to print the "nines" complement of the new number then shown by the wheels, the printed number being the true value of the negative total, and to allow the stop pieces to control the actuating means to add said "nines" complement to the number in the totalizer wheels to move all the wheels in the same direction as for addition, to their nine positions, and also including mechanism for adding one to the lowest order of the totalizer to enable the carry-over means to restore all the wheels to their zero positions.

5. An addition and subtraction machine comprising a set of wheels of different orders; carry-over means acting between said wheels and forming with the wheels a totalizer; actuating means for entering selected numbers into said wheels in a single operation for numbers of any number of digits, to perform addition through the rotation of said wheels; means for controlling said actuating means to perform subtraction by complemental addition with rotation of said wheels in the same direction as for addition; a support; a plurality of normally inoperable complemental members individually rotatable on said support, said members, when operable, controlling the actuating means; a cam rotatable with each wheel; means to enable each cam to control the position of a related complemental member; and means operable whenever a negative balance is indicated by said wheels, and including mechanism to enable the means to position the complemental members under control of their related cams, and to render the complemental members operable to control the actuating means, to add the nines complement of the amount shown by said wheels to said amount shown in said wheels in a single operation for numbers made up of any number of digits within the capacity of the machine.

6. An addition and subtraction machine comprising a set of wheels of different orders settable to represent a negative total by the tens complement thereof; carry-over means acting between said wheels and forming with the wheels a totalizer; actuating means for entering selected numbers into said wheels in a single operation for numbers of any number of digits, to perform addition through the rotation of said wheels; means associated with said actuating means for performing subtraction by complemental addition with rotation of said wheels in the same direction as for addition; a support; a plurality of complemental members individually rotatable on said support and operable to control the actuating means; a cam rotatable with each wheel; means enabling each cam to control the position of a related complemental member; and means operable whenever a negative balance is indicated by said wheels, and including mechanism to control the actuating means to take "one" from the complement of said negative balance shown in the wheels to create a "nines" complement in all of said dial wheels, mechanism to then enable the complemental members to be set according to the amount on the wheels and to control the actuating means to take said "nines" complement directly from said dial wheels and add it to said negative balance shown therein in a single operation for numbers made up of any number of digits within the capacity of the machine, to bring all of said dial wheels to the "nines" position, and mechanism to then add one into the units wheel to effect a carry-out to clear the machine.

7. An addition and subtraction machine comprising a totalizer with a set of wheels of different orders and carry-over means between said wheels; actuating means for entering selected numbers into said totalizer to perform addition; means for controlling said actuating means to operate said totalizer for performing subtraction; a total key; a negative total key; said subtraction means having a member operable from a normal position in one direction at the start of a subtraction operation and tending to return to said position at the end of the subtraction operation; means for locking said total key; means for locking said negative total key; means connecting said locking means for both of said keys and preventing simultaneous locking of both keys, said connecting means being operable by said member during its movement in said one direction in a subtraction operation into a position for rendering said total key locking means effective to lock the total key and operable by the return of the member to condition the total key locking means so that this locking means can be rendered ineffective following a subtraction operation; and means controlled by the totalizer, and operable when the total is negative, for retaining the member against return movement, to maintain the total key locking means effective when a negative total is in said totalizer.

8. An addition and subtraction machine comprising a totalizer with a set of wheels of different orders and carry-over means between said wheels, said wheels representing negative totals by being set to the tens complement of the negative total; printing mechanism operable to print selected numbers; a negative sub-total key; negative sub-total taking control means rendered effective by said sub-total key; and negative sub-total taking means operable under control of said control means for first subtracting one from the number shown by the wheels by complemental addition, then setting the printing mechanism in position to print the "nines" complement of the number then in the totalizer, and then adding one to the units wheel to again show in the totalizer the number shown thereby just before said subtraction of one.

9. An addition and subtraction machine comprising a set of wheels of different orders and carry-over means acting between said wheels, and forming with the wheels a totalizer; means for entering selected numbers into said wheels to perform addition through the rotation of said wheels; means to control the addition means to perform subtraction by complemental addition with rotation of said wheels in the same direction as for addition; a negative total key; means operable by actuation of said key for controlling the subtraction means and the addition means to add the tens complement of "one" to the amount in said wheels when said amount represents a negative total; means for printing the complement of the new amount; trigger mechanism operable to add "one" into the units wheel; a cocking device; means normally locking said cocking device against operation; means controlled by said key and operable to release said cocking device to cock said trigger mechanism; and means for tripping said cocked trigger mechanism to add "one" to the units wheel after the printing of said complement of the amount in the said wheels has occurred.

10. An addition and subtraction machine comprising a set of wheels of different orders; carry-over means acting between said wheels, and forming with the wheels a totalizer; means for entering selected numbers into said wheels to perform addition through the rotation of said wheels; means to control the addition means for performing subtraction by complemental addition with rotation of said wheels in the same direction as for addition; a negative total key; means operable by actuation of said key for controlling the subtraction means and the addition means to add the tens complement of one to the amount in said wheels when said amount represents a negative total; means for printing the complement of the new amount; trigger mechanism operable to add "one" into the units wheel; a cam normally engaging said trigger mechanism without actuating the same; a cocking device for conditioning said trigger mechanism; means normally locking said cocking device against operation; means controlled by the negative total key and operable to release said device for conditioning said trigger mechanism; and means for moving said cam to trip said trigger mechanism to add "one" into the units wheel after the printing of said complement of the amount in the wheels has occurred.

11. An addition and subtraction machine comprising a totalizer having a set of wheels of different denominational orders and carry-over means acting between adjacent wheels; a shaft operable through a single oscillation whenever addition or subtraction is performed; means operable by said shaft when so oscillated for entering selected numbers into said wheels to perform addition with rotation of said wheels; means cooperating with said addition means and also operable by said shaft for performing subtraction by complemental addition, with rotation of said wheels in the same direction as for addition; a negative total key; a member yieldingly urged in one direction; means releasably latching said member against movement in said one direction; means rendered effective by a single operation of said key for causing said shaft to make two complete oscillations in succession; means rendered effective automatically upon operation of said key and operable, during the first of said two oscillations of said shaft, to control the subtraction means and the addition means to add the tens complement of one to the number shown by said wheels; means controlled by said key and operable near the end of the first oscillation of the shaft for releasing said member from said latching means; a trigger device; means controlled by said trigger device for adding one to the units wheel when said trigger device is tripped; means operable during the second of said two oscillations for returning said member to relatched position, said member during its said return movement operating to cock said trigger device; and means operable by said shaft and effective near the end of the second of said two successive oscillations first to trip the trigger device to cause said addition of one to said units wheel and thereafter, just before completion of the second oscillation of said shaft, to release said trigger device for return to normal uncocked position.

12. An addition and subtraction machine comprising a totalizer having a set of wheels of different denominational orders and carry-over means acting between adjacent wheels; a shaft operable through a single oscillation whenever addition or subtraction is performed; means operable by said shaft, when so oscillated, for entering selected numbers into said wheels to perform addition with rotation of said wheels; means cooperating with said addition means and also operable by said shaft for performing subtraction by complemental addition, with rotation of said wheels in the same direction as for addition; a negative total key; a member yieldingly urged in one direction; means releasably latching said member against movement in said one direction; means rendered effective by a single operation of said key for causing said shaft to make two complete oscillations in succession; means rendered effective automatically upon operation of said key and operable, during the first of said two oscillations of said shaft, to control the subtraction means and the addition means to add the tens complement of one to the number shown by said wheels; means controlled by said key and operable near the end of the first oscillation of the shaft for releasing said member from said latching means; a trigger device; means controlled by said trigger device for adding one to the units wheel when said trigger device is tripped; means operable during the second of said two oscillations for returning said member to relatched position, said member during said return movement operating to cock said trigger device; means operable by said shaft and effective near the end of the second of said two successive oscillations, first to trip the trigger device to cause the said addition of one to said units wheel, and thereafter, just before completion of the second oscillation of said shaft, to release said trigger device to allow the trigger device to return to normal position; and means controlled by said negative total key and operable during the second of said two successive oscillations of said shaft for controlling the addition means to enter into said totalizer the complement of the number shown in said totalizer after the complement of one has been added and before said trigger device is released by said shaft operated means.

13. An addition and subtraction machine comprising a totalizer having a set of wheels of different denominational orders; carry-over means acting between adjacent wheels; a shaft operable through a single oscillation whenever addition or subtraction is performed; means operable by said shaft, when so oscillated, for entering selected numbers into said wheels to perform addition with rotation of said wheels; means cooperating with said addition means and also operable by said shaft for performing subtraction by complemental addition with rotation of said wheels in the same direction as for addition; a negative sub-total key; a member yieldingly urged in one direction; means releasably latching said member against movement in said one direction; means rendered effective by a single operation of said key for causing said shaft to make two complete oscillations in succession; means rendered effective automatically upon operation of said key and operable, during the first of said two oscillations of said shaft, to control the subtraction means and the addition means to add the tens complement of one to the number shown by said wheels; means controlled by said key and operable near the end of the first oscillation of the shaft for releasing said member from said latching means; a trigger device; means controlled by said trigger device for adding one to the units wheel when said trigger device is tripped; means operable during the second of said two oscillations for returning said member to relatched position, said member during said return movement operating to cock said trigger device; means operable by said shaft and effective near the end of the second of said two successive oscillations, first to trip the trigger device to cause the said addition of one to said units wheel and thereafter, just before completion of the second oscillation of said shaft, to release said trigger device to return to normal position; means for printing selected numbers; and means controlled by said key and operable by said shaft during the first half of the second of said two oscillations for setting said printing means to print the complement of the number shown by said totalizer wheels after the entry of the complement of one therein.

14. An addition and subtraction machine comprising a totalizer having a set of wheels of different orders; carry-over means acting between adjacent wheels; a shaft operable through a single oscillation whenever addition or subtraction is performed; means operable by said shaft, when so oscillated, for entering selected numbers into said wheels to perform addition with rotation of said wheels; means cooperating with said addition means and also operable by said shaft for performing subtraction by complemental addition with rotation of said wheels in the same direction as for addition; a negative total key; a member yieldingly urged in one direction; means releasably latching said member against movement in said one direction; means rendered effective by a single operation of said key for causing said shaft to make two complete oscillations in succession; means rendered effective automatically upon operation of said key and operable, during the first of said two oscillations of said shaft, to control the subtraction means and the addition means to add the tens complement of one to the number shown by said wheels; means controlled by said key and operable near the end of the first oscillation of the shaft for releasing said member from said latching means; a trigger device; means controlled by said trigger device for adding one to the units wheel when said trigger device is tripped; means operable during the second of said two oscillations for returning said member to relatched position, said member, during said return movement, operating to cock said trigger device; means operable by said shaft and effective near the end of the second of said two successive oscillations, first to trip the trigger device to cause the said addition of one to said units wheel, and thereafter, just before completion of the second oscillation of said shaft, to release said trigger device to allow the trigger device to be restored to normal position; means for printing selected numbers; and means controlled by said negative total key and by the totalizer and operable during the second of said two successive oscillations of said shaft for controlling the printing means and the addition means, respectively, to print the complement of the number shown in said totalizer after the complement of one has been entered and before said trigger device is tripped by said shaft operated means, and to add into the totalizer the number that is printed.

15. In an addition and subtraction machine, the combination of an electric motor; switch means controlling said motor and movable, when free, into circuit closing position; latch means for normally retaining the switch means in open-circuit position and operable to free said switch means for movement to closed circuit position; trip means for operating said latch means to free said switch means; one cycle mechanism operated by said motor and normally stopping itself and also said motor at the end of any cycle of operation by restoring said switch means to open-circuit position, where it is retained by said latch means; an addition key; a subtraction key; a total key; means operable by each of said keys for causing an operation of said trip means to start a cycle of operation of the motor; a negative total key; means operated by said negative total key for causing an operation of said other key operable means to operate the trip means and thereby initiate a cycle of operation of said motor; and means conditioned by said negative total key, when this key is operated to initiate a cycle of operation of said motor, and operable just before the completion of said last-mentioned initiated cycle, to actuate said trip means to cause a second immediately following cycle of operation of said motor.

16. In an addition and subtraction machine, the combination of an electric motor; a one cycle mechanism operated thereby; switch means controlling said motor; trip means for actuating said switch means to close a circuit to the motor, an addition key; a subtraction key; a total key; means operated by any of said keys to cause an actuation of said trip means to close said switch means and start said motor to initiate operation of said one cycle mechanism, which one cycle mechanism at the completion of any cycle automatically opens said switch means to stop said motor and reset said trip means; a negative total key; means operated by depression of said negative total key for causing operation of said trip means to initiate a cycle of operation of said motor; and means conditioned by said negative total key and operated by the motor for automatically effecting another operation of the trip means to initiate a second cycle of operation of said motor immediately following completion of the cycle of operation initiated by the depression of the negative total key.

17. In an addition and subtraction machine, the combination of an electric motor; a one cycle mechanism operated thereby; switch means controlling a circuit to said motor; an addition key; a subtraction key; a total key; means operable by any of said keys for causing an operation of said switch means to close said motor circuit to initiate an operation of said motor and said one cycle mechanism; means operable by the one cycle mechanism at the end of the cycle to operate the switch means to open the circuit of said motor; a negative total key; means operable by said negative total key for initiating one cycle of operation of said motor through a closing of said switch means; and means conditioned by said negative total key and operated by said motor during said one cycle of operation initiated by said negative total key, for automatically conditioning said switch means, before said one cycle has been completed, to cause a second immediately following cycle of operation.

18. An addition and subtraction machine comprising a totalizer with a set of wheels of different orders; carry-over means between said wheels; means for entering selected numbers into said totalizer to perform addition; means for controlling the addition means to perform subtraction by complemental addition with rotation of said wheels in the same direction as for addition; printing mechanism operable to print selected numbers; means to enter one in the lowest order wheel of the totalizer; a negative sub-total key; and negative sub-total taking control means controlled by said sub-total key and operable for first controlling the subtraction means and the addition means to subtract one from the number shown by the wheels by complemental addition, then, in conjunction with the totalizer, controlling the printing mechanism to print the "nines" complement of the number then in the totalizer, and then rendering the means for adding one to the units wheel operative to enter one in the totalizer so as to again show in the totalizer the number shown thereby just before said subtraction of one.

19. In a machine of the class described, the combination of a totalizer having a single set of denominational wheels which can represent positive totals directly and negative totals by the tens complement thereof; differentially operable means to operate said totalizer to enter amounts therein; and mechanism operable, when the total is negative, for restoring said wheels to zero, including means for controlling the differentially operable means to operate the totalizer to add the tens complement of one to the amount thereon to change the tens complement of the negative total to the nines complement thereof, means thereafter operable to control the differentially operable means to operate the totalizer to add therein the nines complement of the nines complement of the negative total, to cause all the wheels of the totalizer to be set to their nine positions, and means to add one to the amount in the totalizer after the entry of the nines complement therein, to cause the wheels of the totalizer to be set to their zero positions.

20. An addition and subtraction machine comprising a set of wheels of different orders; carry-over means acting between said wheels and forming with the wheels a totalizer; actuating means for entering selected numbers into said wheels to perform addition through the rotation of said wheels; a means for controlling the actuating means to perform subtraction by complemental addition with rotation of said wheels in the same direction as for addition; a positive total key; a negative total key; total taking control means operated by the positive total key and including means for controlling the operation of the actuating means and the totalizer to move all of said wheels to zero positions in a direction opposite to the direction in which they are moved in an entering operation; other total taking control means set into operation by the negative total key for controlling the operation of the actuating means and the totalizer to move all of said wheels to zero positions in the same direction in which they are moved in an entering operation; interlocking means movable to a position at each subtraction operation for causing said positive total key to be locked and said negative total key to be unlocked; retaining means conditioned by the movement of the interlocking means to retain the interlocking means in moved position and operable under control of the totalizer to release the interlocking means for return movement if the total in said totalizer is positive at the end of the subtraction operation; and means operable by the subtraction means for holding the interlocking means in its moved position until just before the end of the subtraction operation, at which time the control over the position of the interlocking means by the totalizer-controlled retaining means can be effective to retain the interlocking means in its moved position if the total is negative or to allow the interlocking means to return from its moved position if the total is positive.

21. An addition and subtraction machine comprising a single set of wheels of different orders; carry-over means acting between said wheels and forming with the wheels a single totalizer which can represent positive totals directly and negative totals by the tens complement thereof; actuating means for entering selected numbers into said wheels to perform addition through the rotation of said wheels; means for controlling the actuating means to perform subtraction by complemental addition with rotation of said wheels in the same direction as for addition; means for printing selected numbers; selectively controlled means for controlling the actuators, the totalizer, and the printing means to cause said printing means to print the amount of a positive total in said wheels with the rotation of the wheels to zero in the opposite direction to that in which amounts are entered therein; and selectively controlled means for causing said printing means to print the true value of any negative total in said wheels and for causing said wheels to be set to zero by rotation in the same direction as when amounts are entered therein, said last-named control means including mechanism for, first, controlling the subtracting means and the actuating means to add the tens complement of one to the totalizer to change the tens complement of the negative total to the nines complement thereof, next controlling the actuating means to enter into the totalizer the nines complement of the nines complement of the negative total to set all the wheels to "nines" position, and mechanism for adding one to the units wheel to enable the carry-over means to move all the wheels to "zero."

22. In a machine of the class described, the combination of a single set of denominational wheels which can be set to represent positive totals directly and negative totals by the tens complement thereof; carry-over means between said wheels; differentially operable means to operate said wheels to enter amounts therein; and mechanism operable when the total is negative, for restoring said wheels to their zero position, including means for first controlling the differentially operable means to operate the wheels to add the tens complement of one to the amount in said wheels and thus change the tens complement of the negative total to the nines complement, means for next controlling the differentially operable means to operable the wheels to add the nines complement of the nines complement of the negative total to set all the wheels in their nine positions, and means thereafter operable to add one to the wheel of lowest denomination to set the lowest wheel to zero position, and, through the carry-over means, to cause the other wheels to be set to their zero position.

23. In a machine of the class described, the combination of an ink ribbon having different color zones; a ribbon-supporting mechanism normally positioning the ribbon for printing therethrough in one color zone, which mechanism is shiftable to place another color zone of the ribbon in printing position; means for shifting said supporting mechanism to place said other color zone in printing position; subtraction mechanism; means operated by the subtraction mechanism for rendering the shifting means operable so that printing in subtraction operations will be made in said other color; a symbol type bar having thereon a "minus" sign and a "credit balance" sign; a projection on the type bar; means on the supporting mechanism engageable with the projection on the type bar for moving the "minus" sign to printing position when the supporting mechanism is shifted in a subtraction operation; a negative total key; means operated by the negative total key for rendering the shifting means operable in negative total-taking operations, so that printing in such operations will be in said other color; and means rendered operable by the negative total key for shifting said type bar to move the "credit balance" sign to printing position and to move the projection on the type bar to a position where the means on the supporting mechanism will not engage the projection when the supporting mechanism is shifted.

24. In a machine of the class described, the combination of an ink ribbon having different color zones; a ribbon-supporting mechanism normally positioning the ribbon for printing therethrough in one color zone, which mechanism is shiftable to place another color zone of the ribbon in printing position; means for shifting said supporting mechanism to place said other color zone in printing position; subtraction mechanism; means operated by the subtraction mechanism for rendering the shifting means operable so that printing in subtraction operations will be made in said other color; a symbol type bar having thereon a "minus" sign and a "credit sub-total" sign; a pair of projections on the type bar; means on the supporting mechanism engageable with one of the projections on the type bar, when the type bar is in its normal position, for moving the "minus" sign to printing position when the supporting mechanism is shifted; a negative sub-total key; means operated by the negative sub-total key for rendering the shifting means operable in negative sub-total operations, so that printing in such operations will be in said other color; and means rendered operable by the negative sub-total key for shifting said type bar to an initial position in the movement of the "credit sub-total" sign to printing position and moving the other projection on the type bar to a position where the means on the supporting mechanism will engage the projection when the supporting mechanism is shifted and will complete the movement of the "credit sub-total" sign to printing position.

25. In a machine of the class described, the combination of an ink ribbon having different color zones; a ribbon-supporting mechanism normally positioning the ribbon for printing therethrough in one color zone, which mechanism is shiftable to place another color zone of the ribbon in printing position; means for shifting said supporting mechanism to place said other color zone in printing position; a negative sub-total key; means operated under control of the negative sub-total key for rendering the shifting means operable so that printing in negative sub-total operations will be made in said other color; a symbol type bar having thereon a "credit sub-total" sign; means rendered operable in a negative sub-total operation for moving the type bar to an initial position in which the "credit sub-total" sign is just out of printing position; a projection on the type bar; and means on the supporting mechanism engageable with the projection on the type bar when the type bar is in its initial position for enabling the completion of the movement of the type bar to place the "credit sub-total" sign in printing position when the supporting mechanism is shifted in a negative sub-total operation.

26. In a machine of the class described, the combination of an ink ribbon having different color zones; a ribbon-supporting mechanism normally positioning the ribbon for printing therethrough in one color zone, which mechanism is shiftable to place another color zone of the ribbon in printing position; means for shifting said supporting mechanism to place said other color zone in printing position; a negative sub-total key; means operated by the negative sub-total key for rendering the shifting means operable so that printing in negative sub-total operations will be made in said other color; a symbol type bar having thereon a "non-add" sign and a "credit sub-total" sign; non-add mechanism operable in a negative sub-total operation; means operated by the non-add mechanism for positioning the type bar with the "non-add" sign in printing position; a projection on the type bar; and means on the supporting mechanism engageable with the projection on the type bar, when the "non-add" sign has been moved to printing position, for moving the type bar to place the "credit sub-total" sign in printing position when the supporting mechanism is shifted in a negative sub-total operation.

27. In a machine of the class described, the combination of a multi-denominational order totalizer which can be operated to represent positive totals directly and to represent negative totals by the "tens" complement thereof; actuating means for entering amounts into said totalizer; a keyboard for controlling the actuating means to enter amounts into the totalizer for performing addition; subtraction means associated with the actuating means for causing the actuating means to enter tens complements of amounts into the totalizer for performing subtraction; amount printing means; symbol printing means having thereon a "minus" sign and a "credit balance" sign; an ink ribbon having different color zones; a ribbon-supporting means normally positioning the ribbon for printing therethrough in one color zone, which supporting means is shiftable to place another color zone in printing position; means to shift the supporting means to bring said other color zone into printing position; a projection on said symbol type bar; means on the ribbon-supporting means for engaging the projection on the symbol type bar in the normal position of the bar and moving the "minus" sign into printing position when the supporting means is shifted to cause printing in said other color; normally inoperative means controlled by the totalizer for controlling the amount printing means and the actuating means according to the "nines" complement of the amount on the totalizer; normally inoperative means to add "one" to the amount in the totalizer; an electric motor; single-cycle means including a switch and a clutch for enabling the motor to drive the machine in a single cycle of operation; a negative total key for causing a two-cycle total-printing operation when the total on the totalizer is negative; means operated by the negative total key to control the subtraction means and the actuating means to cause "one" to be subtracted from the amount in the totalizer to change the "tens" complement of the negative total to the "nines" complement thereof, and to control the single-cycle means to cause the machine to be driven during the first cycle of the two-cycle total-printing operation; and means rendered effective by the negative total key and operated near the end of the first cycle of operation of the machine to cause the single-cycle means to operate again to drive the machine through the second cycle of the two-cycle total-printing operation, to render said ribbon-shifting means operative, thus causing the printing to take place in said other color, to position the symbol type bar with the "credit balance" sign in printing position and with the projection on the type bar out of the path of the means on the ribbon-supporting means, so that the setting of the symbol type bar is not affected by the shifting of the ribbon, to render the totalizer-controlled normally inoperative means operative to control the amount-printing means and the actuating means, respectively, to print the "nines" complement of the amount on the totalizer and to enter this "nines" complement amount into the totalizer, which causes the true value of the negative total to be printed and the totalizer to be set to "nine" in each order, and to render the normally inoperative "one" adding means operative after the printing operation to add "one" to the amount in the totalizer to cause the setting of all "nines" in the totalizer to be changed to "zeros."

28. In a machine of the class described, the combination of a multi-denominational order totalizer which can be operated to represent positive totals directly and to represent negative totals by the "tens" complement thereof; actuating means for entering amounts into said totalizer; a keyboard for controlling the actuating means to enter amounts into the totalizer for performing addition; subtraction means associated with the actuating means for causing the actuating means to enter tens complements of amounts into the totalizer for performing subtraction; non-add mechanism; amount printing means; symbol printing means having thereon a "non-add" sign and a "credit sub-total" sign; an ink ribbon having different color zones; a ribbon-supporting means normally positioning the ribbon for printing therethrough in one color zone, which supporting means is shiftable to place another color zone in printing position; means to shift the supporting means to bring said other color zone into printing position; a projection on said symbol type bar; means on the ribbon-supporting means for engaging the projection on the symbol type bar when the "non-add" sign has been moved to printing position and moving the bar farther to place the "credit sub-total" sign in printing position when the supporting means is shifted to cause printing in said other color; normally inoperative means controlled by the totalizer for controlling the amount printing means and the actuating means according to the "nines" complement of the amount on the totalizer; normally inoperative means to add "one" to the amount in the totalizer; an electric motor; single-cycle means including a switch and a clutch for enabling the motor to drive the machine in a single cycle of operation; a negative sub-total key for causing a two-cycle sub-total-printing operation when the total on the totalizer is negative; means operated by the negative sub-total key to control the subtraction means and the actuating means to cause "one" to be subtracted from the amount in the totalizer to change the "tens" complement of the negative total to the "nines" complement thereof, and to control the single-cycle means to cause the machine to be driven during the first cycle of the two-cycle total-printing operation; and means rendered effective by the negative sub-total key and operated near the end of the first cycle of operation of the machine to cause the single-cycle means to operate again to drive the machine through the second cycle of the two-cycle sub-total-printing operation, to render said ribbon-shifting means operative, thus causing the printing to take place in said other color, to cause the non-add mechanism to operate and position the symbol type bar with the "non-add" symbol in printing position and with the projection on the type bar in the path of the means on the ribbon-supporting means, so that the setting of the symbol type bar into position to print the "credit sub-total" sign is effected by the shifting of the ribbon, to render the totalizer-controlled normally inoperative means operative to control the amount printing means to print the "nines" complement of the amount on the totalizer, which causes the true value of the negative total to be printed, and to render the normally inoperative "one" adding means operative after the printing operation to add "one" to the amount in the totalizer to restore the value of "one" which was subtracted from the totalizer during the first cycle of the two-cycle sub-total-printing operation.

29. In a machine of the class described, the combination of a totalizer having a single set of wheels which can represent a negative total by being set to a value which is the "tens" complement of the negative total; means to add the "tens" complement of "one" to the totalizer to thereby change the "tens" complement of the negative total to the "nines" complement thereof; printing means; means settable under control of the totalizer wheels and operable to control the printing means to cause the "nines" complement of the "nines" complement of the negative total to be printed, the printed amount being the true amount of the negative total; and means operable after the total is printed to add "one" to the amount in the totalizer to restore the setting of the totalizer to the "tens" complement of the negative total.

30. In a machine of the class described, the combination of a totalizer having a single set of wheels which can represent a negative total by being set to a value which is the "tens" complement of the negative total; differentially operable means to enter amounts into the totalizer; means to control the differentially operable means to enter a value of nine in each wheel of the totalizer, thereby to add the "tens" complement of "one" to the amount thereon to change the "tens" complement of the negative total to the "nines" complement; printing means; and means settable under control of the totalizer wheels and operable to control the printing means to cause the "nines" complement of the "nines" complement of the negative total to be printed, the printed amount being the true amount of the negative total.

31. In a machine of the class described, the combination of a totalizer having a single set of denominational wheels which can represent a negative total by being set to a value which is the "tens" complement of the negative total; differentially operable means to operate the totalizer to add the "tens" complement of "one" to the amount thereon to change the "tens" complement of the negative total to the "nines" complement; printing means; means settable under control of the totalizer wheels and operable to control the printing means to cause the "nines" complement of the "nines" complement of the negative total to be printed, the printed amount being the true amount of the negative total; and means, operable automatically after the negative total has been printed, for causing an additive entry of "one" in the lowest denominational wheel of the totalizer, whereby to restore the value "one" which was removed from the totalizer in changing the "tens" complement of the negative total to the "nines" complement.

32. In a machine of the class described, the combination of a totalizer having a single set of denominational wheels which can represent a negative total by being set to a value which is the "tens" complement of the negative total; differentially operable means to operate said totalizer to enter amounts therein; means to control the differentially operable means to operate the totalizer to add the "tens" complement of "one" to the amount thereon to change the "tens" complement of the negative total to the "nines" complement thereof; printing means; means settable under control of the totalizer wheels and operable to control the printing means to cause the "nines" complement of the "nines" complement of the negative total to be printed and to control the differentially operable means to operate the totalizer to add to the amount thereon the "nines" complement of the "nines" complement of the negative total, whereby to print the true value of the negative total and to set all the wheels of the totalizer to their "nine" positions; and means automatically operable after the negative total has been printed, for adding "one" to the amount in the totalizer to cause all the wheels to be set to their "zero" positions.

33. In a machine of the class described, the combination of a keyboard having a plurality of denominational rows of amount keys; a totalizer; a plurality of differentially operable means, one for each row of keys, controlled by the keys to enter into the totalizer amounts set up on the keyboard; subtraction mechanism associated with said differentially operable means to enable the differentially operable means to enter into the totalizer the "tens" complement of the amount set up on the keyboard, said subtraction mechanism enabling the differentially operable means in the denominational orders above units order to move an extent to enter a value of "nine" when no amount key is depressed and enabling the differentially operable means in the units order to move an extent to enter a value of "ten" when no amount key is depressed; normally ineffective limiting means associated with the units denominational order differentially operable means, said limiting means, when effective, being operable to limit the extent of movement of this differentially operable means so that this differentially operable means can only enter a value of "nine" when no amount key is depressed; a control key which is operable when no amount key is depressed; and means operated by the control key for rendering the subtraction mechanism operable and for rendering the limiting means effective, whereby to cause the "tens" complement of "one" to be entered into said totalizer.

HARRY L. LAMBERT.

REFERENCES CITED

The following references are of record in the file of this patent:

UNITED STATES PATENTS

| Number | Name | Date |
| --- | --- | --- |
| 1,206,113 | Hopkins | Nov. 28, 1916 |
| 1,915,296 | Crosman | June 27, 1933 |
| 1,609,768 | Perkins | Dec. 7, 1926 |
| 1,822,031 | Hoffmeister | Sept. 8, 1931 |
| 2,149,371 | Uhlig | Mar. 7, 1939 |
| 1,987,015 | Lehman | Jan. 8, 1935 |
| 2,251,097 | Anderson | July 29, 1941 |
| 2,280,920 | Landsiedel | Apr. 28, 1942 |
| 1,255,568 | Peters | Feb. 5, 1918 |
| 1,429,201 | Gubelmann | Sept. 12, 1922 |
| 1,558,947 | Teetor | Oct. 27, 1925 |
| 1,854,875 | White | Apr. 19, 1932 |
| 2,172,749 | Going | Sept. 12, 1939 |
| 2,244,241 | Bryce | June 3, 1941 |